(12) United States Patent
Yamakado et al.

(10) Patent No.: US 9,199,639 B2
(45) Date of Patent: Dec. 1, 2015

(54) MOTION CONTROL SYSTEM OF VEHICLE

(75) Inventors: Makoto Yamakado, Tsuchiura (JP);
Junya Takahashi, Saitama (JP);
Shinjiro Saito, Kasumigaura (JP);
Toshiya Oosawa, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 250 days.

(21) Appl. No.: 13/819,226

(22) PCT Filed: Sep. 28, 2011

(86) PCT No.: PCT/JP2011/072295
§ 371 (c)(1),
(2), (4) Date: May 29, 2013

(87) PCT Pub. No.: WO2012/043683
PCT Pub. Date: Apr. 5, 2012

(65) Prior Publication Data
US 2014/0145498 A1    May 29, 2014

(30) Foreign Application Priority Data
Sep. 28, 2010   (JP) ................................. 2010-216335

(51) Int. Cl.
*B60W 30/045* (2012.01)
*B60T 8/1755* (2006.01)
(Continued)

(52) U.S. Cl.
CPC ............ *B60W 30/045* (2013.01); *B60T 8/1755* (2013.01); *B60T 8/245* (2013.01);
(Continued)

(58) Field of Classification Search
CPC ..... B60T 8/1755; B60W 10/12; B60W 10/18; B60W 10/188; B60W 30/00; B60W 30/02; B60W 30/045

USPC .......... 303/152, 167, 9.62, 3, 177; 701/70, 71
See application file for complete search history.

(56) References Cited

U.S. PATENT DOCUMENTS

| | | | |
|---|---|---|---|
| 8,655,533 B2* | 2/2014 | Takagi | 303/152 |
| 2002/0041124 A1* | 4/2002 | Nishio et al. | 303/167 |

(Continued)

FOREIGN PATENT DOCUMENTS

| | | |
|---|---|---|
| JP | 05-016789 | 1/1993 |
| JP | 09-309357 | 12/1997 |

(Continued)

OTHER PUBLICATIONS

Machine Translation—JP2006213139.*
(Continued)

*Primary Examiner* — Melanie Torres Williams
(74) *Attorney, Agent, or Firm* — Foley & Lardner LLP

(57) ABSTRACT

Vehicular motion control system comprising controller that independently controls driving force and/or braking force of each of four wheels and a turning direction sensor that senses a turning direction, and with an acceleration/deceleration command generator that generates an acceleration/deceleration command based upon a sensed steering angle and sensed vehicle speed and a driving force/braking force distributor that determines the distribution of driving force or driving torque and/or braking force or braking torque of each wheel, and driving force/braking force distributor determines based upon the acceleration/deceleration command and the turning direction so that more driving force or more driving torque and/or more braking force or more braking torque are/is distributed to the inside front wheel in turning than the outside front wheel in turning and more driving force or more driving torque and/or more braking force or more braking torque are/is distributed to the outside rear wheel.

27 Claims, 52 Drawing Sheets

(51) Int. Cl.

| | | |
|---|---|---|
| *B60W 10/06* | (2006.01) | |
| *B60W 10/08* | (2006.01) | |
| *B60W 10/14* | (2012.01) | |
| *B60W 10/16* | (2012.01) | |
| *B60W 10/184* | (2012.01) | |
| *B60W 10/192* | (2012.01) | |
| *B60W 10/20* | (2006.01) | |
| *B60W 30/02* | (2012.01) | |
| *B60T 8/24* | (2006.01) | |
| *B60T 8/26* | (2006.01) | |
| *B60T 13/74* | (2006.01) | |

(52) U.S. Cl.
CPC ...... *B60T 8/246* (2013.01); *B60T 8/26* (2013.01); *B60T 13/745* (2013.01); *B60W 10/06* (2013.01); *B60W 10/08* (2013.01); *B60W 10/14* (2013.01); *B60W 10/16* (2013.01); *B60W 10/184* (2013.01); *B60W 10/192* (2013.01); *B60W 10/20* (2013.01); *B60W 30/02* (2013.01); *B60W 2520/10* (2013.01); *B60W 2540/10* (2013.01); *B60W 2540/18* (2013.01); *B60W 2710/182* (2013.01); *B60W 2720/14* (2013.01); *B60W 2720/403* (2013.01); *B60W 2720/406* (2013.01); *Y02T 10/7258* (2013.01)

(56) References Cited

U.S. PATENT DOCUMENTS

| | | | |
|---|---|---|---|
| 2006/0076828 A1* | 4/2006 | Lu et al. | 303/146 |
| 2008/0221766 A1 | 9/2008 | Maeda et al. | |
| 2012/0212043 A1* | 8/2012 | Miyata et al. | 303/9.62 |

FOREIGN PATENT DOCUMENTS

| | | |
|---|---|---|
| JP | 09-315277 | 12/1997 |
| JP | 2002-340925 A | 11/2002 |
| JP | 2006-213139 A | 8/2006 |
| JP | 2008/080840 A | 4/2008 |
| JP | 2008-201358 A | 9/2008 |
| JP | 2009-184575 A | 8/2009 |
| JP | 2010-162911 A | 7/2010 |

OTHER PUBLICATIONS

Machine Translation—JP2009184575.*
Machine Translation—JP2010162911.*
Katayama et al., "Development of four-wheel active steer," Society of Automotive Engineers of Japan, Inc., Proc. Before scientific lecture meeting, May 2007, document No. 20075281 No. 11-07, pp. 7-12.
Shibahata et al., "SH-AWD: Direct Yaw Control (DYC)," Aachener Kolloquium Fahrzeug-und Motorentechinik, 2006, pp. 1627, 1640, 1641.
Yamakado et al., "improvement of Vehicle Agility and Stability by G-Vectoring Control," Proc. of AVEC2008-080420, 2008; pp. 116-121.
Yamakado et al., "Proposal of the longitudinal driver model in coordination with vehicle lateral motion based upon jerk information," Review of Automotive Engineering, Oct. 2008, pp. 533-541, vol. 29, No. 4.
Mori et al., "Enhancement of agility and stability by control over transition of steering rear wheel," Society of Automotive Engineers of Japan, Automobile Technology, 1990, vol. 44, No. 3, pp. 84-85.
Takahashi et al., "Evaluation of Vehicle Dynamics Control system with G-Vectoring Control" collection of Society of Automotive Engineers of Japan, 2010, vol. 41, No. 2, pp. 195-200.
Harada H., "Vehicle dynamics for automotive engineers," Industrial Science Systems, 2005, pp. 8-11, 152-153.
International Search Report, PCT/JP2011/072295, dated Oct. 20, 2011, 5 pages.

* cited by examiner

<FROM LINEAR RUNNING TO BEGINNING OF TURNING>

(a) NORMAL VEHICLE         (b) FOUR-WHEEL ACTIVE STEER

<FROM TURNING TO RETURN TO LINEAR RUNNING>

(a) NORMAL VEHICLE    (b) FOUR-WHEEL ACTIVE STEER

FIG.6

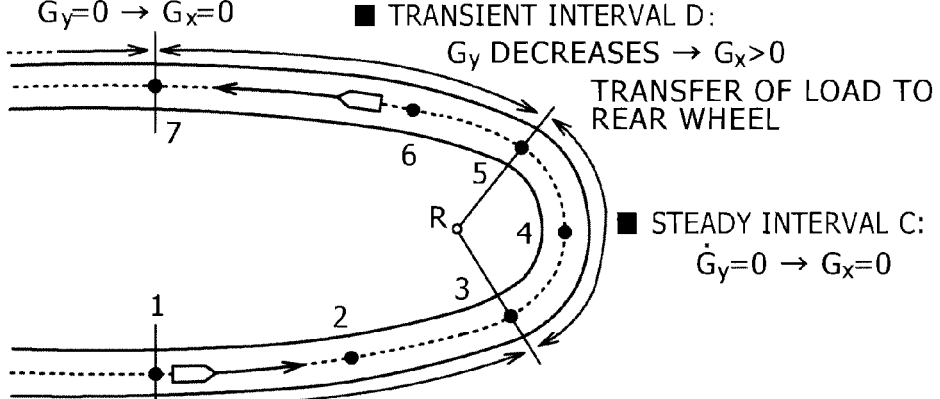

■ STRAIGHT RUNNING INTERVAL E:
　　$\dot{G}_y=0 \to G_x=0$
　　　　　　　　　　■ TRANSIENT INTERVAL D:
　　　　　　　　　　　　$G_y$ DECREASES → $G_x>0$
　　　　　　　　　　　　TRANSFER OF LOAD TO
　　　　　　　　　　　　REAR WHEEL ■ STEADY INTERVAL C:
　　$\dot{G}_y=0 \to G_x=0$ ■ TRANSIENT INTERVAL B:
　　$G_y$ INCREASES → $G_x<0$
　　TRANSFER OF LOAD TO
　　FRONT WHEEL ■ STRAIGHT RUNNING INTERVAL A:
　　$\dot{G}_y=0 \to G_x=0$ $$G_x = -\text{sgn}(G_y \cdot \dot{G}_y)\frac{C_{xy}}{1+T_s}|\dot{G}_y|$$
$$\approx -C_{xy}\dot{G}_y$$

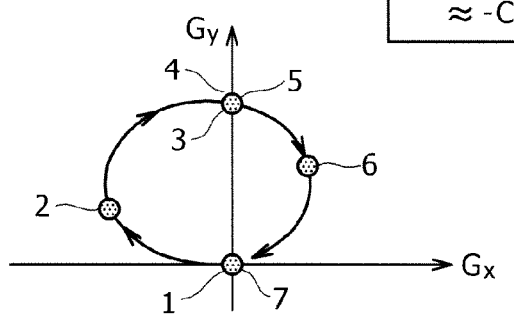

FIG. 8
<FROM LINEAR RUNNING TO BEGINNING OF TURNING>
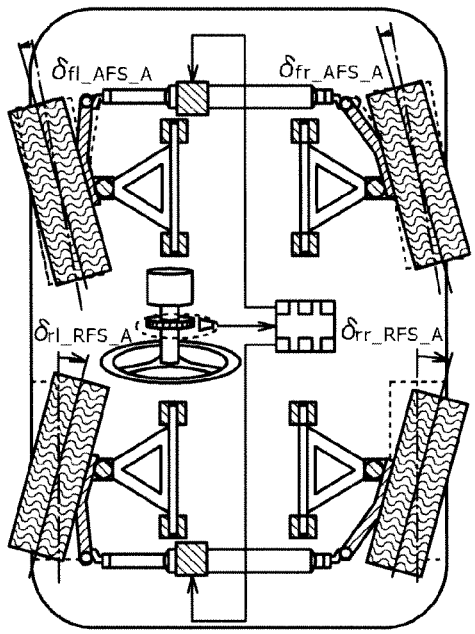
(a) FOUR-WHEEL ACTIVE STEER
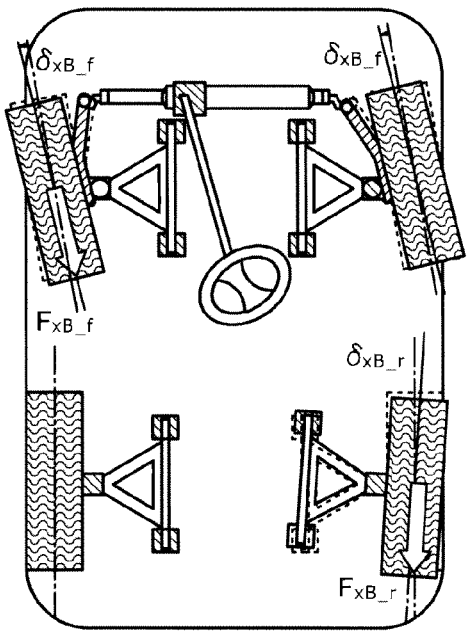
(b) DISTRIBUTION OF BRAKING FORCE ACCORDING TO PRESENT INVENTION
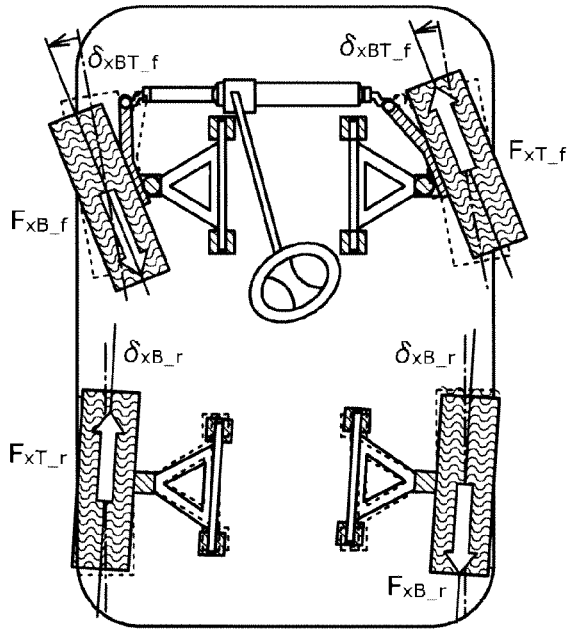
(c) DISTRIBUTION OF BRAKING FORCE / DRIVING FORCE ACCORDING TO PRESENT INVENTION

FIG. 9
<FROM TURNING TO RETURN TO LINEAR RUNNING>
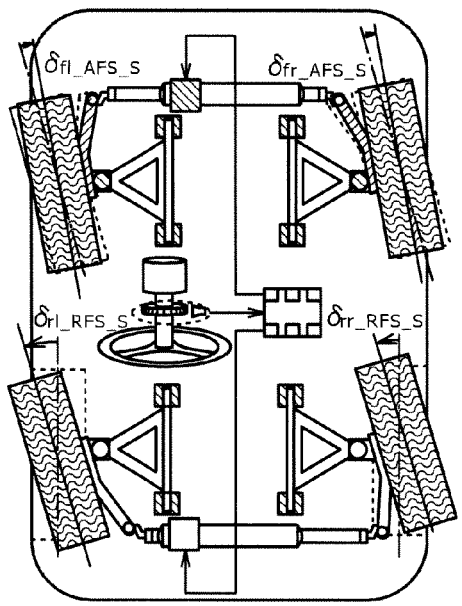
(a) FOUR-WHEEL ACTIVE STEER
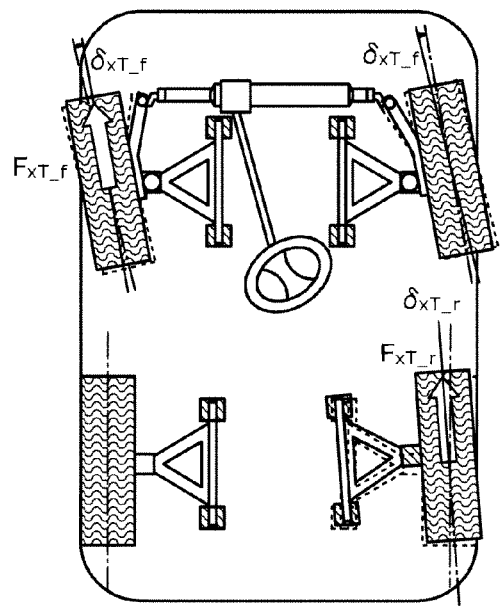
(b) DISTRIBUTION OF DRIVING FORCE ACCORDING TO PRESENT INVENTION
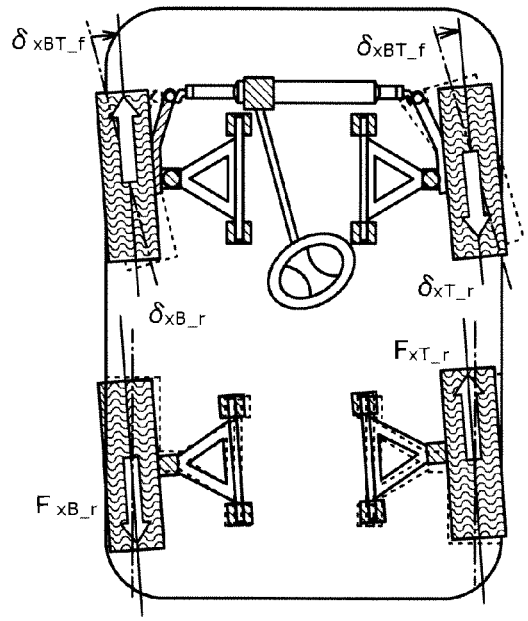
(c) DISTRIBUTION OF BRAKING FORCE / DRIVING FORCE ACCORDING TO PRESENT INVENTION

FIG. 18
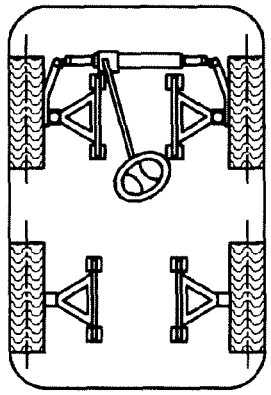
(a) SHOWS CONDITION OF 1
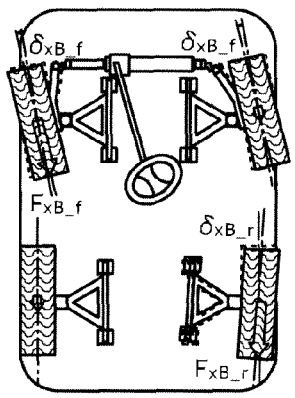
(b) SHOWS CONDITION OF 2
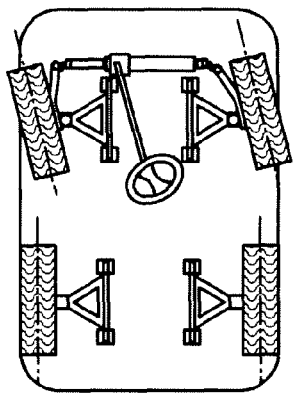
(c) SHOWS CONDITION OF 4
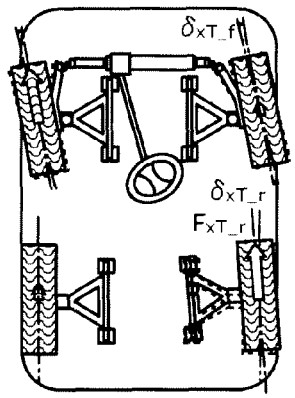
(d) SHOWS CONDITION OF 6
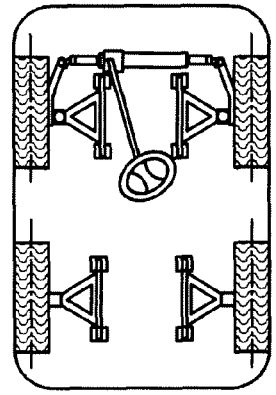
(e) SHOWS CONDITION OF 7

FIG.20
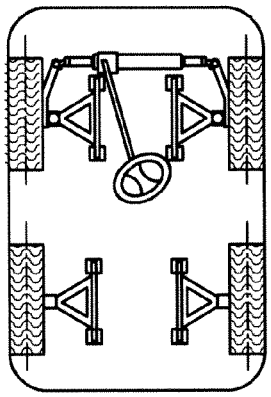
(a) SHOWS CONDITION OF 1
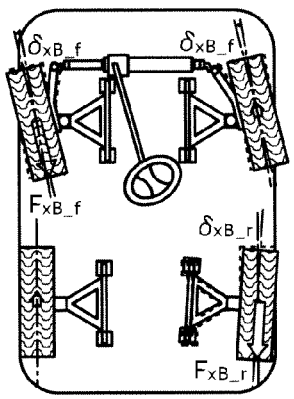
(b) SHOWS CONDITION OF 2
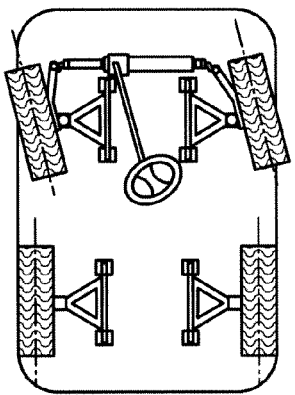
(c) SHOWS CONDITION OF 4
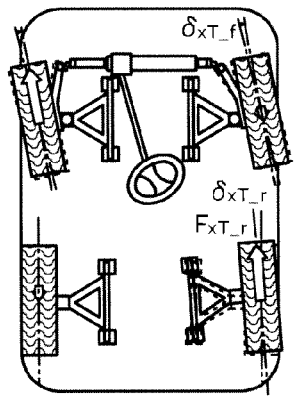
(d) SHOWS CONDITION OF 6
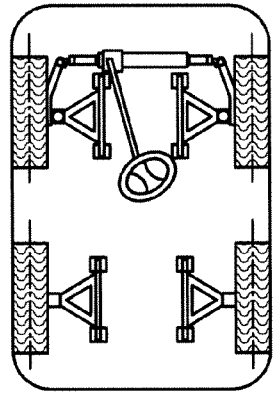
(e) SHOWS CONDITION OF 7

< VEHICULAR DATA >

| Symbol | Definition | Value |
| --- | --- | --- |
| m | Vehicle Mass | 1493.0kg |
| $m_s$ | Sprung Mass | 1373.0kg |
| $l_f$ | Dist.from C.G to front axle | 1.036m |
| $l_r$ | Dist.from C.G to rear axle | 1.630m |
| d | Wheel Tread | 1.480m |
| $h_s$ | Height of sprung mass C.G | 0.520m |

FIG.24
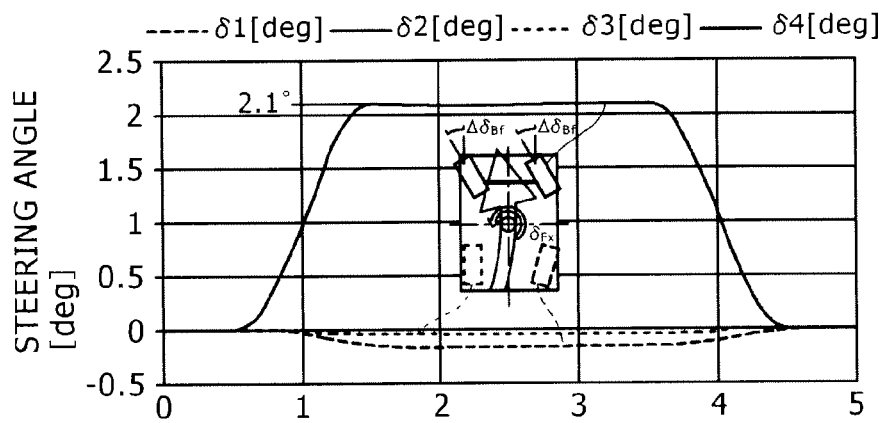
(a) NO CONTROL
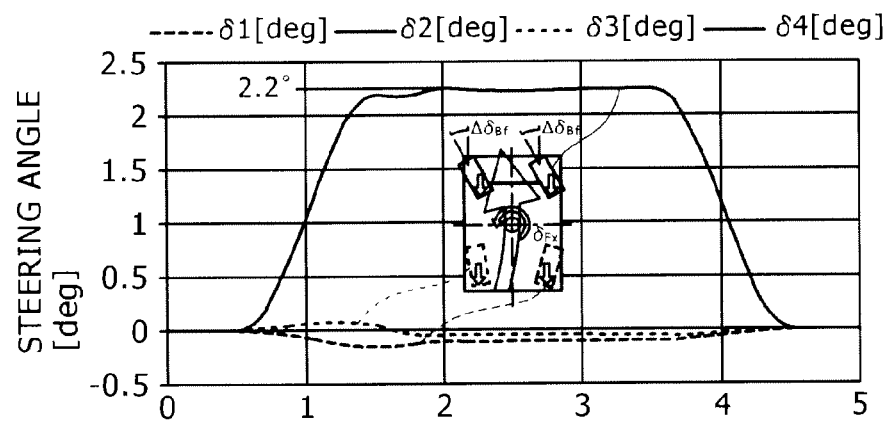
(b) ONLY G-VECTORING
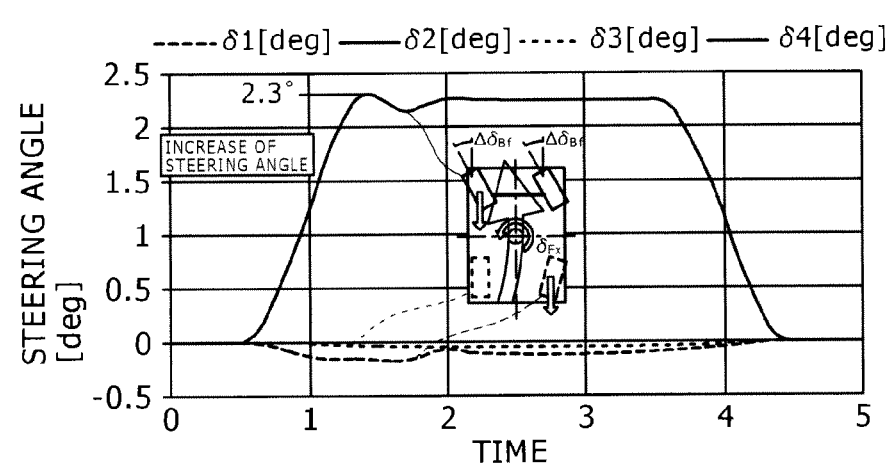
(c) PRESENT INVENTION (G-VECTORING AND DIAGONAL DISTRIBUTION)

FIG.27
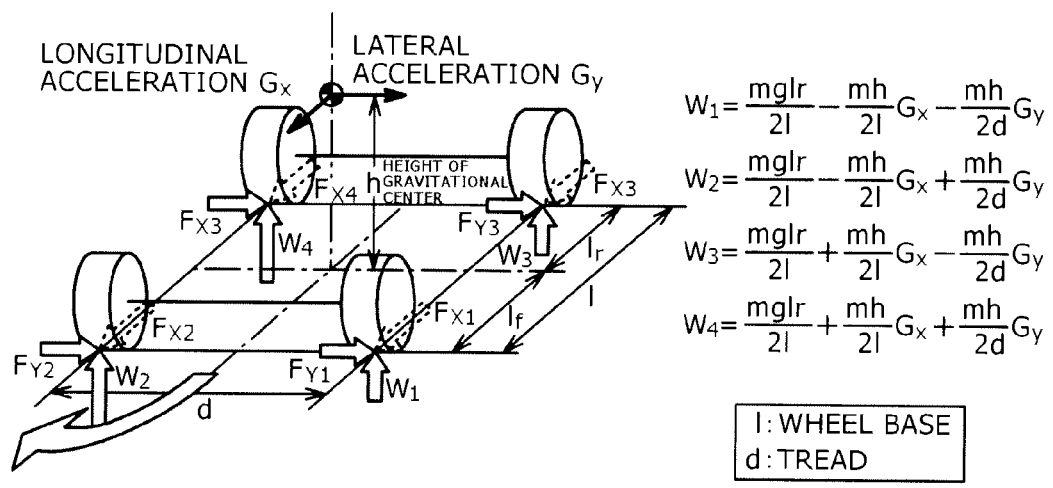
$$W_1 = \frac{mgl_r}{2l} - \frac{mh}{2l}G_x - \frac{mh}{2d}G_y$$
$$W_2 = \frac{mgl_r}{2l} - \frac{mh}{2l}G_x + \frac{mh}{2d}G_y$$
$$W_3 = \frac{mgl_r}{2l} + \frac{mh}{2l}G_x - \frac{mh}{2d}G_y$$
$$W_4 = \frac{mgl_r}{2l} + \frac{mh}{2l}G_x + \frac{mh}{2d}G_y$$
l : WHEEL BASE
d : TREAD
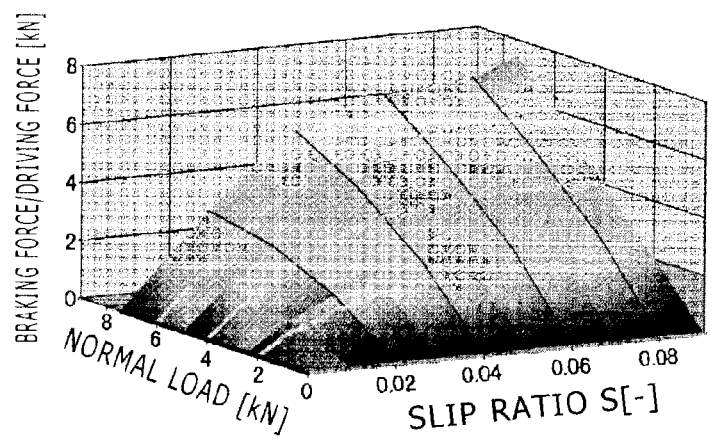

FIG.31
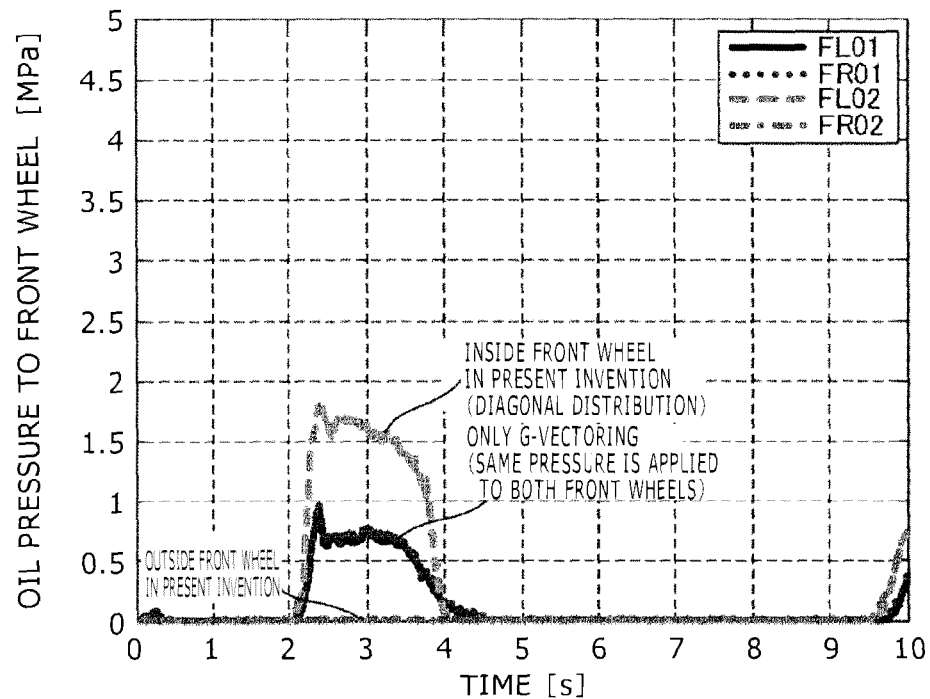
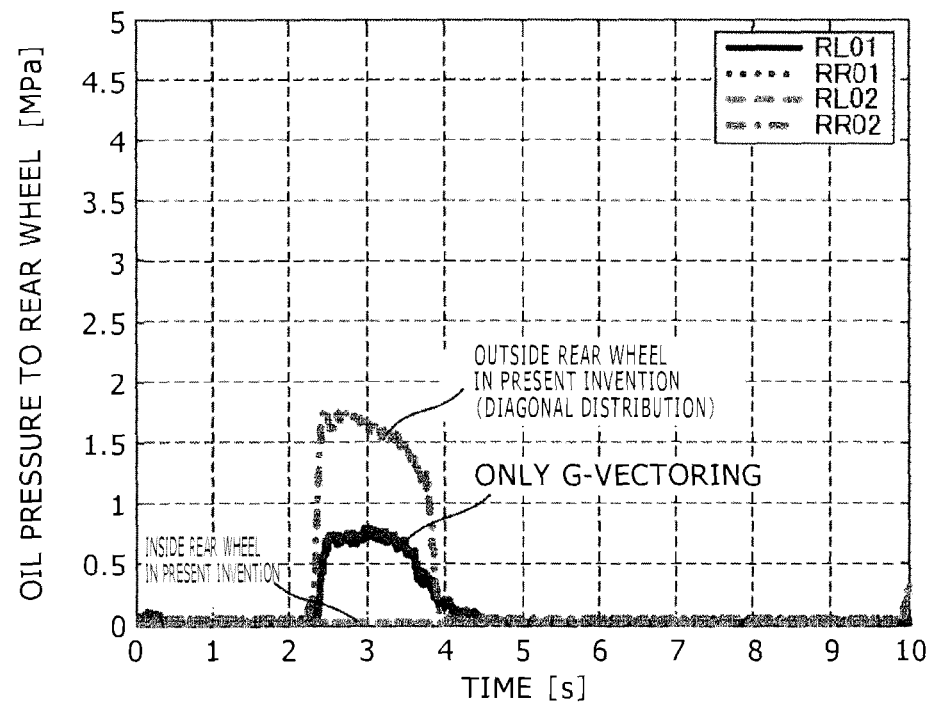

FIG.32
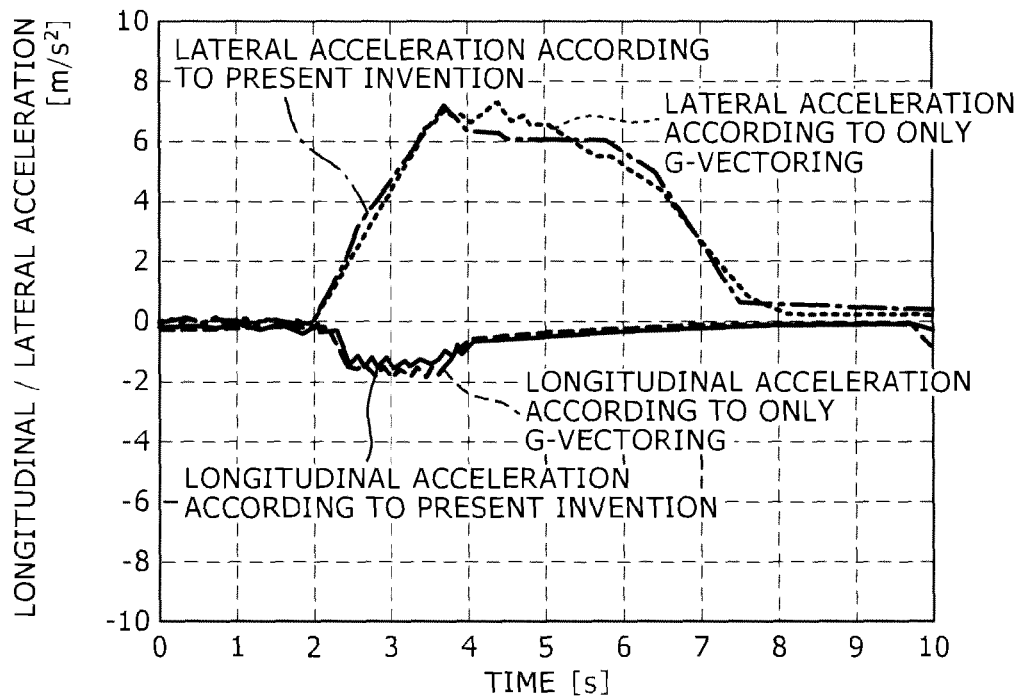
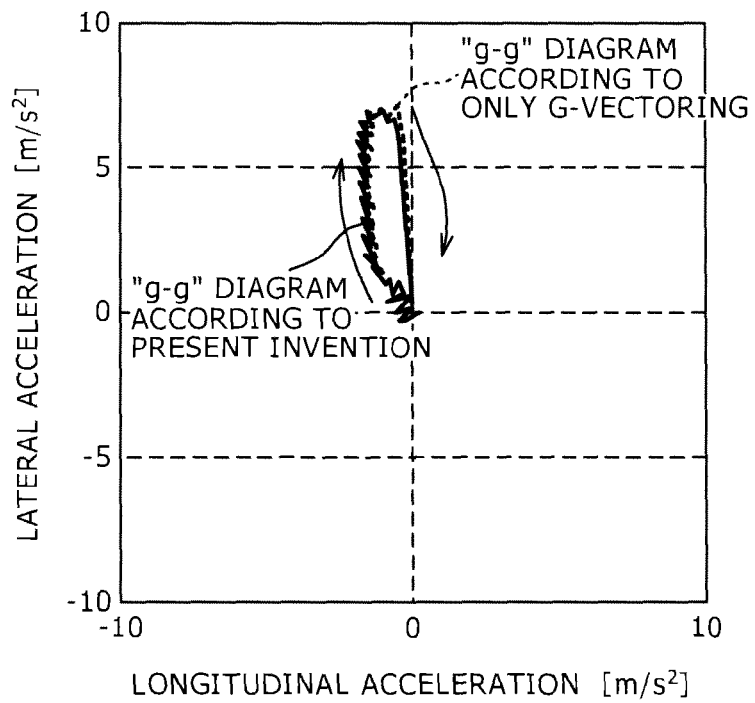

FIG.33
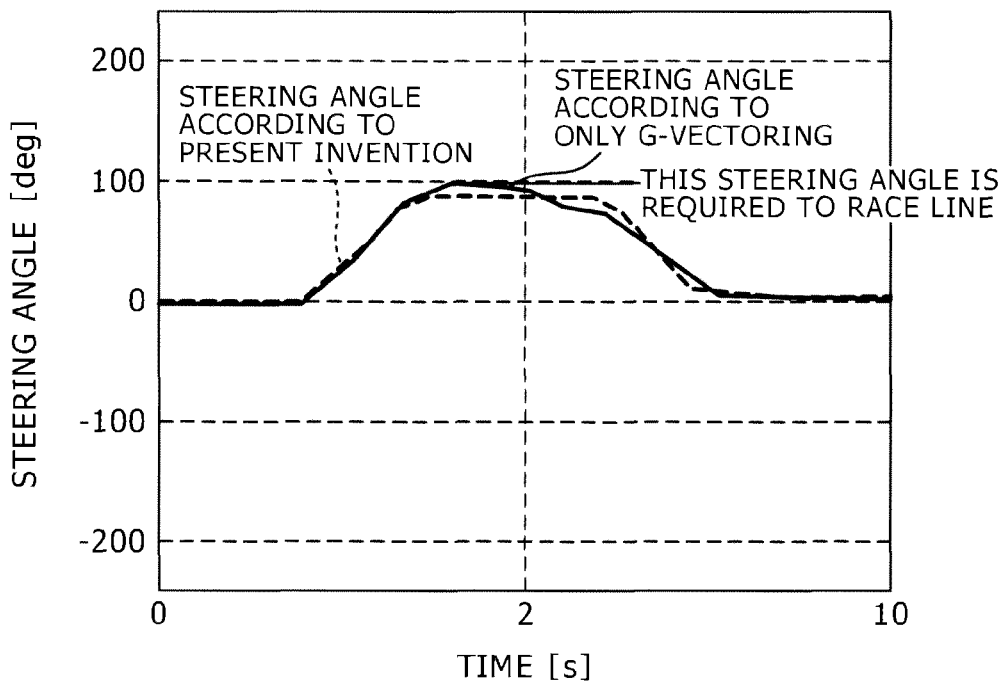
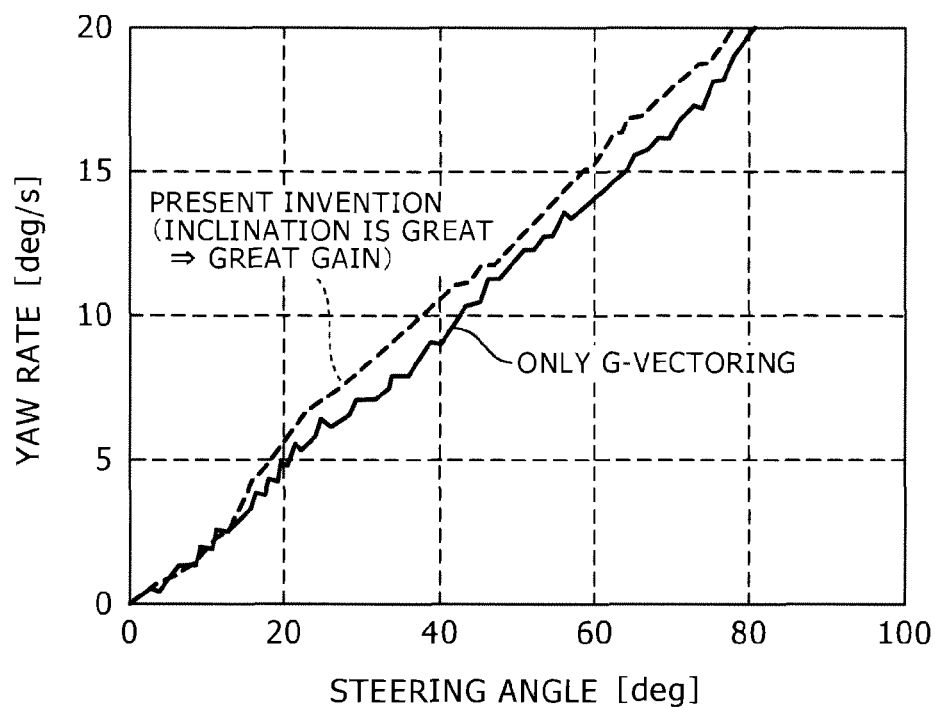

FIG.34
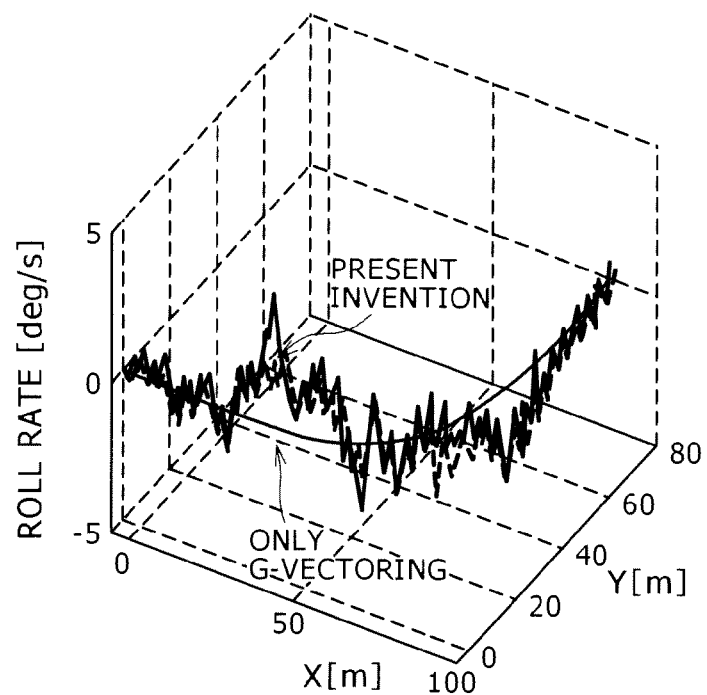
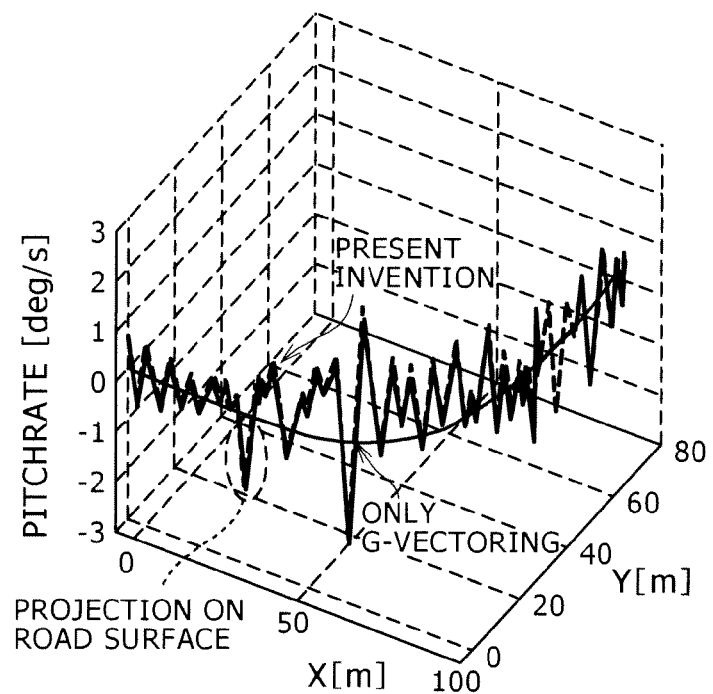

FIG.38
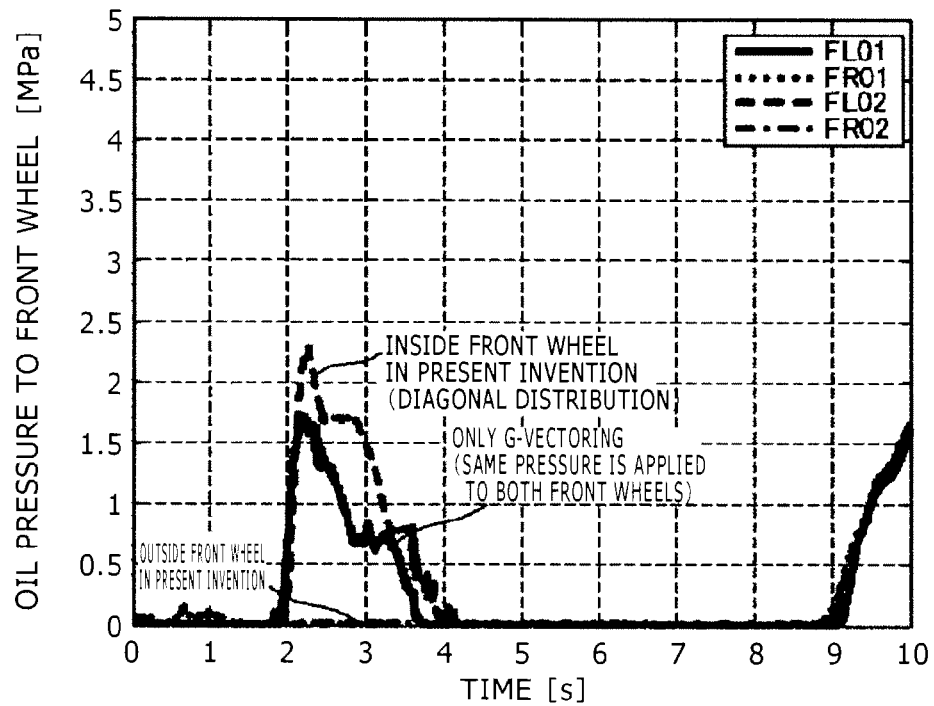
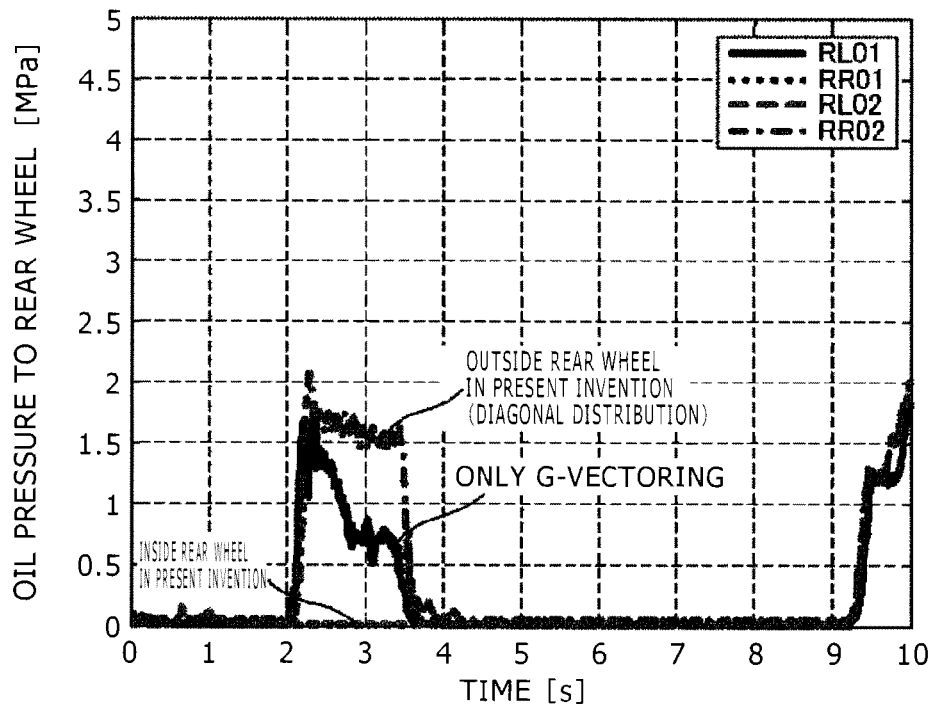

FIG.39
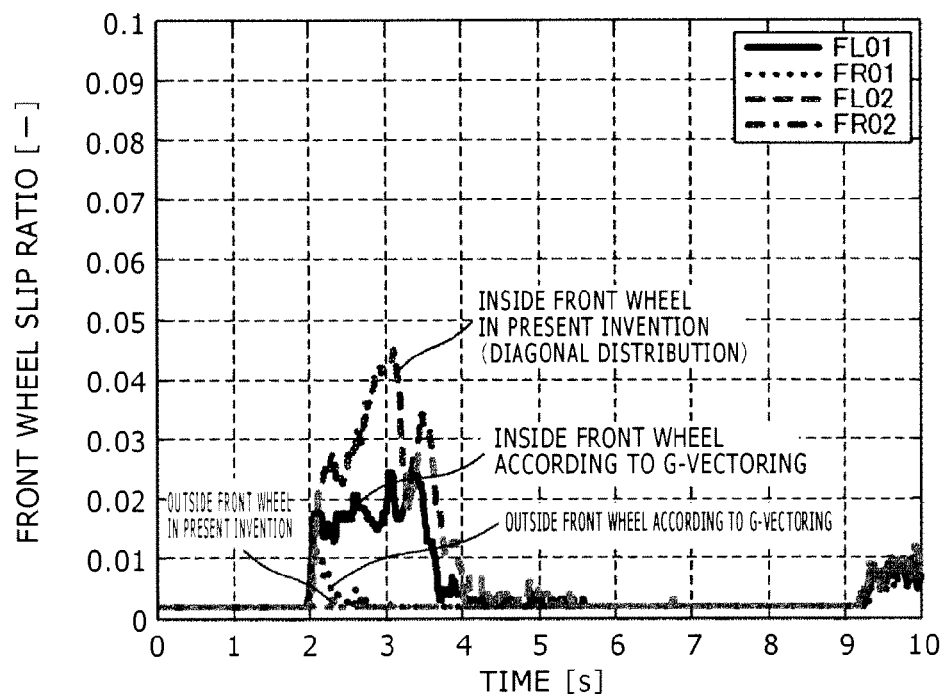
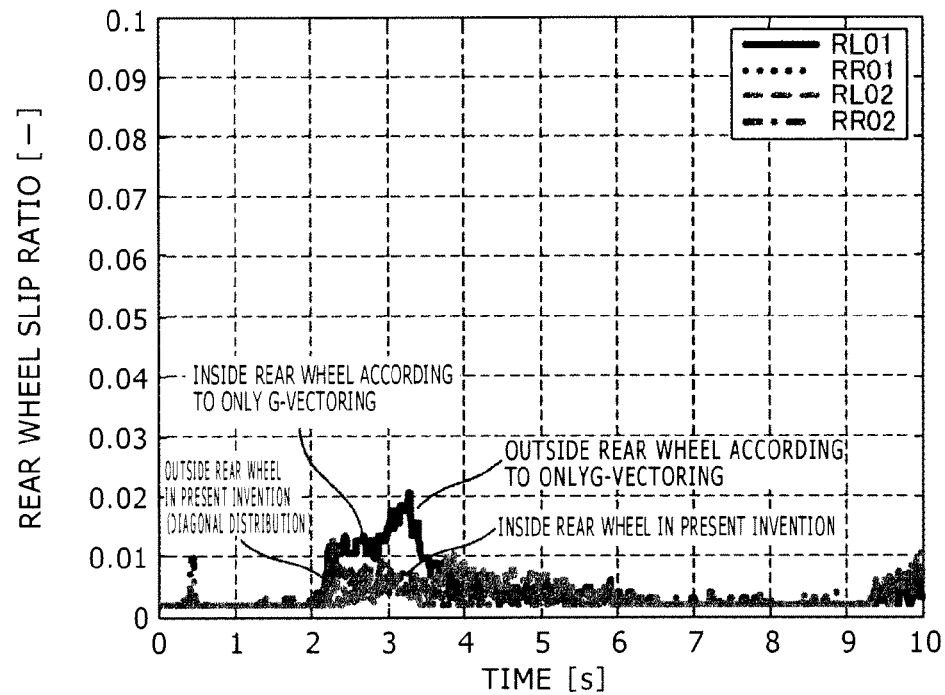

FIG.40
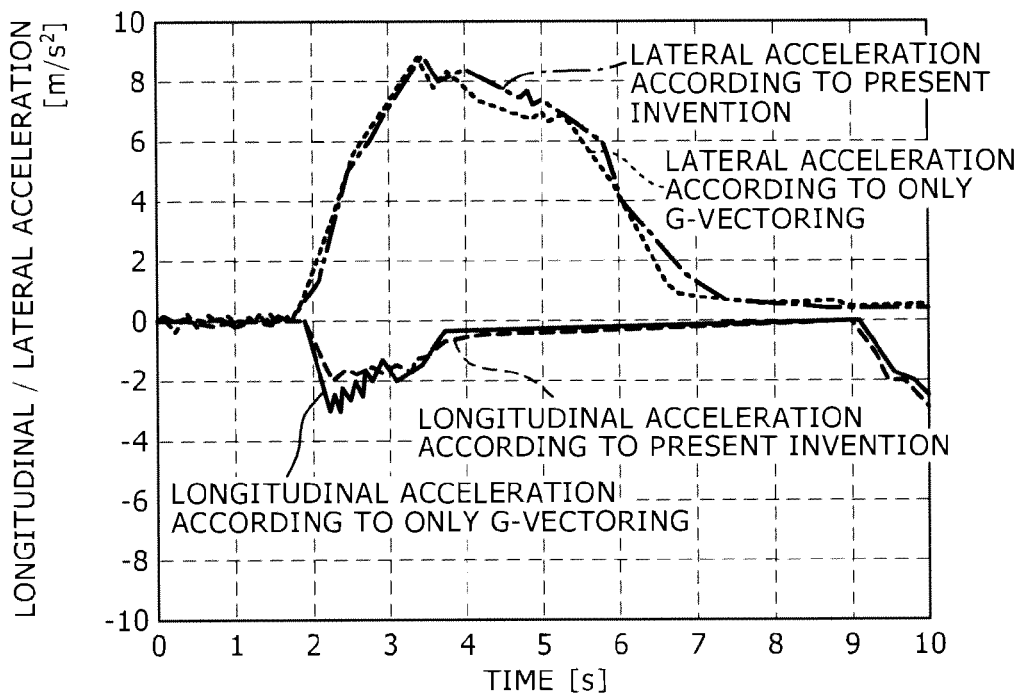
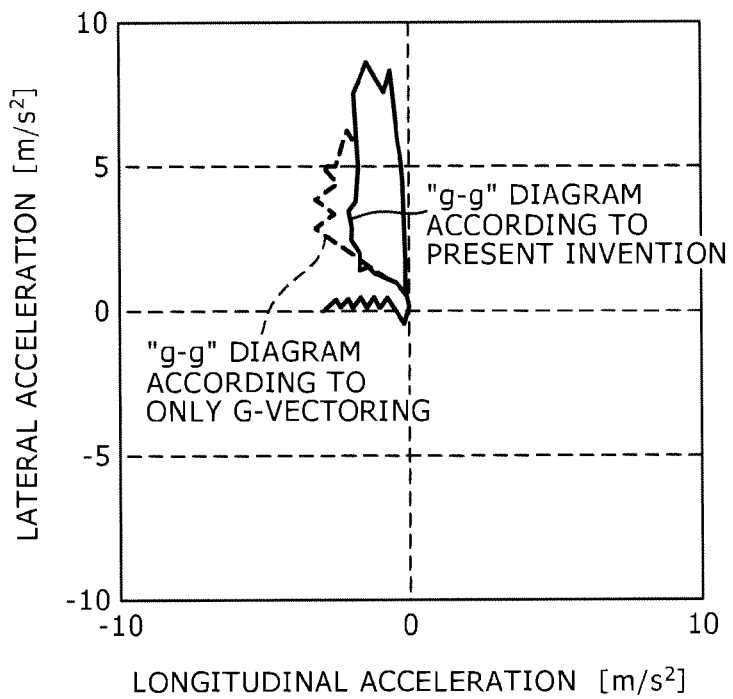

FIG.41
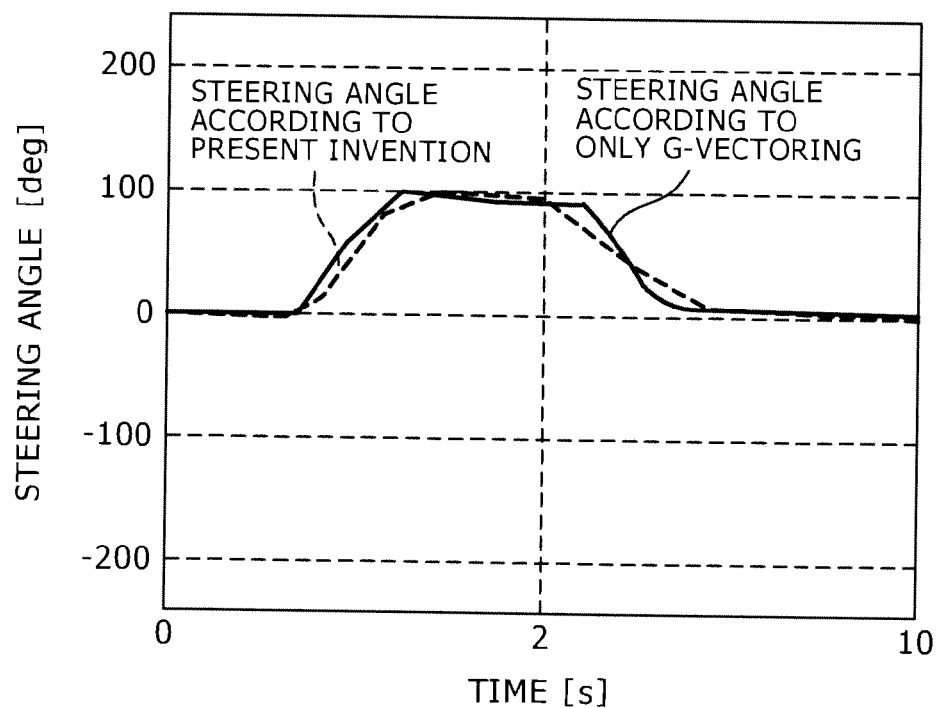
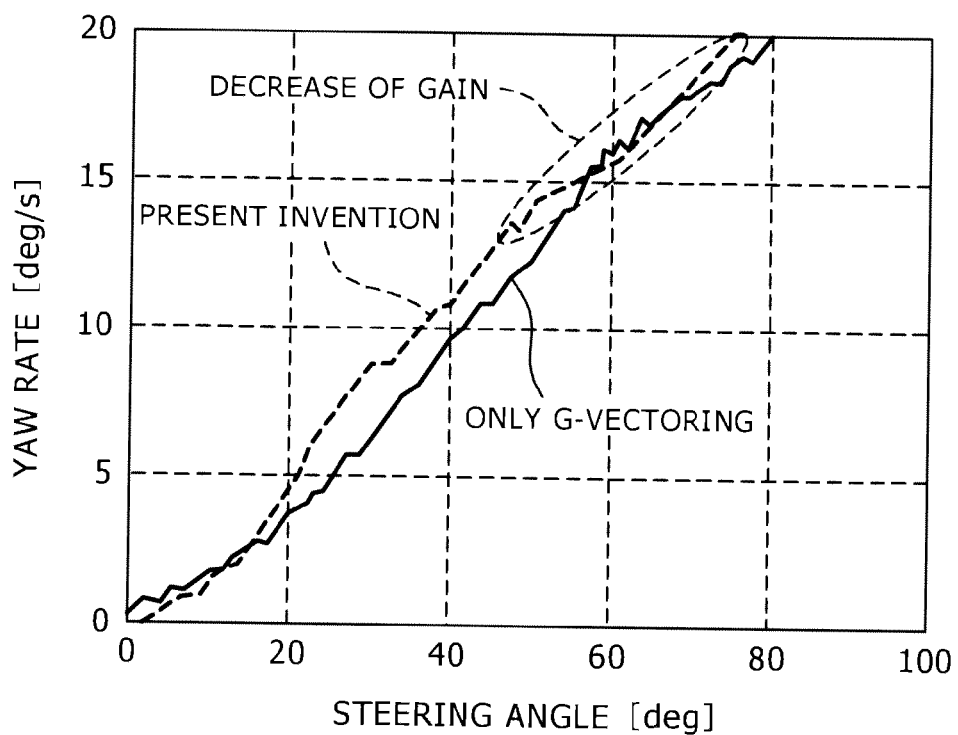

FIG. 50
<FROM LINEAR RUNNING TO BEGINNING OF TURNING>
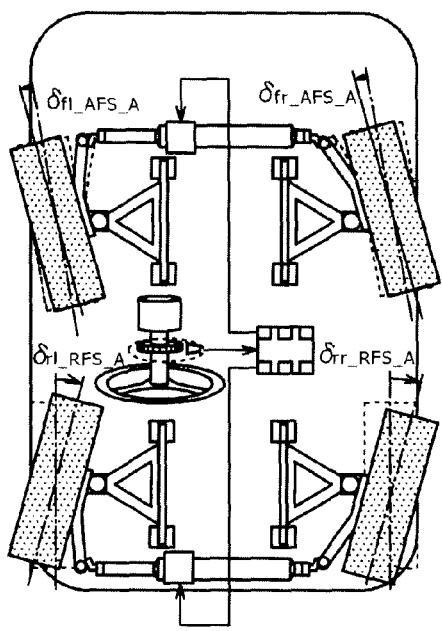
(a) FOUR-WHEEL ACTIVE STEER
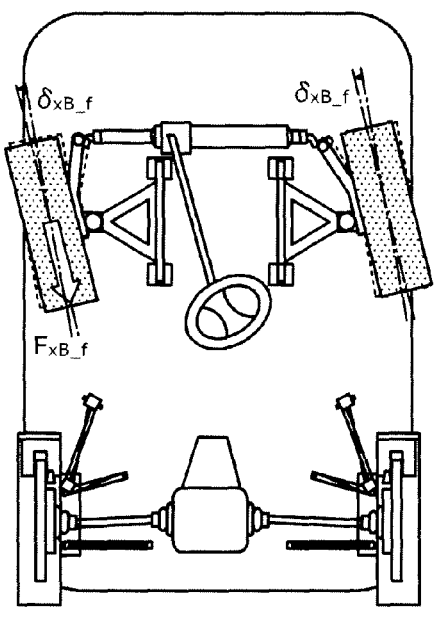
(b) DISTRIBUTION OF BRAKING FORCE ACCORDING TO PRESENT INVENTION
<FROM TRANSITION TO TURNING TO STEADY TURNING>
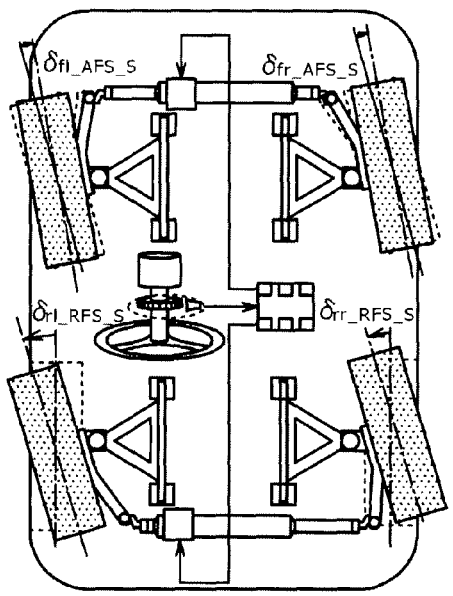
(c) FOUR-WHEEL ACTIVE STEER
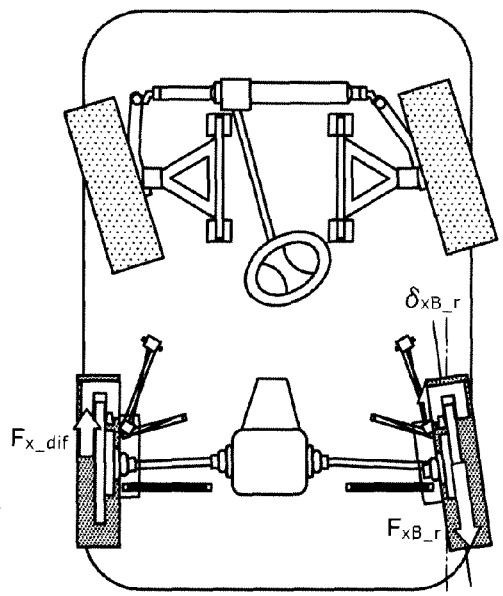
(d) DISTRIBUTION OF DRIVING FORCE ACCORDING TO PRESENT INVENTION FIG.52
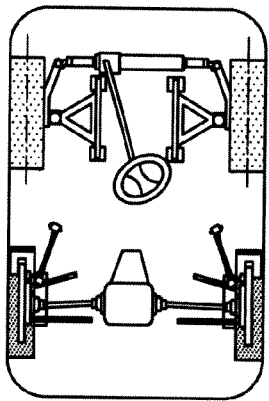
(a) SHOWS CONDITION OF 1
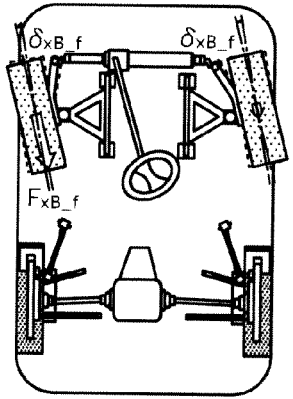
(b) SHOWS CONDITION OF 2
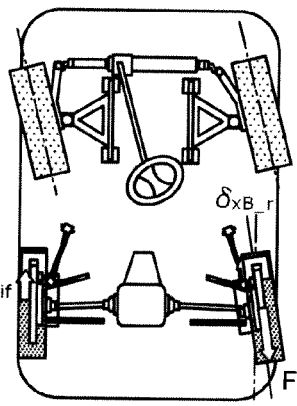
(c) SHOWS CONDITION OF 3
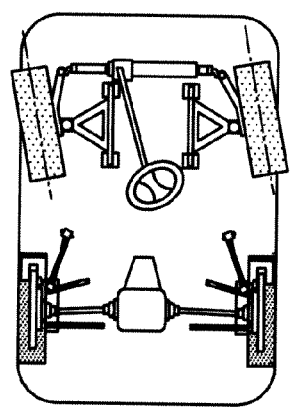
(d) SHOWS CONDITION OF 4
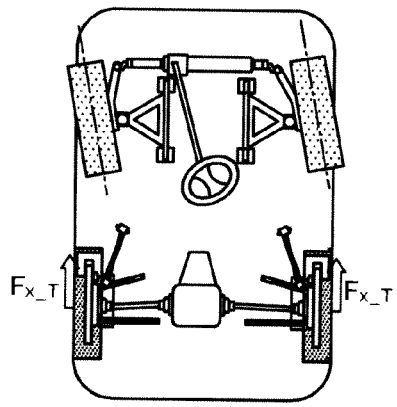
(e) SHOWS CONDITION OF 6
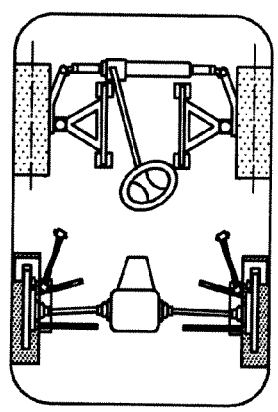
(f) SHOWS CONDITION OF 7

MOTION CONTROL SYSTEM OF VEHICLE

TECHNICAL FIELD

The present invention relates to a vehicular motion control system based upon braking force and driving force.

BACKGROUND ART

The enhancement of the maneuverability and the stability of a vehicle is an eternal challenge for researchers related to a motion of a vehicle. Currently, the following three methods are proposed from Japan to the world.

(1) Four-Wheel Active Steer System

A patent literature 1 is based a four-wheel active steer system provided with a front-wheel active steer means that applies an auxiliary steering angle to a front wheel, a rear-wheel active steer means that applies an auxiliary steering angle to a rear wheel and a four-wheel active steer control means that instructs both active steer means to apply the auxiliary steering angle to be a desired vehicular behavior characteristic so as to provide the four-wheel active steer system that applies no steering load onto a driver, and discloses that a steered state sensing means that senses a state steered by the driver, a response estimating means that estimates a response of at least either of the front-wheel and the rear-wheel active steer means and a response changing means that changes the other response according to the variation of the sensed steered state and the estimated one response are provided. A nonpatent literature 1 discloses that both yawing and a lateral motion can be optimized by actively steering both the front wheel and the rear wheel. For example, the nonpatent literature 1 discloses that all yawing (turning round a vehicle), the enhancement of a lateral acceleration response and the reduction of a skid of a vehicle body can be all realized by turning the front wheel by operating a steering at medium speed and also steering the rear wheel in the same direction at the same time. Especially, a nonpatent literature 8 discloses that immediately before steady turning, that is, after a yaw rate required for turning is acquired, the rear wheel is steered in same phase and stability is secured.

The four-wheel active steer systems disclosed in the patent literature 1 and the nonpatent literature 1 are respectively configured by respective actuators for actively steering the front wheel and the rear wheel and two electronic control units (ECU). The actuator for steering the front wheel is configured by parts such as a motor to be a driving source, a reduction mechanism, a turning angle sensor, a locking mechanism and a spiral cable for power supply. The actuator for steering the rear wheel is attached to a suspension member and steers the rear wheel via a suspension lower link after the rotation of a motor is converted to a translation motion in the deceleration mechanism.

(2) Direct Yaw-Moment Control (DYC)

Besides, in a patent literature 2, it is disclosed that the yaw moment is controlled by distributing driving force or braking force between right and left wheels of a vehicle, a feed-forward control device estimates a driving force distributed amount $\Delta T$ at which a yaw rate corresponding to a cornering behavior of the vehicle is acquired based upon engine torque, engine speed, vehicle speed, a steering angle and lateral acceleration so as to make a response and the precision of control compatible and feed-forward controls left and right hydraulic clutches CL, CR in a driving force distribution system. In the meantime, a feed-back control device calculates a deviation between a target yaw rate calculated based upon vehicle speed and lateral acceleration and an actual yaw rate sensed by a yaw rate sensor 10d and corrects the driving force distribution amount $\Delta T$ calculated in the driving force distribution system so as to make the deviation converge on zero. It is disclosed that even if the driving force distribution amount becomes excessive by feed-forward control and a trend of oversteer is caused in a vehicle, the trend of oversteer is eliminated by feed-back control and a behavior of the vehicle can be stabilized (refer to a nonpatent literature 2).

That is, a rear drive unit which is a DYC system and which is disclosed in the patent literature 2 and the nonpatent literature 2 is configured by parts such as a speed increasing gear unit including a high-low clutch, a planetary gear and an oil pump, a hypoid gear that converts a direction of drive, two right and left electromagnetic clutches and a planetary gear so as to make the distribution of torque between the right and left sides of a rear wheel free.

(3) G-Vectoring

A method of generating a load shift between a front wheel and a rear wheel by automatically accelerating or decelerating in coordination with a lateral motion by operating a steering and enhancing the maneuverability and the stability of a vehicle is also disclosed in a nonpatent literature 3.

An acceleration/deceleration command value for automatically accelerating or decelerating (target longitudinal acceleration $G_{xc}$) is acquired in the following mathematical expression 1.

[Mathematical expression 1]

$$G_{xc} = -\text{sgn}(G_y \cdot \dot{G}_y)\frac{Cxy}{1+Ts}|\dot{G}_y| + G_{x\_DC} \quad \text{(Mathematical expression 1)}$$

Basically, the above-mentioned command value complies with a simple control rule that a value acquired by multiplying a lateral jerk $G_{y\_dot}$ by gain $C_{xy}$ and applying a first-order lag is used for a longitudinal acceleration/deceleration command.

However, Gy: vehicular lateral acceleration, Gy_dot (|Ġy|): vehicular lateral jerk, Cxy: gain, T: first-order lag time constant, s: Laplace operator, $G_{x\_DC}$: offset.

It is verified in a nonpatent literature 4 that hereby, a part of coordination control strategy of a lateral motion and a longitudinal motion of an expert driver can be simulated and the enhancement of the maneuverability and the stability of a vehicle can be realized. $G_{x\_DC}$ in this expression is a deceleration component (an offset) not linked with a lateral motion. The $G_{x\_DC}$ is a term required in a case of foreseen deceleration when a corner exists in front or when an interval speed command is issued. Besides, sgn (signum) is a term provided to acquire the above-mentioned operation both at a right corner and at a left corner. Concretely, operation that speed is decreased when steering is started and a turn is started, deceleration is stopped in steady cornering (because a lateral jerk is zero) and speed is accelerated when return in steering is started and in escape from a corner can be realized.

As in such control, resultant acceleration (expressed with G) of longitudinal acceleration and lateral acceleration is vectored to have curved transition in the elapse of time in a diagram having vehicular longitudinal acceleration on an axis of abscissas and having vehicular lateral acceleration on an axis of ordinates, the control is called G-Vectoring control.

CITATION LIST

Patent Literature

[Patent Literature 1] Japanese Unexamined Patent Application Publication No. 2008-80840

[Patent Literature 2] Japanese Unexamined Patent Application Publication No. Hei9(1997)-309357
[Patent Literature 3] Japanese Unexamined Patent Application Publication No. 2008-201358

Nonpatent Literature

[Nonpatent Literature 1] T. Katayama; Y. Anno; T. Taneda; M. Sao; M. Imamura; S. Sekinaga; Y. Sato: Development of four-wheel active steer, Society of Automotive Engineers of Japan, Inc., Proc. before scientific lecture meeting, document No.: 20075281 No. 11-07 pp. 7-12, May, 2007.
[Nonpatent Literature 2] Shibahata, Y.; Tomari, T; and Kita, T.; SH-AWD: Direct Yaw Control (DYC), 15. Aachener Kolloquium Fahrzeug-und Motorentechinik, p. 1627, 1640, 1641, 2006.
[Nonpatent Literature 3] M. Yamakado, M. Abe: Improvement of Vehicle Agility and Stability by G-Vectoring Control, Proc. of AVEC2008-080420.
[Nonpatent Literature 4] M. Yamakado, M. Abe: Proposal of the longitudinal driver model in coordination with vehicle lateral motion based upon jerk information, Review of Automotive Engineering, Vol. 29, No. 4, October 2008, pp. 533 to 541.
[Nonpatent Literature 5] K. Mori; T. Eguchi; N. Irie: Enhancement of agility and stability by control over transition of steering rear wheel, Society of Automotive Engineers of Japan, Automobile technology, Vol. 44, No. 3, 1990

SUMMARY OF INVENTION

Technical Problem

In techniques disclosed in the patent literatures 1, 2 and the nonpatent literatures 1, 2, the maneuverability of a vehicle is enhanced by operating a steering actuator by electricity or oil pressure and independently applying driving force to right and left wheels, that is, applying energy to them.

Further, the weight of the vehicle increases when plural intricate mechanisms are mounted in the vehicle and the cost of the vehicle also increases. Besides, minute control tuning is required to be executed in running tests to be suited to an individual vehicle and this also increases the cost of the vehicle. Especially, as in the DYC, interrupt by control is allowed independent of a motion of the vehicle, the control has a degree of freedom in the interrupt. As it is different depending upon a condition of each motion in each vehicle at which timing and how the yaw moment is to be applied, a man-hour of tuning is apt to greatly increase.

In the meantime, control disclosed in the nonpatent literatures 3, 4 is automatic control over a normal brake or a normal accelerator, low-priced configuration can be expected, and in addition, there is also no increase of weight. Besides, the maneuverability of a vehicle can be enhanced, generating energy by making regenerative control using an electric motor for a brake. In addition, this control method is extracted from braking and accelerating operation according to steering operation performed by an expert driver as required and there is hardly a sense of incompatibility even if interrupt is automatically made from a normal driving situation. The dynamical rationality of this control method and the enhancement of maneuverability and stability are demanded as a result of simulation and as a result of vehicle tests.

As acceleration and deceleration are controlled in linkage of them so that the behavior of the vehicle suitably responds to the steering operation of the driver, a slip angle of the vehicle can be prevented from increasing as a result. Especially, the control is effective to reduce so-called understeer in which a radius of turning too increases for steering.

However, as a steering angle input to the vehicle and the yaw moment applied to the vehicle are not directly controlled, there is a problem that great effect is not necessarily acquired, compared with four-wheel active steer disclosed in the patent literature 1 and the nonpatent literature 1 and a DYC system disclosed in the patent literature 2 and the nonpatent literature 2.

Besides, control disclosed in the nonpatent literatures 3, 4 has a problem that the effect of the transfer of a tire vertical load and lateral force by longitudinal force are deteriorated when a vehicle is stabilized and control over the accelerating control is securely required in a front-wheel-drive vehicle. This method shows effect in escape from a corner, however, when stability is required in the latter half of a condition of transition from the start of turning to steady turning, the consistency of deceleration and acceleration is not acquired and it is required to decrease gain in a range in which stability can be secured.

An object of the present invention is to provide a low-priced and light vehicular motion control system that enables enhancing maneuverability, stability and further, ride comfort.

Solution to Problem

To achieve the object, the motion control system of a vehicle according to the present invention is provided with a control means that independently controls the driving force and/or the braking force of each of four wheels and a turning direction sensing means that senses a turning direction, the control means is provided with an acceleration/deceleration command generation means that generates an acceleration/deceleration command based upon a sensed steering angle and sensed vehicle speed and a driving force/braking force distribution means that determines the distribution of driving force or driving torque and/or braking force or braking torque of each wheel, and the driving force/braking force distribution means determines so that more driving force or more driving torque and/or more braking force or more braking torque are/is distributed to the inside front wheel in turning than the outside front wheel in turning based upon the acceleration/deceleration command and the turning direction and more driving force or more driving torque and/or more braking force or more braking torque are/is distributed to the outside rear wheel in turning than the inside rear wheel in turning based upon the acceleration/deceleration command and the turning direction.

Advantageous Effects of Invention

The low-priced light weight vehicular motion control system that enables enhancing maneuverability, stability and further, ride comfort can be realized.

BRIEF DESCRIPTION OF DRAWINGS

FIG. 6 shows a situation from approach to a left corner to escape of a vehicle to which G-Vectoring control is applied;

FIG. 8 shows the comparison relating to the four-wheel active steer vehicle, the distribution of braking force according to the present invention and the distribution of braking force/driving force according to the present invention in a condition from linear running to the beginning of turning;

FIG. 9 shows the comparison relating to the four-wheel active steer vehicle, the distribution of braking force according to the present invention and the distribution of braking force/driving force according to the present invention in a condition from turning to return to linear running;

FIG. 18 shows the distribution of braking force and driving force and a steering angle in the vehicle under the control according to the present invention at each time shown in FIG. 17;

FIG. 20 shows braking/driving force simultaneous distribution and a steering angle at each time shown in FIG. 19 in the vehicle under the control according to the present invention;

FIG. 24 shows results in comparison in a steering angle of the full vehicle simulation;

FIG. 27 shows the transfer of a load by longitudinal/lateral acceleration and a characteristic of a tire;

FIG. 31 compares the distribution of oil pressure to a brake of the present invention and the conventional type control;

FIG. 32 compares the longitudinal acceleration and the lateral acceleration of the present invention and the conventional type control;

FIG. 33 compares a steering angle and yaw rate gain of the present invention and the conventional type control;

FIG. 34 compares a roll rate and a pitch rate of the present invention and the conventional type control;

FIG. 38 compares the distribution of oil pressure to the brake of the present invention and the conventional type control;

FIG. 39 compares slip ratio of the present invention and the conventional type control;

FIG. 40 compares longitudinal acceleration and lateral acceleration of the present invention and the conventional type control;

FIG. 41 compares a steering angle and yaw rate gain of the present invention and the conventional type control;

FIG. 50 shows a best mode of the vehicle in the third embodiment of the present invention;

FIG. 52 shows a control mode at each timing of the vehicle in the third embodiment of the present invention;

DESCRIPTION OF EMBODIMENTS

Figure 1:
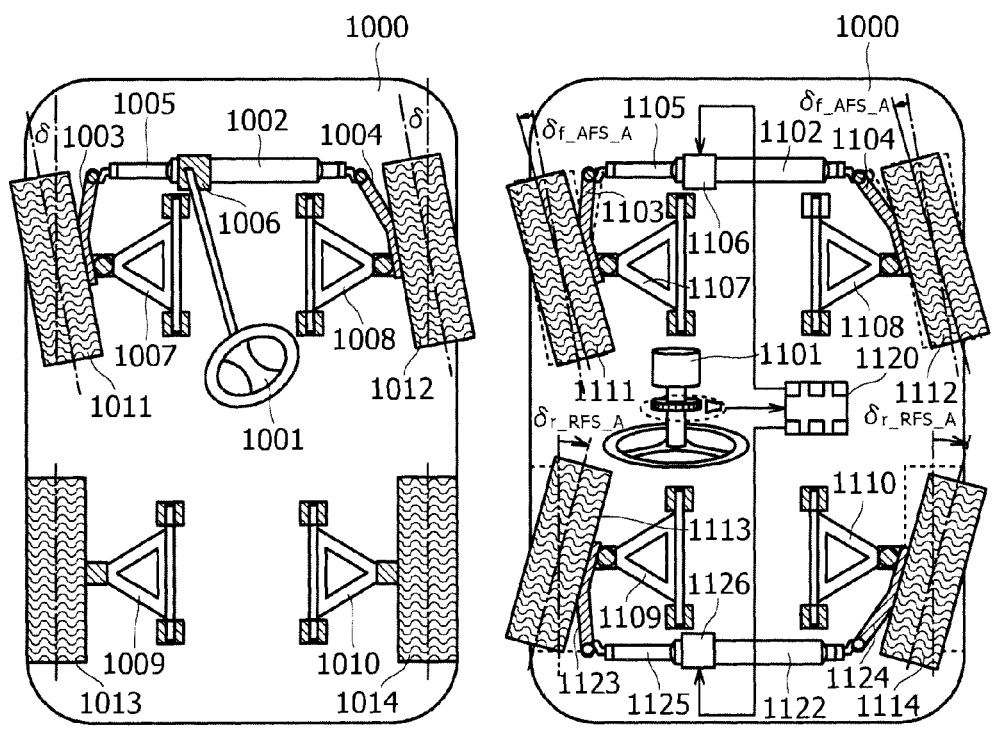
FIG. 1 shows the comparison between a normal vehicle and a four-wheel active steer vehicle in a condition from straight-line running to the beginning of turning.

In the present invention, a steering angle to be input to a vehicle is required to be correctly controlled at each stage including a stage of a start of turning from a straight line, a stage of steady turning from the start of turning and a stage of escape from the steady turning to the straight line without a complex steering actuator.

Besides, especially in (i) a vehicle having a rear-wheel longitudinal force toe-in characteristic using a multi-link suspension and others and (ii) a vehicle provided with a differential gear between rear right and left wheels respectively recently often seen in a rear-wheel-drive vehicle, the management of not only a steering angle but side torque via the differential gear is required.

Concretely, a guideline for steering angle control at each stage in four-wheel active steering will be described below and a guideline of drive control by referring to the guideline will be described below.

(1) Stage from a Straight Line to a Start of Turning

A largish steering angle is applied by applying additional steering by control in addition to input from a driver and a rear wheel is effective for so-called antiphase steering in which the rear wheel is steered in a reverse direction to a front wheel to acquire nimble feeling (a nimble response).

(2) Stage from the Start of Turning to Steady Turning

As a lateral acceleration response is deteriorated and a slip angle of a vehicle body also increases when the antiphase steering is kept, the additional steering by control over the front and rear wheels is turned zero when steady turning is started.

(3) Stage from the Steady Turning to Escape

An additional steering angle is applied to the front wheel so that a steering angle of the front wheel decreases prior to a steering angle at which the driver returns a steering. The rear wheel acquires a slip angle of a tire by being steered in phase with the front wheel and more rear-wheel cornering force is generated. As in such control, the moment to return from turning to linear running increases in the vehicle, the control is effective to enhance stability.

To acquire effects by the steering angle control (1) to (3) without an actuator for steering, the present invention has configuration that compliance steer caused by the compliance of suspension applied to a passenger car so as to enhance the ride comfort of the vehicle is actively controlled by braking force and driving force. The compliance steer is basically caused because of the shortage in rigidity of the suspension of the tire to braking force and driving force, a steering angle is introrsely generated because the tire is displaced forward for the vehicle when driving force or driving torque is applied, when braking force or braking torque is applied, the tire is displaced backward for the vehicle, and a steering angle is extrorsely generated. Especially, as the front wheel is provided with a steering mechanism, the front wheel has more factors that cause the following compliance steer, compared with the rear wheel fixed substantially in a traveling direction of the vehicle body.

(i) Compliance steer caused by the torsional rigidity of a steering column and the installation rigidity of a steering rack for example even if a steering angle is fixed (ii) Compliance steer in the wide sense in which a steering angle on the driver's side increases and decreases by the moment around a king pin axis generated by braking/driving torque and which results from the shortage in rigidity of an arm (on the input side) of the driver In the present invention, these two factors are called compliance steer in total.

As described above, the compliance steer is apt to be interpreted as caused by an external factor, however, it can be said that if only driving force or driving torque and braking force or braking torque can be suitably distributed to four wheels at each stage of (1) to (3), a steering angle can be controlled.

Concretely, a sensing means of a turning direction is provided, based upon the accelerating/braking operation of a driver or an acceleration/deceleration command (an acceleration command, a deceleration command) from a control device or both, for the front wheel, more driving force/driving torque and/or more braking force/braking torque are/is distributed to the inside wheel in turning, and for the rear wheel, more driving force/driving torque and/or more braking force/braking torque are/is distributed to the outside wheel in turning.

Besides, the above-mentioned distribution is required to be changed according to each stage of (1) to (3) and an appropriate controlled variable and switching timing every stage can be acquired by using G-Vectoring control in which a control command is determined based upon the variation of the stage of turning, that is, the variation of lateral acceleration and a lateral jerk.

In the meantime, in the above-mentioned method of distributing more driving force/driving torque or more braking force/braking torque to the inside front wheel in turning, when a load is displaced between the right and left wheels and a load of the inside wheel decreases in a case that lateral acceleration increases, a problem that the slip ratio of the inside wheel increases and deceleration cannot be acquired occurs. This problem can be avoided by correcting so that difference in driving force/driving torque or braking force/braking torque between the inside front wheel and the outside front wheel in turning and difference in driving force/driving torque or braking force/braking torque between the outside rear wheel and the inside rear wheel in turning are smaller when a preset threshold in lateral acceleration or longitudinal acceleration or both is exceeded. Or the problem can be settled by correcting so that the difference in driving force/driving torque or braking force/braking torque between the inside front wheel and the outside front wheel in turning and the difference in driving force/driving torque or braking force/braking torque between the outside rear wheel and the inside rear wheel in turning are smaller according to the increase of lateral acceleration or longitudinal acceleration or both.

Further, as for (i) the vehicle having the rear-wheel longitudinal force toe-in characteristic using the multi-link suspension and others, though the tire is displaced backward for the vehicle when braking force or braking torque is applied, a steering angle is introrsely generated differently from the above-mentioned normal vehicle.

Accordingly, the sensing means of a turning direction is provided, based upon the accelerating/braking operation of the driver or an acceleration/deceleration command (an acceleration command, a deceleration command) from the control device or both, for the front wheel, more driving force/driving torque and/or more braking force/braking torque are/is distributed to the inside wheel in turning, and for the rear wheel, more driving force/driving torque and/or more braking force/braking torque are/is distributed to the outside wheel in turning, and when more braking force/braking torque is distributed to the inside front wheel in turning and more braking force/braking torque is distributed to the outside rear wheel in turning, the front wheel is directed in a toe-out direction on the side on which turning is accelerated, the rear wheel is directed in a toe-in direction on the stable side on which turning is stopped respectively because of compliance steer, and the front wheel and the rear wheel mutually interfere. Accordingly, in such a case, the enhancement of turning round when turning is started and stable transition to steady turning are enabled by controlling so that first, braking force or braking torque is distributed to the inside front wheel in turning and afterward, braking force or braking torque is distributed to the outside rear wheel temporally behind like the four-wheel active steer.

Besides, in (ii) the vehicle provided with the differential gear between the rear right and left wheels, the sensing means of a turning direction is provided, based upon the accelerating/braking operation of the driver or an acceleration/deceleration command (an acceleration command, a deceleration command) from the control device or both, for the front wheel, more driving force/driving torque and/or more braking force/braking torque are/is distributed to the inside wheel in turning, and for the rear wheel, more driving force/driving torque and/or more braking force/braking torque are/is distributed to the outside wheel in turning, and when more braking force/braking torque is distributed to the inside front wheel in turning and more braking force/braking torque is distributed to the outside rear wheel in turning, driving force or driving torque is caused inside turning when braking force or braking torque is applied to the outside wheel in turning because the inside and the outside rear wheels are coupled by the differential gear.

Because of compliance steer, the front wheel is directed in the toe-out direction (in a direction in which a steering angle increases) on the side on which turning is accelerated, the rear wheel is directed in the toe-in direction on the stable side on which turning is stopped, and the front wheel and the rear wheel mutually interfere. Accordingly, in such a case, the enhancement of turning round when turning is started and stable transition to steady turning are enabled by controlling so that first, more braking force/braking torque is distributed to the inside front wheel in turning and afterward, more braking force/braking torque is distributed to the outside rear wheel temporally behind like the four-wheel active steer.

First, the basic concept of a means for settling the problem will be described and afterward, the means will be more described in detail. Next, two embodiments will be described in detail. Further, the effects of the present invention will be verified in computer simulation and results verified in a vehicle test will be described.

<Basic Concept of the Present Invention>

Steering angle control from four-wheel active steer control, compliance steer by braking force/driving force and acceleration/deceleration control (G-Vectoring control) coordinated with a lateral motion will be described below and the basic concept of the present invention in which these are organically combined will be described below.

"Consideration from a Viewpoint of Four-Wheel Active Steer Control"

First, a general method of steering angle control for enhancing the maneuverability and the stability of a vehicle will be described, referring to the nonpatent literature 1.

FIG. 1(a) shows a normal vehicle 1000 provided with no steering angle control mechanism, FIG. 1(b) shows a four-wheel active steer vehicle 1100, and both show the beginning of turning from a linear state to a turned state (leftward turning).

In the normal vehicle 1000, a left front wheel 1011, a right front wheel 1012, a left rear wheel 1013 and a right rear wheel 1014 are suspended by a left front-wheel suspension 1007, a right front-wheel suspension 1008, a right rear-wheel suspension 1009 and a left rear-wheel suspension 1010. A steering angle input from a steering 1001 by a driver is transmitted to left and right knuckle arms 1003, 1004 via each tie rod 1005 through a gear box 1006 of a steering shaft 1002 and is realized as a steering angle δ.

In the meantime, in the four-wheel active steer vehicle 1100, a left front wheel 1111, a right front wheel 1112, a left rear wheel 1113 and a right rear wheel 1114 are suspended by a left front-wheel suspension 1107, a right front-wheel suspension 1108, a left rear-wheel suspension 1109 and a right rear-wheel suspension 1110. The four-wheel active steer vehicle 1100 shown in FIG. 1(b) is a so-called steer-by-wire (SBW) vehicle and a steering angle input by the driver of a steering unit 1101 is input to a steering controller 1120 via a steering angle sensor. The steering controller 1120 controls a steering angle of the front wheel via left and right knuckle arms 1103, 1104 of the front wheels via each tie rod 1105 through a gear box 1106 of a steering shaft 1102 of the front wheel according to the input and controls a steering angle of the rear wheel via left and right knuckle arms 1123, 1124 of the rear wheels via each tie rod 1125 through a gear box 1126 of a steering shaft 1122 of the rear wheel according to the input.

At the beginning of turning, to enhance turning round of the vehicle, the yaw moment applied to the vehicle is required to be increased. Therefore, the cornering force of the rear wheel can be effectively decreased by increasing a steering angle of the front wheel, increasing the cornering force of the front wheel, steering the rear wheel in a reverse direction to the front wheel and decreasing a slip angle of the rear wheel.

As the actual yaw moment onto the vehicle is determined by difference between the turning moment by the cornering force of the front wheel and the moment on the return side by the cornering force of the rear wheel, turning round is enhanced by such control.

In the four-wheel active steer vehicle shown in FIG. 1(b), control is made so that a steering angle increases by $\delta_{f\_AFS\_A}$, compared with the normal wheel shown in FIG. 1(a) in which the front wheel is steered by δ and control is made so that a steering angle increases by $\delta_{r\_ARS\_A}$ in a reverse direction (in an opposite phase) to the front wheel, compared with the normal vehicle shown in FIG. 1(a) in which no rear wheel is steered.

Next, four-wheel active steer control in a return from turning to linear running will be described, referring to FIG. 2.

Figure 2:
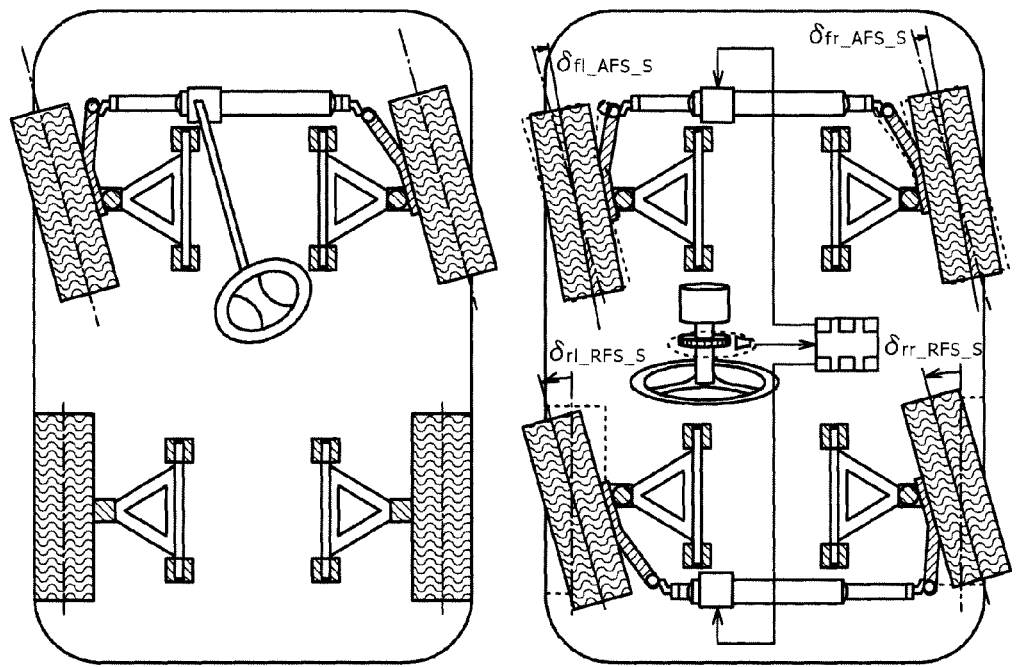
FIG. 2 shows the comparison between the normal vehicle and the four-wheel active steer vehicle in a condition from turning to return to straight-line running.

As FIG. 2 has the same configuration as that in FIG. 1, the reference numerals showing each configuration (the numerals and leader lines) are omitted.

In escape from turning to linear running, a turning motion is required to be promptly converged and the yaw moment on the return side applied to the vehicle is required to be increased. Therefore, the cornering force of the rear wheel can be effectively increased by decreasing a steering angle of the front wheel, decreasing the cornering force of the front wheel, steering the rear wheel in the same direction as the front wheel and increasing a slip angle of the rear wheel. Stability from a turning motion to a direct advance is enhanced by offsetting the turning moment by the cornering force of the front wheel against the moment on the return side by the cornering force of the rear wheel.

In the four-wheel active steer vehicle shown in FIG. 2(b), control is made so that a steering angle decreases by $\delta_{f\_AFS\_S}$, compared with the normal vehicle shown in FIG. 2(a) in which the front wheel is steered by $\delta$ and control is made so that the rear wheel is steered by $\delta_{r\_ARS\_S}$ in the same direction (in phase) as (with) the front wheel, compared with the normal vehicle shown in FIG. 2(a) in which no rear wheel is steered.

For control for enhancing the maneuverability and the stability of the four-wheel active steer vehicle, the basic concept that to enhance the maneuverability, the front wheel is more turned and the rear wheel is turned in the reverse direction (in the opposite phase) to the front wheel and to enhance the stability, the front wheel is less turned and the rear wheel is turned in the same direction (in phase) as (with) the front wheel has been described.

"Compliance Steer"

Next, compliance steer by braking force and driving force will be described, referring to FIGS. 3 to 5. As described in a nonpatent literature 5 (M. Abe, H. Osawa: vehicle dynamics improvement technology, 5.2 Suspension characteristics and driving stability and 5.2.1 Variation of toe angle and driving stability, pp. 84-85 in Chap. 5, Suspension and vehicular maneuverability of Automotive engineering series 4 edited by Society of Automotive Engineers of Japan and published by Asakura Shoten, 1998), when lateral force such as cornering force and longitudinal force such as braking force and driving force are applied to the suspension, the variation of a toe angle occurs by the elastic deformation of a rubber bushing and a link (as compliance steer by lateral force is smaller than that by longitudinal force and the variation of the toe angle occurs independent of whether control according to the present invention is made or not, it is not discussed in detail).

<Rear Wheel>

Figure 3:
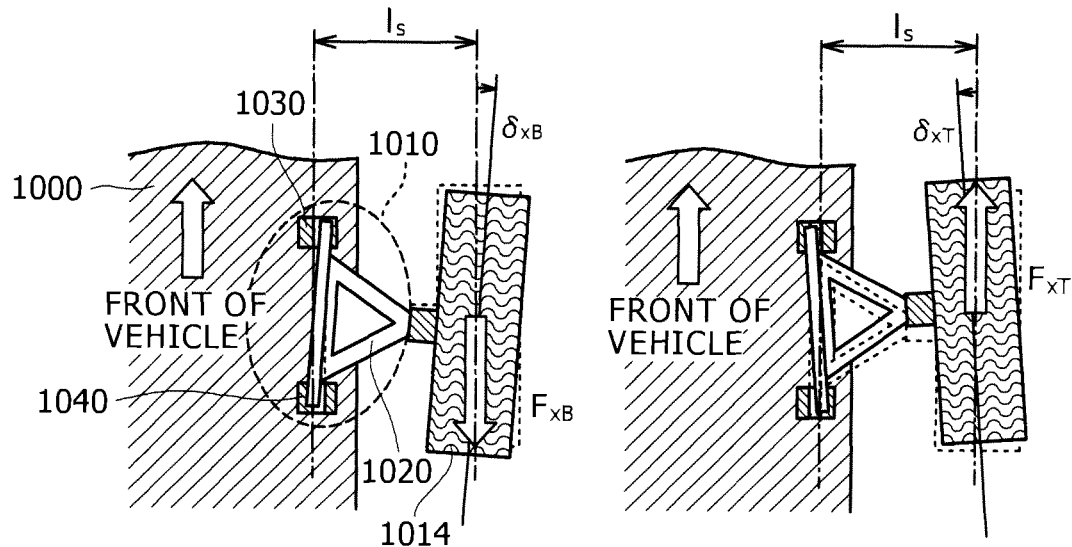
FIG. 3 shows situations in which compliance steer is caused by braking force and driving force.

FIG. 3 shows the variation of a toe angle using the right rear wheel 1014 of the normal vehicle 1000. The right rear wheel 1014 is suspended by the right rear-wheel suspension 1010 from the vehicle, however, when braking force $F_{xB}$ is applied to the center of the ground touched to the right rear wheel 1014 and distance from the center to a mobile bearing on the side of the vehicle body of a suspension link 1020 is $1_s$, the moment equivalent to $F_{xB} \times 1_s$ is applied to the right rear wheel 1014. The suspension link 1020 is supported by a front mobile bearing bush 1030 on the side of the vehicle body and a rear mobile bearing bush 1040 on the side of the vehicle body, however, as these supporting parts have compliance, an extrorse (toe-out) compliance steer angle $\delta_{xB}$ is caused in the right rear wheel as a result. Similarly, when driving force $F_{xT}$ is applied to the right rear wheel 1014, an introrse (toe-in) compliance steer angle $\delta_{xT}$ is caused.

According to the nonpatent literature 5, these steer angles are approximately 0.5° outside to 0.5° inside/980 N (braking force). In a torsion beam type suspension for example for a low-cost vehicle that cannot have a special link configuration, toe-out (in a direction shown in FIG. 3) occurs. An object of the present invention is to realize technique and a low-priced and light system that enable enhancing maneuverability and stability with sufficient effects and a vehicle to be an object is mainly a low-priced vehicle, that is, having a toe-out characteristic. Therefore, in this embodiment, compliance steer is made act in a direction of toe-out by braking force and in a direction of toe-in by driving force.

As a result, the above-mentioned is arranged as follows:
Braking force: steering angle in direction of toe-out
Driving force: steering angle in direction of toe-in
<Front Wheel>

Next, the front wheel will be described referring to FIG. 4. In this case, braking force $F_{xB\_f}$ shall be applied to only the left front wheel 1011.

Figure 4:
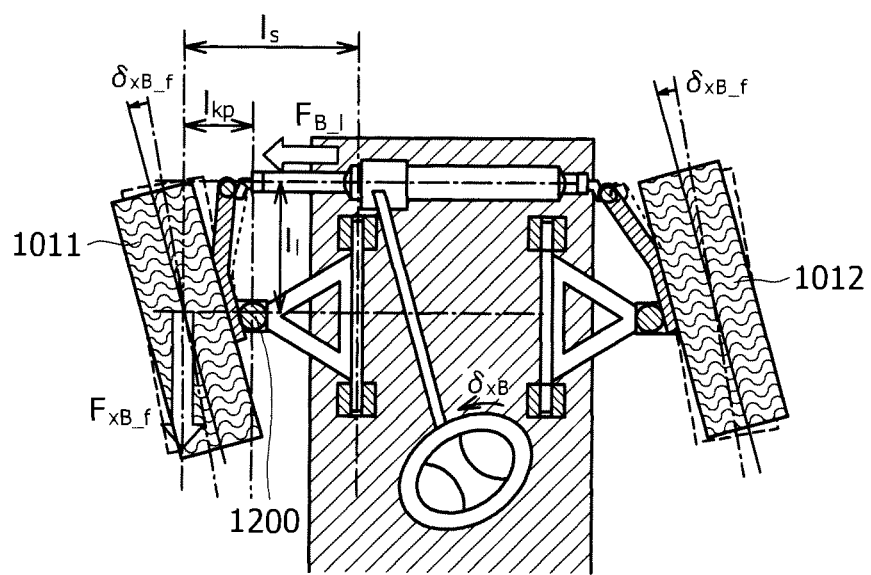
FIG. 4 shows a situation in which compliance steer by braking force to the inside of a front wheel is caused.

Basically, the front wheel shown in FIG. 4 is the same as the rear wheel shown in FIG. 3, however, as the front wheel is a steered wheel, it has a degree of freedom of turning around a king pin axis 1200. Further, the left front wheel also mechanically connects with the left front wheel 1012 via a steering mechanism. When distance from the center of the wheel to the king pin axis 1200 is $1_{kp}$, the moment in the direction of toe-out equivalent to $F_{xB\_f} \times 1_{kp}$ is applied around the king pin axis. When distance from the king pin axis to a steering rack is $1_l$, axial force equivalent to $F_{B\_l} = F_{xB\_f} \times 1_{kp}/1_l$ is applied to the steering rack. There is a case that an angle steered by a driver is extra turned by $\delta_{xB}$ by this force. Besides, even if the driver completely holds a steering angle, a steering angle $\delta_{xB\_f}$ in the direction of toe-in is caused like the rear wheel because of the torsional rigidity of a steering shaft or the deflection of each bush. At this time, $\delta_{xB\_f}$ is also caused on the right side of the front wheel connected via the steering mechanism.

Figure 5:
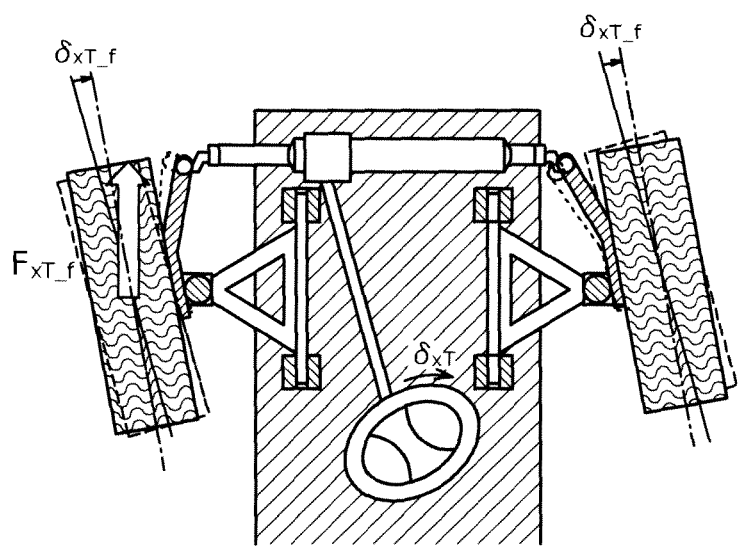
FIG. 5 shows a situation in which compliance steer by driving force to the inside of the front wheel is caused.

Similarly, as shown in FIG. 5, when driving force $F_{xT\_f}$ is applied to only the left front wheel 1011, a steering angle $\delta_{xT\_f}$ in a direction of toe-out is generated. At this time, $\delta_{xT\_f}$ is also generated on the left side of the front wheel connected via the steering mechanism.

As a result, the above-mentioned is arranged as follows:
Braking force: steering angle in direction of toe-in
Driving force: steering angle in direction of toe-out
"G-Vectoring Control"

Next, acceleration/deceleration control which can enhance maneuverability and stability and which is coordinated with a lateral motion will be described. A guideline of acceleration/deceleration control linked with a lateral motion is described in a nonpatent literature 3 for example.

As shown in the mathematical expression 1, the guideline is basically a simple control rule that a value acquired by multiplying a lateral jerk $G_{y\_dot}$ by gain $C_{xy}$ and applying a first-order lag is used for a longitudinal acceleration/deceleration command. That is, the acceleration/deceleration command is generated based upon vehicular lateral acceleration generated based upon a steering angle and vehicle speed of the vehicle, a lateral jerk and predetermined gain and more concretely, is acquired in the mathematical expression 1.

Hereby, it is verified in the nonpatent literature 2 that a part of coordination control strategy of a lateral motion and a longitudinal motion of an expert driver can be simulated. $G_{x\_DC}$ in the mathematical expression 1 is a deceleration component not related to a lateral motion. It is a term required for foreseen deceleration when a corner exists in front or when an interval speed command is issued. Besides, an sgn (signum) term is provided to acquire the above-mentioned operation at both a right corner and a left corner. Concretely, operation that deceleration is made in the start of steering, in steady turning, deceleration is stopped (because a lateral jerk becomes zero) and acceleration is made in escape from a corner when return is started can be realized. Acceleration/deceleration according to a lateral jerk means that deceleration is made when lateral acceleration increases and acceleration is made when lateral acceleration decreases.

Such control is called G-Vectoring control because resultant acceleration (expressed with G) of longitudinal acceleration and lateral acceleration is vectored so that the synthetic acceleration shows curved (circular) transition as time elapses in a diagram having vehicular longitudinal acceleration on an axis of abscissas and having vehicular lateral acceleration on an axis of ordinates.

As for a vehicular motion when the control shown in the mathematical expression 1 is applied, supposed concrete running will be described below.

FIG. 6 shows a straight running interval A, a transient interval B, a steady turning interval C, a transient interval D and a straight running interval E, which are intervals when a general driving scene including approach to a corner and escape from the corner is supposed. At this time, no operation for accelerating or decelerating by a driver shall be made.

Figure 7:
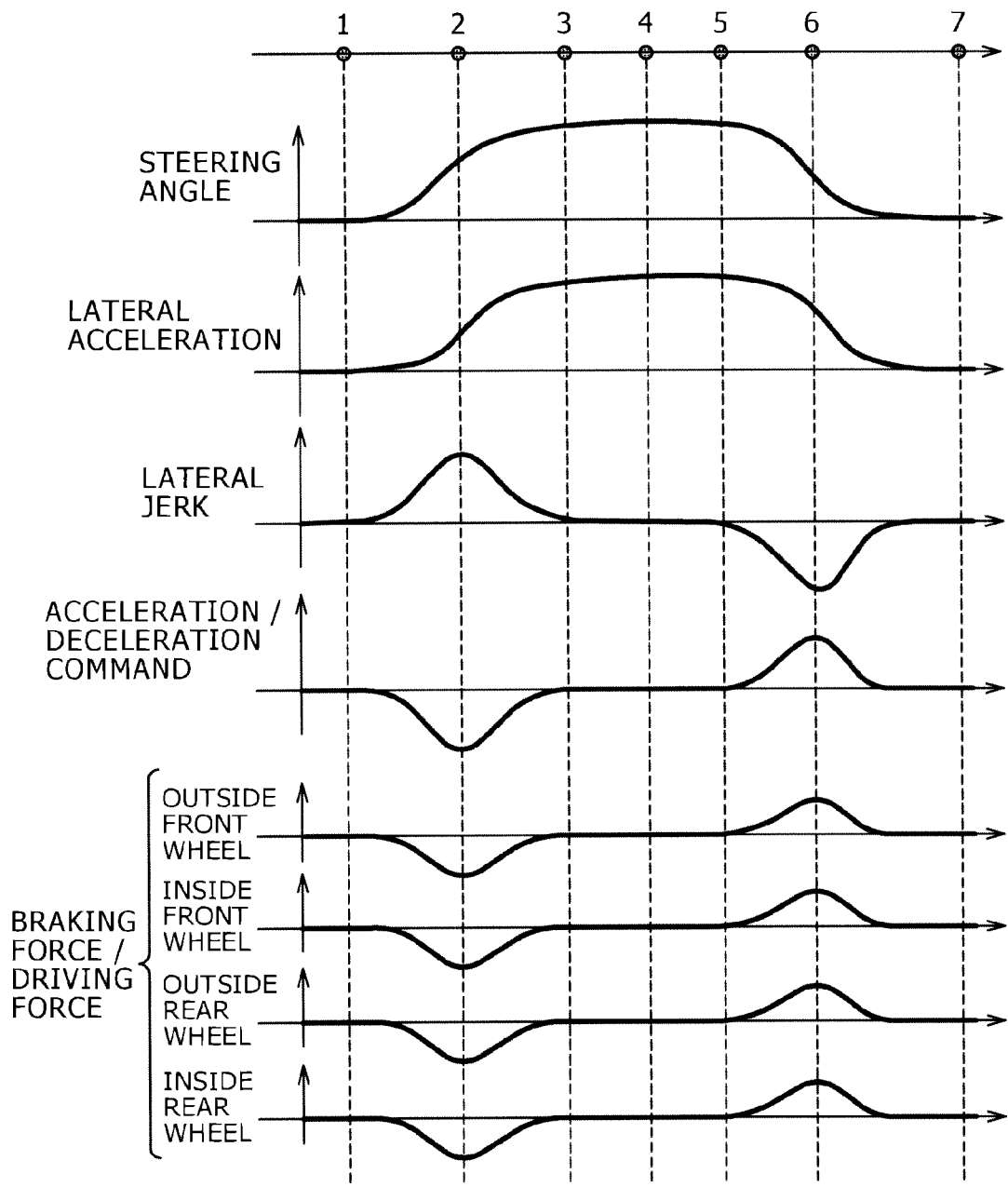
FIG. 7 shows time series data in a case of running shown in FIG. 6.

FIG. 7 shows a steering angle, lateral acceleration, a lateral jerk, an acceleration/deceleration command calculated in the mathematical expression 1 and braking force/driving force to four wheels in the shape of a time history waveform. Though the following is described in detail later, braking force/driving force is distributed between the outside front wheel and the inside front wheel and between outside rear wheel and the inside rear wheel to be the same values between the inside and the outside. Braking/driving force is a generic name of force generated in a vehicular longitudinal direction of each wheel, braking force is defined as force in a direction in which the vehicle is decelerated, and driving force is defined as force in a direction in which the vehicle is accelerated.

First, a vehicle enters a corner from the straight running interval A. In the transient interval B (points 1 to 3), as a driver gradually turns the steering, lateral acceleration $G_y$ of the vehicle increases. A lateral jerk $G_{y\_dot}$ has a positive value while lateral acceleration in the vicinity of the point 2 increases (returns to zero at the time of the point 3 at which the increase of lateral acceleration is finished). At this time, as lateral acceleration $G_y$ increases, a deceleration ($G_{xc}$ is negative) command is generated in the controlled vehicle according to the mathematical expression 1. Hereby, braking force (a minus sign) of the substantial same dimension is applied to the outside front wheel, the inside front wheel, the outside rear wheel and the inside rear wheel.

Afterward, when the vehicle enters the steady turning interval C (points 3 to 5), the driver stops more turning the steering and keeps a steering angle fixed. At this time, as a lateral jerk $G_{y\_dot}$ is zero, an acceleration/deceleration command $G_{xc}$ is zero. Therefore, braking force/driving force to each wheel is turned zero.

Next, in the transient interval D (points 5 to 7), the lateral acceleration $G_y$ of the vehicle decreases by operation for returning the steering by the driver. At this time, a lateral jerk $G_{y\_dot}$ of the vehicle is negative and an acceleration command $G_{xc}$ is generated in the controlled vehicle according to the mathematical expression 1. Hereby, driving force (a plus sign) of the substantial same dimension is applied to the outside front wheel, the inside front wheel, the outside rear wheel and the inside rear wheel.

Besides, in the direct advance interval E, as a lateral acceleration $G_y$ is zero and a lateral jerk $G_{y\_dot}$ is also zero, no acceleration/deceleration control is made. As described above, from the point 1 at which steering is started to the point 3, the vehicle is decelerated, during steady turning (the points 3 to 5), deceleration is stopped, and from the point 5 at which turning back is started to escape from the corner (the point 7), the vehicle is accelerated. As described above, when G-Vectoring control is applied to the vehicle, an acceleration/deceleration motion linked with a lateral motion can be realized if only the driver steers for turning.

Besides, when this motion is expressed in a "g-g" diagram showing longitudinal acceleration on an axis of abscissas, showing lateral acceleration on an axis of ordinates and showing a mode of acceleration caused in the vehicle, the motion is a characteristic motion in which a smooth circular curve is drawn. An acceleration/deceleration command according to the present invention is generated to be a curved transition in the diagram as time elapses. The curved transition shows clockwise transition at a left corner as shown in FIG. 6, shows inverted transition based upon the axis of $G_x$ at a right corner, and a direction of the transition is counterclockwise. In such transition, a pitching motion caused in the vehicle by longitudinal acceleration and a roll motion caused by lateral acceleration are suitably linked and peak values of a roll rate and a pitch rate are reduced.

The above-mentioned is arranged as follows:
Interval from linear running to beginning of turning: deceleration→braking force
From turning to return to linear running: acceleration→driving force The steering angle control for enhancing maneuverability and stability, the compliance steer by braking force/driving force and the acceleration/deceleration control (the G-Vectoring control) linked with a lateral motion have been described. Compliance steer control by the distribution of braking force/driving force will be described below.

A method of realizing the basic concept for enhancing maneuverability and stability in the above-mentioned four-wheel active steer vehicle by distributing braking force/driving force will be described referring to FIGS. 8 and 9 below.

As described above, for control for enhancing maneuverability and stability in the four-wheel active steer vehicle, the following basic rule can be given.

To enhance maneuverability, the front wheel is more turned and the rear wheel is turned in a reverse direction (out of phase) to (with) the front wheel.
To enhance stability, the front wheel is turned back and the rear wheel is turned in the same direction (in phase) as (with) the front wheel.

FIGS. 8A, 8B and 8C show situations where the four-wheel active steer vehicle and the vehicle to which the present invention is applied and to which the distribution of braking force/driving force is applied are respectively operated in a period from linear running to the beginning of turning.

FIG. 8(a) shows a condition in which the four-wheel active steer vehicle is operated as in FIG. 1(b), the front wheel is more turned and the rear wheel is turned in a reverse direction (out of phase) to (with) the front wheel.

In the meantime, FIG. 8(b) shows the vehicle to which the present invention is applied and to which the distribution of braking force/driving force is applied. G-Vectoring control is applied to the vehicle, a deceleration command is issued in the interval from linear running to the beginning of turning, and braking force is generated.

In the present invention, the sensing means of a turning direction is provided and as shown in FIG. 8(b), a braking device is controlled so that greater braking force is generated in the inside front wheel in turning than in the outside front wheel in turning (in this example, braking force to the outside wheel in turning is set to zero).

Hereby, a compliance steer angle on the toe-in side of the front wheels is generated as in FIG. 8(a). Further, the braking device is controlled so that greater braking force is generated in the outside rear wheel in turning than in the inside rear wheel in turning (in this example, braking force to the inside wheel in turning is set to zero).

Hereby, a compliance steer angle on the toe-out side is generated in only the outside rear wheel as in FIG. 8(a).

Besides, FIG. 8(c) shows the vehicle to which the present invention is applied and to which the distribution of braking force/driving force is applied. G-Vectoring control is applied to the vehicle, in the interval from linear running to the beginning of turning, a deceleration command is issued, and braking force is generated.

In the present invention, the sensing means of a turning direction is provided and as shown in FIG. 8(c), the braking device or an electric regenerative braking device is controlled so that greater braking force is generated in the inside front wheel in turning than in the outside front wheel in turning. The regenerative braking device regenerates electric power generated when braking force or braking torque is generated by an electric motor.

Driving force (negative braking force, therefore, it can be considered that the driving force is smaller braking force than in the inside front wheel in consideration of a sign) is distributed to the outside front wheel in turning (the right front wheel) by electric power from the regenerative braking device or electric power from a battery or motive power from an internal combustion engine.

Hereby, a greater compliance steer angle on the toe-in side of the front wheels than the compliance steer angle in FIG. 8(b) in which only braking force is distributed is generated. Further, the braking device or the electric regenerative braking device is controlled so that greater braking force is generated in the outside rear wheel in turning than in the inside rear wheel in turning. Driving force (negative braking force, therefore, it can be considered that the driving force is smaller braking force than in the outside rear wheel in consideration of a sign) is distributed to the inside rear wheel in turning (the left rear wheel) by electric power from the regenerative braking device or electric power from the battery or motive power from the internal combustion engine.

Hereby, as in FIG. 8(a), a compliance steer angle on the toe-out side is generated in both rear wheels.

Naturally, in FIG. 8(c), as driving force or driving torque is applied to the vehicle, adjustment is required to be made so that deceleration instructed by a G-Vectoring control device based upon difference between braking force and driving force can be realized.

As described above, the similar steering control effect to that of the four-wheel active steer can be also acquired by distributing braking force based upon a G-Vectoring deceleration command value to the diagonal wheels (more braking force is applied to the inside front wheel and more braking force is applied to the outside rear wheel (also in consideration of the sign) in addition to the enhancement of maneuverability by G-Vectoring and especially, a yaw response can be more enhanced.

FIGS. 9A, 9B and 9C show situations where the four-wheel active steer vehicle and the vehicle to which the present invention is applied and to which the distribution of braking force/driving force is applied in a period from turning to return to linear running are operated.

FIG. 9(a) shows a condition in which the four-wheel active steer vehicle is operated as in FIG. 2(b), the front wheel is turned back and the rear wheel is turned in the same direction (in phase) as (with) the front wheel.

In the meantime, FIG. 9(b) shows the vehicle to which the present invention is applied and to which the distribution of braking force/driving force is applied. G-Vectoring control is applied to the vehicle, in a period from turning to return to linear running, an acceleration command is issued, and driving force is generated.

In the present invention, the sensing means of a turning direction is provided and as shown in FIG. 9(b), a drive unit is controlled so that greater driving force is generated in the inside front wheel in turning than in the outside front wheel in turning (in this example, driving force to the outside wheel in turning is set to zero).

Hereby, a compliance steer angle on the toe-out side of the front wheels is generated as in FIG. 9(a). Further, the drive unit is controlled so that greater driving force is generated in the outside rear wheel in turning than in the inside rear wheel in turning (in this example, driving force inside turning is set to zero).

Hereby, a compliance steer angle on the toe-in side (in phase) is generated in only the outside rear wheel as in FIG. 9(a).

Besides, FIG. 9(c) shows the vehicle to which the present invention is applied and to which the distribution of braking force/driving force is applied. G-Vectoring control is applied to the vehicle, in a period from turning to return to linear running, an acceleration command is issued, and driving force is generated.

In the present invention, the sensing means of a turning direction is provided and as shown in FIG. 9(c), the drive unit is controlled so that greater driving force is generated in the inside front wheel in turning than in the outside front wheel in turning. Besides, braking force (negative driving force, therefore, it can be considered that the braking force is smaller driving force than in the inside front wheel in consideration of the sign) is distributed to the outside front wheel in turning (the right front wheel). To generate braking force or braking torque, the braking device or the electric regenerative braking device may be also controlled. The regenerative braking device regenerates electric power generated when braking force or braking torque is generated by the electric motor.

Hereby, a greater compliance steer angle on the toe-out side of the front wheels than that in FIG. 9(b) in which only driving force is distributed is generated. Further, the drive unit is controlled so that greater driving force is generated in the outside rear wheel in turning than in the inside rear wheel in turning.

Besides, braking force (negative driving force, therefore, it can be considered that the braking force is smaller driving force than in the outside rear wheel in consideration of the sign) is distributed to the inside rear wheel in turning (the left rear wheel). To generate braking force or braking torque, the braking device or the electric regenerative braking device may be also controlled. Hereby, a compliance steer angle on the toe-in side is generated in both rear wheels as in FIG. 8(a).

Naturally, in FIG. 9(c), as driving force or driving torque is applied to the vehicle, adjustment is required to be made so that deceleration instructed by the G-Vectoring control device based upon difference between driving force and braking force can be realized.

As described above, the similar steering control effects to the four-wheel active steer can be also acquired by distributing driving force based upon a G-Vectoring deceleration command value to the diagonal wheels (more to the inside front wheel and more to the outside rear wheel) in addition to the enhancement of stability by G-Vectoring and stability can be more enhanced.

The example that braking force or driving force is controlled based upon an acceleration/deceleration command value by G-Vectoring control is described above. In the meantime, when a driver operates a brake in the interval from linear running to the beginning of turning or when the driver operates an accelerator in return from turning to linear running, the similar steering control effects to the four-wheel active steer can be also acquired by distributing braking force/driving force to the diagonal wheels (more to the inside front wheel and more to the outside rear wheel) as described above and maneuverability and stability can be more enhanced.

The above-mentioned is the main points and the basic concept of the present invention for realizing the technique and the system that enable the enhancement of maneuverability and stability with sufficient effects in the low-priced light weight system.

Next, two embodiments will be described in detail.

First Embodiment

Figure 10:
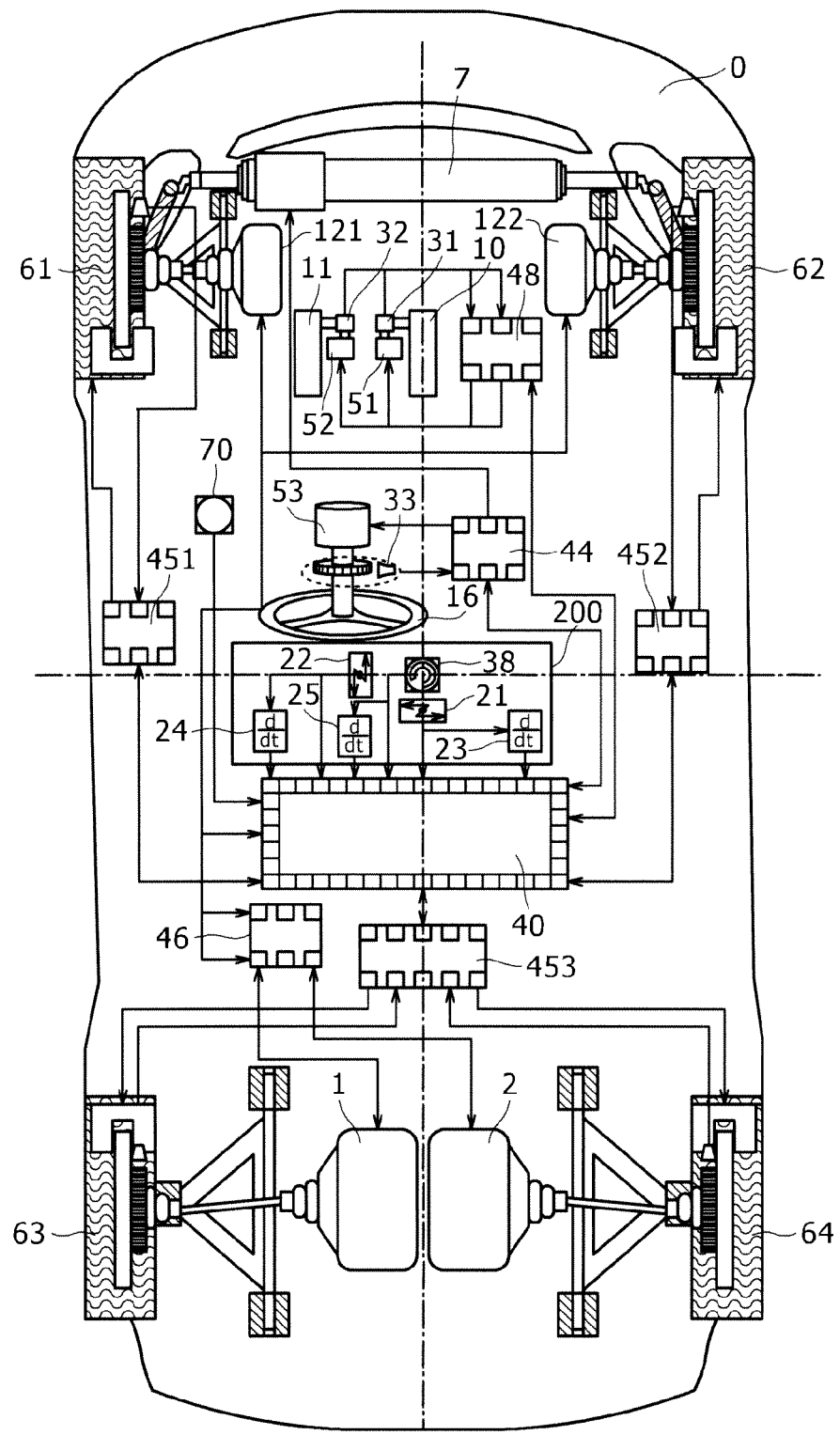
FIG. 10 shows the whole configuration of a first embodiment of a motion control system of a vehicle according to the present invention.

FIG. 10 shows the whole configuration of a first embodiment of the vehicular motion control system according to the present invention.

In this embodiment, a vehicle 0 is configured by a so-called by-wire system and no mechanical coupling part exists between a driver and a steering mechanism, an acceleration mechanism or a deceleration mechanism.

<Driving>

The vehicle 0 is a four-wheel-drive vehicle (an all wheel drive (AWD) vehicle) where a left rear wheel 63 is driven by a left rear-wheel motor 1, a right rear wheel 64 is driven by a right rear-wheel motor 2, a left front wheel 61 is driven by a left front-wheel motor 121 and a right front wheel 62 is driven by a right front-wheel motor 122.

The vehicle has such configuration that the driving force and the braking force of four wheels can be freely controlled by combining with four-wheel independent brakes described later for a most suitable example showing the present invention especially for difference in a power source such as an electric motor and an internal combustion engine. The configuration will be described in detail below.

A brake rotor, a rotor for sensing wheel speed and a wheel speed pickup provided on the side of the vehicle are respectively mounted on the left front wheel 61, the right front wheel 62, the left rear wheel 63 and the right rear wheel 64 so that the speed of each wheel can be sensed. The quantity depressed by the driver of an accelerator pedal 10 is sensed by an accelerator position sensor 31 and is operated in a central controller 40 which is a control means via a pedal controller 48. The central controller 40 independently controls the driving force and/or the braking force of each of the four wheels and in the operation, diagonal torque distribution information for enhancing maneuverability and stability as the object of the present invention is also included. A power train controller 46 controls the output of the left rear-wheel motor 1, the right rear-wheel motor 2, the left front-wheel motor 121 and the right front-wheel motor 122 according to this quantity.

An accelerator reaction motor 51 is also connected to the accelerator pedal 10 and the reaction is controlled based upon a command based upon the operation from the central controller 40 by the pedal controller 48.

<Braking>

The brake rotor is respectively arranged on the left front wheel 61, the right front wheel 62, the left rear wheel 63 and the right rear wheel 64 and a caliper that decelerates the wheel by holding the brake rotor between pads (not shown) is mounted on the side of a vehicle body. A brake system is an electric type provided with the electric motor every caliper.

The respective calipers are controlled basically based upon the command based upon the operation from the central controller 40 by a brake controller 451 (for the left front wheel), a brake controller 452 (for the right front wheel) and a brake controller 453 (for the rear wheels). A brake pedal reaction motor 52 is connected to a brake pedal 11 and the reaction is controlled based upon a command based upon operation from the central controller 40 by the pedal controller 48.

<Joint Control of Braking/Driving>

In the present invention, diagonal distribution is made to enhance maneuverability and stability, and different braking force and different driving force are generated between the right and left wheels. Besides, to further enhance maneuverability when turning is started for example, such joint control of braking/driving that braking torque for the inside front wheel that creates the toe-in of the front wheel is electrically regenerated, driving torque is applied to the inside rear wheel using this electric power, the inside wheels including the inside rear wheel are turned toe-in using compliance steer, braking torque for the outside rear wheel that creates the toe-out of the outside rear wheel is electrically regenerated, driving torque is applied to the outside front wheel using this electric power and the toe-in of the front wheels is more strengthened is made.

As for a joint control command in such a situation, the central controller 40 synthetically determines the command and the command is suitably controlled via the brake controller 451 (for the left front wheel), the brake controller 452 (for the right front wheel), the brake controller 453 (for the rear wheels), the power train controller 46, the left rear-wheel motor 1, the right rear-wheel motor 2, the left front-wheel motor 121 and the right front-wheel motor 122.

<Steering>

A steering system of the vehicle 0 has steer-by-wire structure where no mechanical coupling part exists between a steering angle applied by the driver and a tire turning angle. The steering system is configured by a power steering 7 including a steering angle sensor (not shown) inside, a steering wheel 16, a driver steered angle sensor 33 and a steering controller 44. The quantity steered by the driver of the steering wheel 16 is sensed by the driver steered angle sensor 33 and is operated in the central controller 40 via the steering controller 44. The steering controller 44 controls the power steering 7 according to this quantity.

A steer reaction motor 53 is also connected to the steering wheel 16 and the reaction is controlled based upon a command based upon the operation from the central controller 40 by the steering controller 44.

The quantity depressed by the driver of the brake pedal 11 is sensed by a brake pedal position sensor 32 and is operated in the central controller 40 via the pedal controller 48.

<Sensor>

Next, a group of motion sensors according to the present invention will be described.

The sensors that measure a motion of the vehicle in this embodiment are provided with an absolute vehicle speed meter, a yaw rate sensor, an acceleration sensor and others. In addition, as for vehicle speed and a yaw rate, an estimate by a wheel speed sensor and as to the yaw rate and lateral acceleration and an estimate using vehicle speed, a steering angle and a vehicular motion model are simultaneously performed.

A millimeter wave ground vehicle speed sensor 70 which is an external information sensing means is mounted in the vehicle 0, senses obstacle information, preceding vehicle information and following vehicle information, and can independently sense longitudinal velocity $V_x$ and lateral velocity $V_y$. Besides, the wheel speed of each wheel is input to the brake controllers 451, 452 as described above. Absolute vehicle speed can be estimated by balancing the speed of the front wheel (the non-driving wheel) based upon the wheel speed of the four wheels.

In the present invention, the absolute vehicle speed ($V_x$) can be precisely measured by applying a signal from the acceleration sensor that senses the wheel speed and acceleration in a longitudinal direction of the vehicle using a method disclosed in Japanese Unexamined Patent Application Publication No. 1993-16789 even if the wheel speed of the four wheels falls at the same time.

Besides, such configuration that a yaw rate of the vehicle body is estimated by calculating difference between the wheel speed of the right and left front wheels (the non-driving wheels) is also included and the robustness of a sensing signal is enhanced. These signals are ordinarily monitored in the central controller 40 as shared information. Estimated absolute vehicle speed is compared with a signal from the millimeter wave ground vehicle speed sensor 70, the signal is referred to, and when a problem occurs in any signal, the estimated absolute vehicle speed and the signal are mutually complemented.

As shown in FIG. 10, a lateral acceleration sensor 21, a longitudinal acceleration sensor 22 and a yaw rate sensor 38 are arranged in the vicinity of the center of gravity.

Besides, differentiating circuits 23, 24 that differentiate the output of the respective acceleration sensors and acquire jerk information are mounted.

Further, a differentiating circuit 25 for differentiating the output of the yaw rate sensor 38 and acquiring a yaw angle acceleration signal is mounted.

In this embodiment, to clarify the existence of the differentiating circuits, the differentiating circuits seem to be installed in each sensor, however, actually, an acceleration signal is directly input to the central controller 40 and after various operations, processing for differentiation may be also executed. Processing for differentiation may be also executed in the central controller 40 using a yaw rate estimated in the vehicle speed sensor so as to acquire yaw acceleration of the vehicle body.

Besides, a differentiating circuit is included in an MEMS type acceleration sensor unit that recently makes remarkable progress and a sensor that outputs a jerk acquired by directly differentiating a signal proportional to acceleration from a sensing element may be also used. A signal output from the acceleration sensor is often a signal that passes a low pass filter for smoothing a signal.

To acquire a jerk, a precise jerk signal hardly having a phase lag can be acquired differently from a signal which passes the low pass filter once and which is differentiated again.

Besides, a jerk sensor that can directly sense a jerk and is disclosed in Japanese Unexamined Patent Application Publication No. 2002-340925 may be also used.

The longitudinal acceleration sensor, the lateral acceleration sensor, the yaw rate sensor, the differentiating circuit and others seem to be clearly independent in the drawing, however, longitudinal/lateral acceleration, a jerk, a yaw rate and yaw acceleration may be directly output from a combined sensor 200 in which these performance is housed in one case. Further, a function that calculates and outputs an acceleration command value linked with a lateral motion shown in the mathematical expression 1 may be also integrated with the combined sensor.

This command value is superimposed on a CAN signal, the signal is transmitted to a brake unit or the drive unit, and G-Vectoring control may be also made.

In such configuration, the G-Vectoring control can be realized using the existing brake unit and the existing drive unit by only mounting the combined sensor in the vehicle.

Besides, in this embodiment, a method of estimating lateral acceleration $G_y$ and a lateral jerk $G_{y\_dot}$ is also adopted. An estimate is made based upon a steering angle and vehicle speed or based upon a yaw rate sensed by the yaw rate sensor and vehicle speed.

Figure 11:
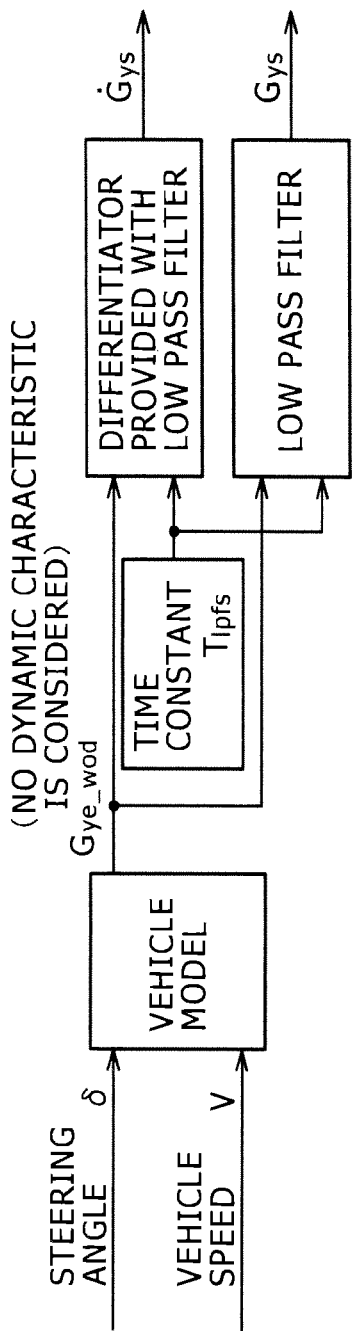
FIG. 11 shows vehicular lateral acceleration and an estimated jerk respectively using a vehicle model.

Referring to FIG. 11, the method of estimating a lateral acceleration estimate $G_{ye}$ and a lateral jerk estimate $G_{ye\_dot}$ based upon a steering angle δ will be described below.

First, in a vehicular lateral motion model, a yaw rate r in steady circular turning from which a dynamic characteristic is omitted will be calculated in the following mathematical expression 2 using a steering angle δ [deg] and vehicular speed V [m/s] for input.

[Mathematical expression 2]

$$r = \frac{1}{1+AV^2}\frac{V}{1}\delta \qquad \text{(Mathematical expression 2)}$$

In this expression, a stability factor A and a wheel base l are a parameter proper to a vehicle and are a value acquired in an experiment.

Besides, the lateral acceleration $G_y$ of the vehicle can be acquired in the following mathematical expression 3 using vehicular speed V, vehicular slip angle varying speed $\beta\_{dot}$ and a yaw rate r.

[Mathematical expression 3]

$$G_y = V(\dot\beta + r) \approx V \cdot r \qquad \text{(Mathematical expression 3)}$$

$\beta\_{dot}$ is a motion in a linear range of tire force and is quantity which can be omitted because it is small.

As described above, lateral acceleration $G_{ye\_wod}$ is calculated by multiplying the yaw rate r from which the dynamic characteristic is omitted and vehicle speed V. This lateral acceleration does not include the dynamic characteristic of the vehicle having a characteristic of a response lag in a low-frequency band.

This reason is as follows. To acquire vehicular lateral jerk information $G_{y\_dot}$, lateral acceleration $G_y$ is required to be differentiated in discrete time, that is, time differentiation processing is required to be applied to lateral acceleration measured by the lateral acceleration sensor. At this time, a noise component of a signal is increased. To use this signal for control, the signal is required to pass a low pass filter (LPF), however, this causes a phase lag. Then, a method of calculating acceleration in an earlier phase from which the dynamic characteristic is omitted than proper acceleration and making the calculated acceleration pass the LPF in a time constant $T_{lpfe}$ after discrete differentiation is adopted so as to acquire a jerk.

This may be also considered to be it that a dynamic characteristic of lateral acceleration is represented by a lag by the LPF and acquired acceleration is merely differentiated. Lateral acceleration $G_y$ is also made to pass the LPF in the same time constant $T_{lpfe}$. As a result, the dynamic characteristic is applied to the acceleration and though the drawing is omitted, it is verified that an actual acceleration response can be represented well in a linear range.

As described above, the method of calculating lateral acceleration $G_y$ and a lateral jerk $G_{y\_dot}$ using a steering angle has an advantage that the effect of noise is inhibited and a response lag of the lateral acceleration $G_y$ and the lateral jerk $G_{y\_dot}$ is reduced.

However, in this estimate method, as skid information of the vehicle is omitted and a nonlinear characteristic of the tire is ignored, the actual lateral acceleration of the vehicle is required to be measured and utilized when a slip angle increases.

Figure 12:
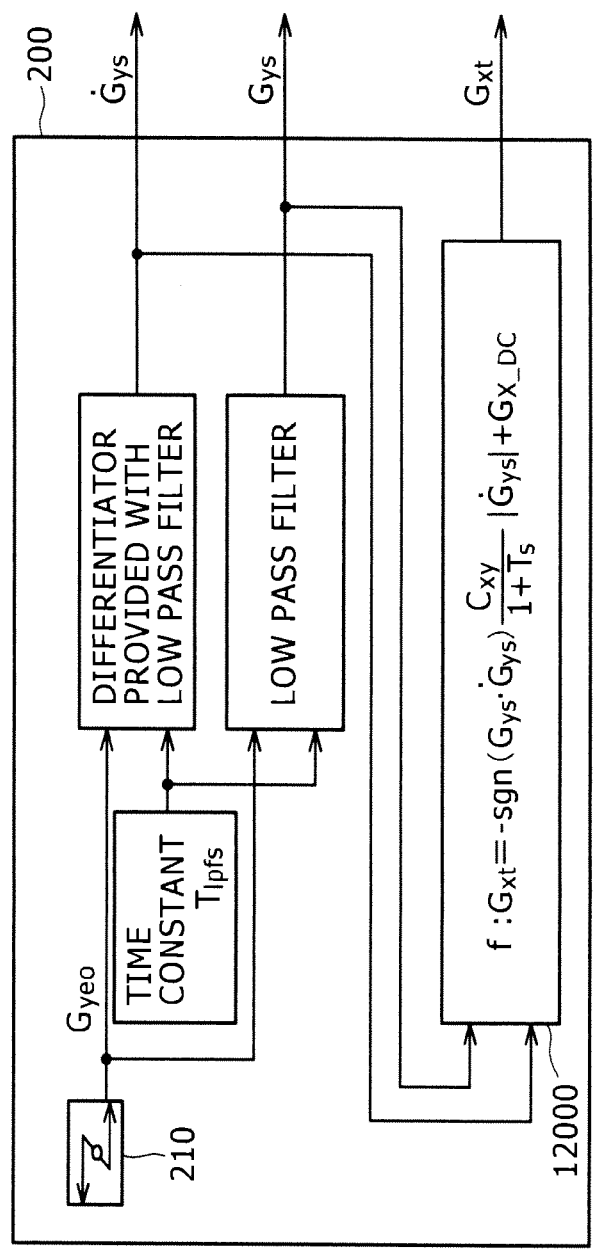
FIG. 12 shows vehicular lateral acceleration, a jerk respectively using a combined sensor and the output of a G-Vectoring command.

FIG. 12 shows a method of acquiring lateral acceleration $G_{ys}$ for control and jerk information $G_{ys\_dot}$ using a signal $G_{yeo}$ sensed by an MEMS element 210 in the combined sensor 200 for example. As noise components such as irregularities of road surfaces are included, the signal sensed by the element is also required to pass a low pass filter (a time constant $T_{lpfs}$) (not dynamic compensation).

In the combined sensor 200, a G-Vectoring control command is operated based upon the mathematical expression 1 in an acceleration/deceleration command arithmetic unit 12000 using acquired lateral acceleration $G_{ys}$ for control and lateral jerk information $G_{ys\_dot}$ and an acceleration/deceleration command value $G_{xt}$ may be also output.

Figure 13:
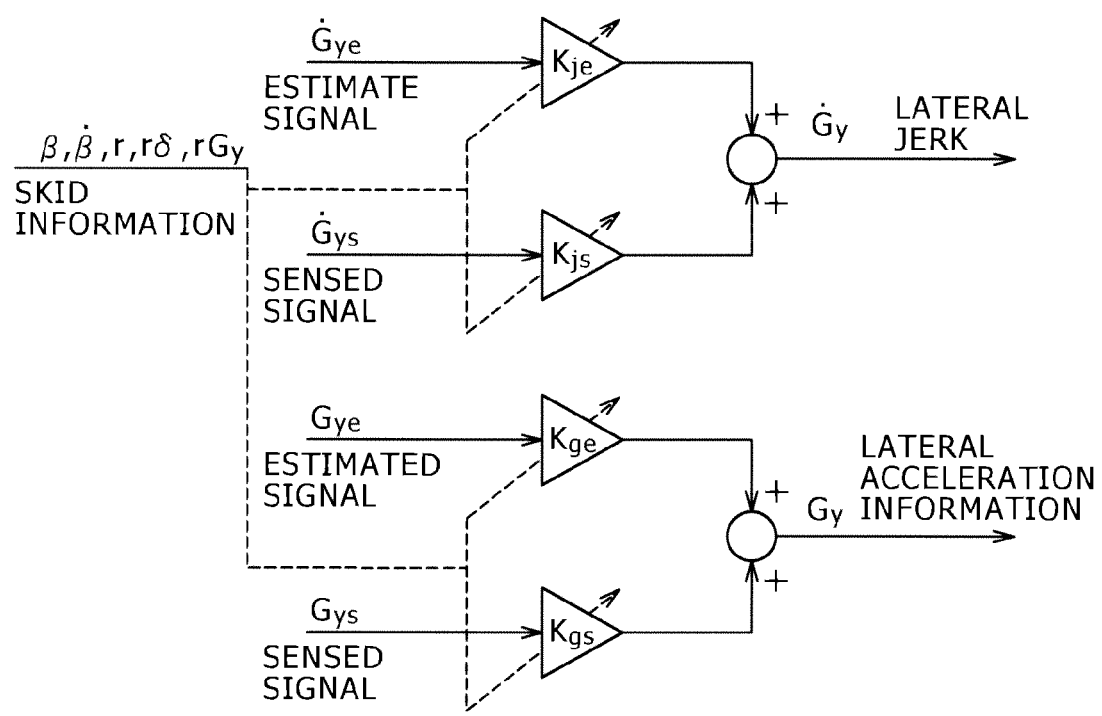
FIG. 13 shows a concept of mutual complement by an estimated signal and a sensed signal.

To make respective merits of the estimate and the measurement of lateral acceleration and a jerk compatible, in this embodiment, a method of complementarily using both signals as shown in FIG. 13 is adopted.

An estimated signal (a subscript of e is added) and a sensed signal (a subscript of s is added) are added by multiplying by gain made variable based upon skid information including a slip angle β and a yaw rate r.

Variable gain $K_{je}$ ($K_{je}$<1) for a lateral jerk estimated signal $G_{ye}$ is varied so that it has a great value in a region in which a slip angle is small and has a small value when a skid increases. Besides, variable gain $K_{js}$ ($K_{js}$<1) for a lateral jerk sensed signal $G_{ys\_dot}$ is varied so that it has a small value in the region in which a slip angle is small and has a great value when a skid increases.

Similarly, variable gain $K_{ge}$ ($K_{ge}$<1) for a lateral acceleration estimated value $G_{ye}$ is varied so that it has a great value in the region in which a slip angle is small and has a small value when a skid increases. Besides, variable gain $K_{gs}$ ($K_{gs}$<1) for a lateral acceleration sensed signal $G_{ys}$ is varied so that it has a small value in the region in which a slip angle is small and has a great value when a skid increases.

Such configuration enables small noise from a normal region in which a slip angle is small to a critical region in which a skid grows and acquiring an acceleration signal and a jerk signal respectively suitable for control. These gain is determined by a function of skid information or a map.

The configuration of the system in the first embodiment of the vehicular motion control system according to the present invention and the method of estimating lateral acceleration and a lateral jerk (these may be also included in the combined sensor 200 in which the sensors in FIG. 10 are integrated or as a logic in the central controller 40) have been described.

Next, system configuration including the logic according to the present invention will be described referring to FIG. 14. In this embodiment, the system configuration is control configuration in which acceleration/deceleration control by G-Vectoring described in a nonpatent literature 6 (Takahashi, Yamakado, Saito, Yokoyama: Actual vehicle performance evaluation of skid prevention system using the G-Vectoring control for understeer control, collection of Society of Automotive Engineers of Japan Vol. 41, No. 2, pp 195-200, 2010) and yaw moment control by vehicular skid prevention control (DYC) are fused.

Figure 14:
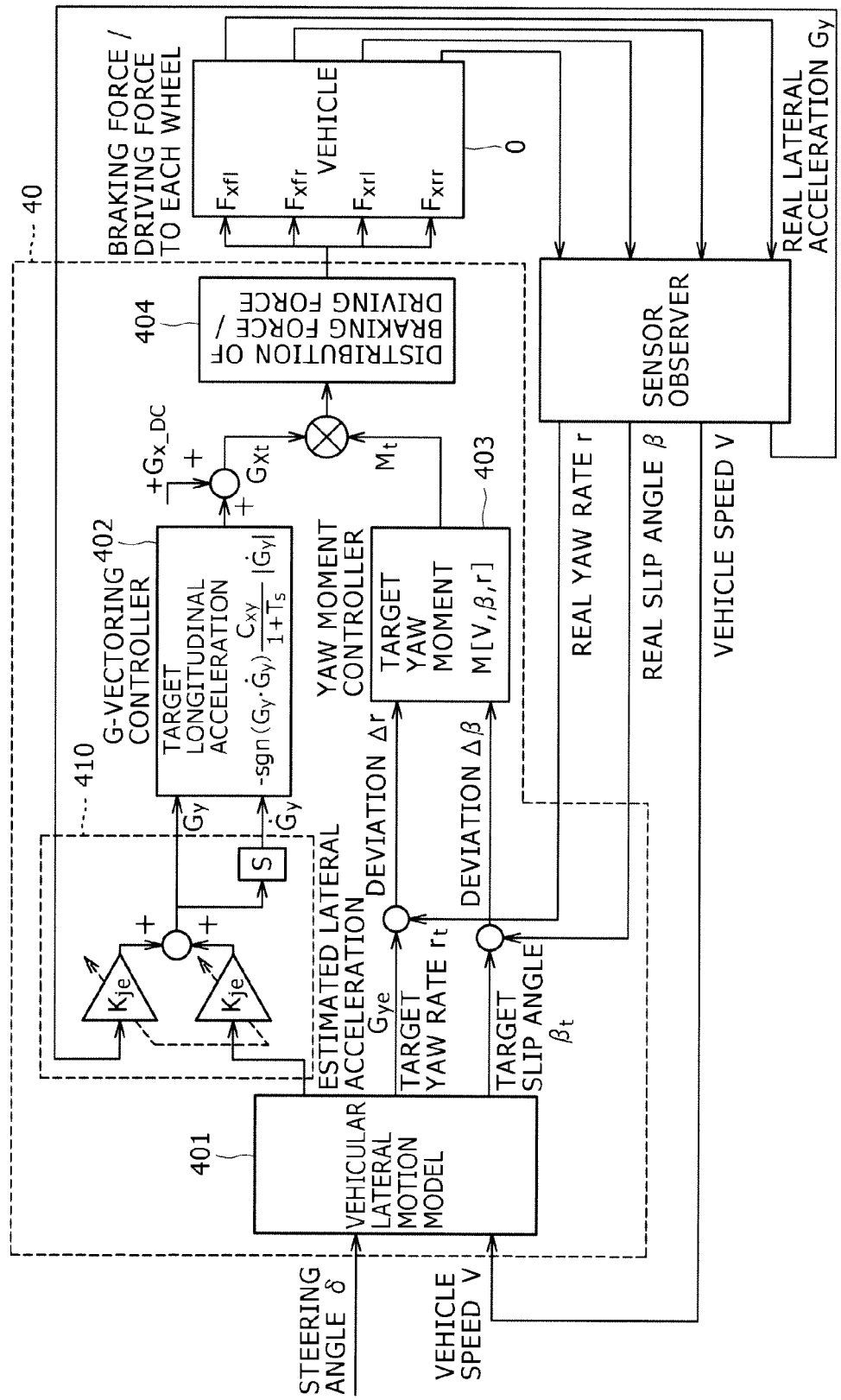
FIG. 14 shows control logic configuration of the motion control system of the vehicle according to the present invention.

FIG. 14 schematically shows relation among an operation control logic of the central controller 40 which is a control means, the vehicle 0 and an observer that estimates a slip angle based upon the group of sensors and a signal from the sensor (though the signal is operated in the central controller 40). The whole logic is roughly configured by a vehicular motion model 401, a G-Vectoring controller 402, a yaw moment controller 403 and a braking force/driving force distributor 404.

That is, the central controller 40 which is the control means generates an acceleration/deceleration command based upon a sensed steering angle δ and sensed vehicle speed V. It is an acceleration/deceleration command generating means (the vehicular motion model 401, the G-Vectoring controller 402 and the yaw moment controller 403) that generates the acceleration/deceleration command. Concretely, the acceleration/deceleration command includes target longitudinal acceleration and the target yaw moment respectively generated based upon a steering angle and vehicle speed. Besides, in the braking force/driving force distributor 404 which is a driving force/braking force distribution means, the distribution of the driving force or the driving torque of each wheel and/or braking force or braking torque is determined.

The vehicular motion model 401 estimates estimated lateral acceleration ($G_{ye}$), a target yaw rate $r_t$ and a target slip angle $β_t$ based upon a steering angle δ input from the driver steered angle sensor 33 and vehicle speed V using the mathematical expressions 2, 3. In this embodiment, the target yaw rate $r_t$ is set to the same as the yaw rate $r_δ$ acquired based upon steering described above.

As for lateral acceleration and a lateral jerk respectively input to the G-Vectoring controller 402, a signal processing unit (a logic) 410 that complementarily uses both signals as shown in FIG. 4 is adopted.

The G-Vectoring controller 402 determines a component linked with a current vehicular lateral motion in a target longitudinal acceleration command $G_{xt}$ using these lateral acceleration and lateral jerk according to the mathematical expression 1. Further, $G_{x\_DC}$ which is a deceleration component not linked with the current vehicular lateral motion is added, the target longitudinal acceleration command $G_{xt}$ is calculated, and the target longitudinal acceleration command is output to the braking force/driving force distributor 404. That is, the target longitudinal acceleration command $G_{xt}$ is calculated based upon estimated lateral acceleration calculated based upon a steering angle and vehicle speed and a lateral jerk calculated based upon the estimated lateral acceleration.

In this case, $G_{x\_DC}$ is an item required for foreseen deceleration when a corner exists in front or when an interval speed command is issued. As the interval speed command is information determined based upon coordinates on which the driver's vehicle exists, it can be determined by collating coordinate data acquired by GPS and others with map information in which the interval speed command is included.

Next, though the details of sensing are omitted in this embodiment, foreseen deceleration for a corner in front can be realized by a method of taking information in front of the driver's vehicle such as obstacle information, preceding vehicle information and following vehicle information depending upon a camera such as a single-lens camera and a stereoscopic camera, a laser, a distance measuring radar in units of a millimeter wave and others or GPS information and others as an external information sensing means and accelerating/decelerating according to a future lateral motion (a future lateral jerk) not actual at the present time. In this case, control that an acceleration/deceleration command is turned zero by external field information including any of obstacle information, preceding vehicle information and following vehicle information respectively sensed by the external information sensing means can be also made.

A future steering angle is estimated as in a so-called driver model in which a steering angle is determined using a path in forward watch distance/time and deviation information in the driver's vehicle reach estimated position. Foreseen deceleration for a corner in front is enabled by performing G-Vectoring as in the mathematical expression 1 according to a future lateral jerk to be generated in the vehicle by steering operation (preview G-Vectoring).

Next, the target yaw moment $M_t$ is calculated based upon deviation Δr between a target yaw rate $r_t$ ($r_δ$) and a target slip angle $β_t$ and deviation Δβ between a real yaw rate and a real (estimated) slip angle in the yaw moment controller 403 and is output to a braking force/driving force distributor 404. The target yaw moment $M_t$ is calculated based upon a steering angle, vehicle speed, a yaw rate and a slip angle of the vehicle.

The braking force/driving force distributor 404 first determines initial basic braking force/driving force ($F_{xfl\_o}$, $F_{xfr\_o}$, $F_{xrl\_o}$, $F_{xrr\_o}$) of the four wheels of the vehicle 0 based upon a target longitudinal acceleration command $G_{Xt}$ which is an acceleration/deceleration command and the target yaw moment $M_t$. The braking force/driving force distributor has such configuration that the basic braking force/driving force is distributed according to the distribution of braking force/ driving force (hereinafter called diagonal distribution) according to the present invention based upon a turning direction sensed based upon at least any of an input steering angle, an input vehicular yaw rate and input vehicular lateral acceleration.

In the distribution of braking force/driving force (hereinafter called diagonal distribution) according to the present invention, as it is determined that for the front wheels, more driving force/driving torque and/or more braking force/braking torque are/is distributed to the inside front wheel in turning than that to the outside front wheel in turning and for the rear wheels, more driving force/driving torque and/or more braking force/braking torque are/is distributed to the outside rear wheel in turning than that to the inside rear wheel in turning, a normal load on the side of the inside wheel decreases because of the transfer of a load from the inside wheel in turning to the outside wheel in turning when lateral acceleration increases, longitudinal force decreases because of the increase of slip ratio, and lateral force also decreases.

In such a situation, the diagonal distribution is not effective any longer and is required to be returned to the basic braking force/driving force of the four wheels described above (a degree of the diagonal distribution is gradually decreased). In view of such a background, the basic braking force/driving force is first calculated. First, an initial basic distribution rule will be described and afterward, the details of the diagonal distribution will be described.

Figure 15:
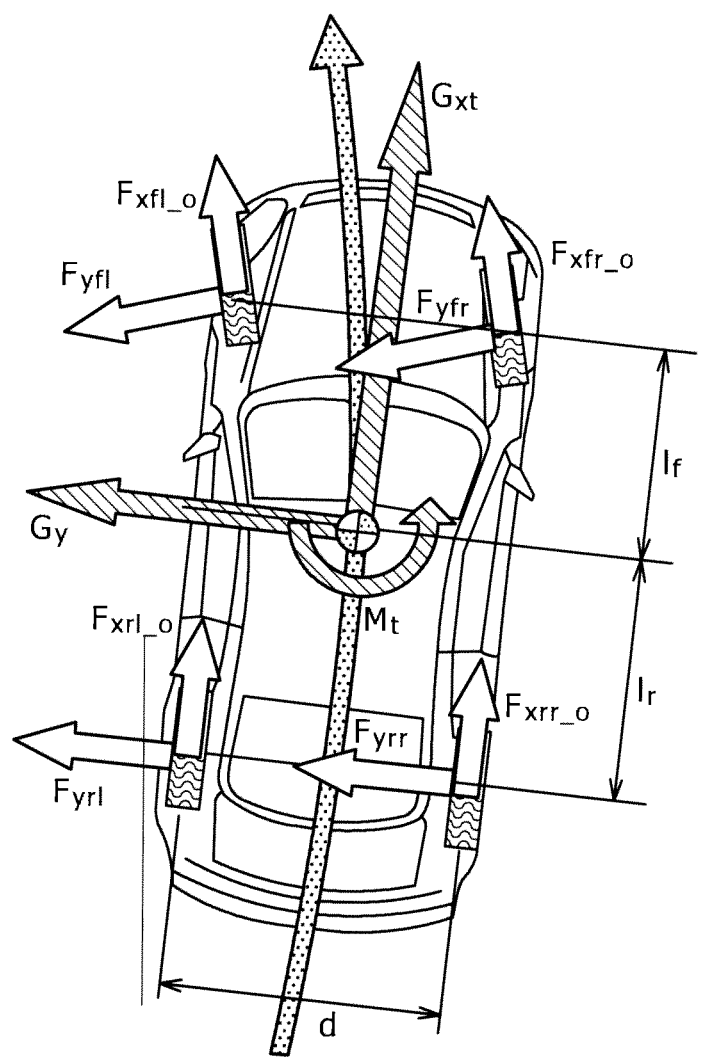
FIG. 15 shows force applied to the vehicle, acceleration and a yawing motion.

Referring to FIG. 15, equations of a longitudinal motion, a lateral motion and a yawing motion will be considered. To make the equations clearly understandable, braking force/driving force and tire lateral force for the two wheels will be redefined as follows.

[Mathematical expression 4]

$$F_{xr\_o} = F_{xfr\_o} + F_{xrr\_o} \qquad \text{(Mathematical expression 4)}$$

[Mathematical expression 5]

$$F_{xl\_o} = F_{xfl\_o} + F_{xrl\_o} \qquad \text{(Mathematical expression 5)}$$

[Mathematical expression 6]

$$F_{yf} = F_{yfl} + F_{yfr} \qquad \text{(Mathematical expression 6)}$$

[Mathematical expression 7]

$$F_{yr} = F_{yrl} + F_{yrr} \qquad \text{(Mathematical expression 7)}$$

When the above-mentioned force for the two wheels is redefined as described above, various motions will be expressed as follows.

<Longitudinal Motion>

[Mathematical expression 8]

$$mG_{xt} = F_{xl\_o} + F_{xr\_o} \qquad \text{(Mathematical expression 8)}$$

<Lateral Motion>

[Mathematical expression 9]

$$mG_y = F_{yF} + F_{yr} \qquad \text{(Mathematical expression 9)}$$

<Yawing Motion>

[Mathematical expression 10]

$$I_z \cdot \dot{r} = (l_f F_{yf} - l_r F_{yr}) + \frac{d}{2}(F_{xr\_o} - F_{xl\_o}) \qquad \text{(Mathematical expression 10)}$$

Further, the target yawing moment and braking force/driving force to each wheel will be expressed as follows.

[Mathematical expression 11]

$$M_t = \frac{d}{2}(F_{xr\_o} - F_{xl\_o}) \qquad \text{(Mathematical expression 11)}$$

When the longitudinal motion (mathematical expression 8) and the yawing moment (mathematical expression 11) are apposed, they can be analytically settled with two unknown letters and two expressions as follows.

[Mathematical expression 12]

$$F_{xl\_o} = \frac{m}{2}G_{xt} + \frac{M_t}{d} \qquad \text{(Mathematical expression 12)}$$

[Mathematical expression 13]

$$F_{xr\_o} = \frac{m}{2}G_{xt} - \frac{M_t}{d} \qquad \text{(Mathematical expression 13)}$$

As a result, braking force/driving force for the two front and rear wheels on the right side and braking force/driving force for the two front and rear wheels on the left side where an acceleration/deceleration command by the G-Vectoring control and a moment command by skid prevention control are made compatible can be distributed.

Next, these are distributed to the front and rear wheels according to the ratio in a normal load of the front and rear wheels. When the height from the ground of the sprung center of gravity of the vehicle 0 is h and the vehicle 0 is accelerated/ decelerated at $G_{xt}$, loads ($W_f$, $W_r$) for the two front and rear wheels are as follows.

[Mathematical expression 14]

$$W_f = \frac{mgl_r - mhG_{xt}}{l} \qquad \text{(Mathematical expression 14)}$$

[Mathematical expression 15]

$$W_r = \frac{mgl_f + mhG_{xt}}{l} \qquad \text{(Mathematical expression 15)}$$

Therefore, the braking force/driving force of the four wheels distributed according to the ratio of loads are as follows.

[Mathematical expression 16]

$$F_{xfl\_o} = \frac{gl_r - hG_{xt}}{gl}\left(\frac{m}{2}G_{xt} + \frac{M_t}{d}\right) \qquad \text{(Mathematical expression 16)}$$

-continued

[Mathematical expression 17]

$$F_{xfr\_o} = \frac{gl_r - hG_{xt}}{gl}\left(\frac{m}{2}G_{xt} - \frac{M_t}{d}\right)$$ (Mathematical expression 17)

[Mathematical expression 18]

$$F_{xrl\_o} = \frac{gl_f + hG_{xt}}{gl}\left(\frac{m}{2}G_{xt} + \frac{M_t}{d}\right)$$ (Mathematical expression 18)

[Mathematical expression 19]

$$F_{xrr\_o} = \frac{gl_f + hG_{xt}}{gl}\left(\frac{m}{2}G_{xt} - \frac{M_t}{d}\right)$$ (Mathematical expression 19)

However, as follows.

[Mathematical expression 20]

$$G_{xt} = -\text{sgn}(G_y \cdot \dot{G}_y)\frac{C_{xy}}{1+T_s}|\dot{G}_y| + G_{x\_DC}$$ (Mathematical expression 20)

[Mathematical expression 21]

$$M_t = M(r_\delta \cdot rG_y \cdot r_s \cdot \beta_t \cdot \beta_s)$$ (Mathematical expression 21)

The details of the mathematical expression 21 are calculated using the similar method to a method disclosed in Japanese Unexamined Patent Application Publication No. 1997-315277.

The initial basic distribution rule has been described. When the mathematical expression 19 is viewed in view of the mathematical expression 16, it can be said that a yaw moment command by slid prevention control is distributed according to a static load of the front and rear wheels while a G-Vectoring control command value $G_{xt}$ is zero and braking force/driving force for realizing longitudinal acceleration and/is distributed longitudinally according to weight distribution ratio with the same value applied to the right and left wheels so as to prevent extra moment from being caused while a G-Vectoring control command value $G_{xt}$ is not zero.

Next, a concrete method of diagonally distributing initial basic braking force/driving force determined in the mathematical expression 19 based upon the mathematical expression 16 will be described referring to FIG. 16.

First, the sum of the front wheels $F_{xfl\_o}$ and $F_{xfr\_o}$ and the sum of the rear wheels $F_{xrl\_o}$ and $F_{xrr\_o}$ in initial basic distribution are calculated. Braking force/driving force ($F_{xfl}$, $F_{xfr}$, $F_{xrl}$, $F_{xrr}$) to each wheel and/is determined by multiplying the sum by gain of $(1+\alpha)/2$ as to the left front wheel, multiplying the sum by gain of $(1-\alpha)/2$ as to the right front wheel, multiplying the sum by gain of $(1-\alpha)/2$ as to the left rear wheel and multiplying the sum by gain of $(1+\alpha)/2$ as to the right rear wheel.

A lateral distribution index α will be described below. α can have values between +1 and −1. A situation in which α has a characteristic value will be described to acquire intuitive understanding below:

(1) When α=0, the same braking force/driving force is caused in the front wheels or the rear wheels.
(2) When α=1, braking force/driving force is caused only in the left front wheel and the right rear wheel.
(3) When α=−1, braking force/driving force is caused only in the right front wheel and the left rear wheel.

As clear from the above-mentioned, when a is positive, control is made in leftward turning so that more braking force/driving force is caused in the inside front wheel in turning and the outside rear wheel in turning and at this time, the maneuverability and stability are enhanced. Conversely, when α is negative, control is made in rightward turning so that more braking force/driving force is caused in the inside front wheel in turning and the outside rear wheel in turning and at this time, the maneuverability and stability are enhanced.

In leftward turning, a steering angle, a yaw rate and lateral acceleration $G_y$ have positive values (a standard by JASO that the z-axis is positive upward is adopted). Therefore, as shown in FIG. 16, in a graph having acceleration on an abscissa for example, when lateral acceleration $G_y$ is positive, α has only to be set to have a positive value (<1) and when lateral acceleration $G_y$ is negative, α has only to be set to have a negative value (>−1). In place of lateral acceleration $G_y$, α may be also determined based upon whether a steering angle δ and a yaw rate r are positive or not.

To determine α, operation (α≠0) or nonoperation (α=0) may be also selected a moment command Mzt. As Mzt is calculated based upon slid information of the vehicle, Mzt is issued when skid occurs in the vehicle and stability is deteriorated.

In diagonal distribution control according to the present invention, as braking force/braking torque and/or driving force/driving torque are/is distributed to the inside wheel and the outside wheel of the vehicle, moment is basically not directly applied to the vehicle.

However, generally, it is considered that when skid prevention control is operated, the vehicle is in an unstable condition. Accordingly, for safety, in a situation that yaw moment control is operated based upon the mathematical expression 21, the diagonal distribution control is stopped, that is, α may be also set to 0. That is, when a skid prevention function is operated, control over the distribution of driving force/driving torque and/or braking force/braking torque to each wheel may be also stopped.

Besides, when lateral acceleration $G_y$ increases, a load inside turning remarkably decreases because of the balance of the moment by inertia force, the slip ratio of the inside front wheel rapidly rises in the diagonal distribution, the cornering force of the front wheel also decreases far from being unable to realize deceleration, and the front of the vehicle slips.

Figure 16:
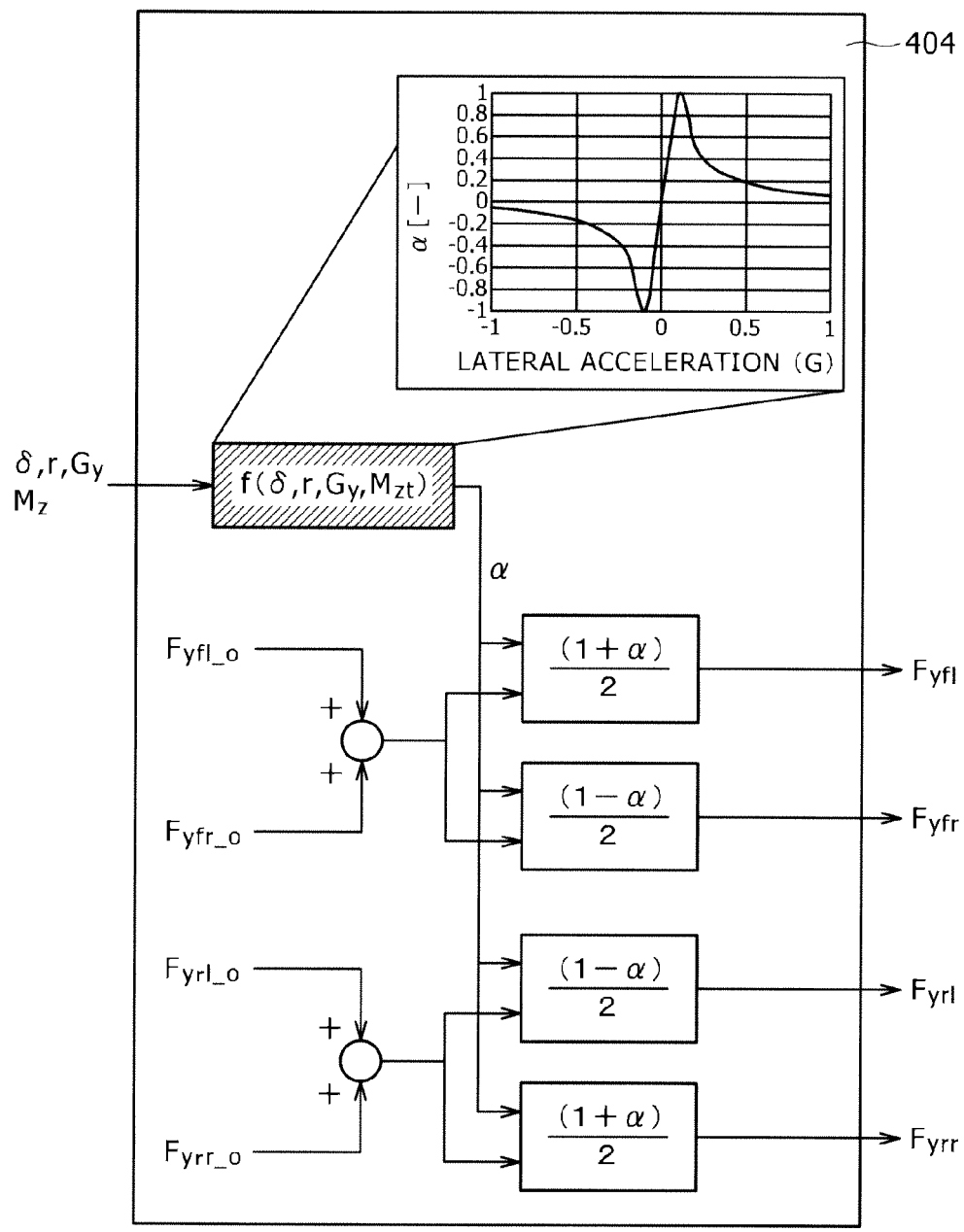
FIG. 16 shows the determination of the ratio α of distribution to each wheel and the distribution of braking force/driving force.

In the graph (the map) in which relation with lateral acceleration $G_y$–α shown in FIG. 16 is determined, when an absolute value of lateral acceleration $G_y$ grows, a value of a is made to approximate zero and control is made so that the diagonal distribution is made to approximate basic distribution in which braking force/driving force is equally distributed to the right and left wheels. Besides, even if longitudinal acceleration $G_x$ or a product of longitudinal acceleration $G_x$ and lateral acceleration $G_y$ is used so as to adjust so that α similarly decreases, the similar or more effect is acquired.

Further, as shown in FIGS. 8C and 9C, when such control over braking force and driving force that braking force is applied to the inside front wheel and driving force is applied to the outside front wheel is simultaneously made, the control can be facilitated by doubling a value of α at the maximum.

For example, when α=2, control is made so that deceleration of 1.5 times for twice in basic distribution is produced in the inside front wheel and braking force of −0.5 times, that is, driving force for twice in the basic distribution is produced in the outside front wheel. Hereby, braking force can be produced in the inside front wheel and driving force can be produced in the outside front wheel, producing the same braking force in lateral total as that in the basic distribution (for the rear wheels, also similar).

A motion of the vehicle when the diagonal distribution control according to the present invention is applied will be described on the supposition of concrete running below.

A supposed scene is similar to the scene shown in FIG. 6. A general running scene including approach and escape to/from a corner in which a direct advance route A, a transient interval B, a steady turning interval C, a transient interval D and a direct advance interval E are included is supposed. At this time, no acceleration/deceleration operation by a driver shall be made.

Figure 17:
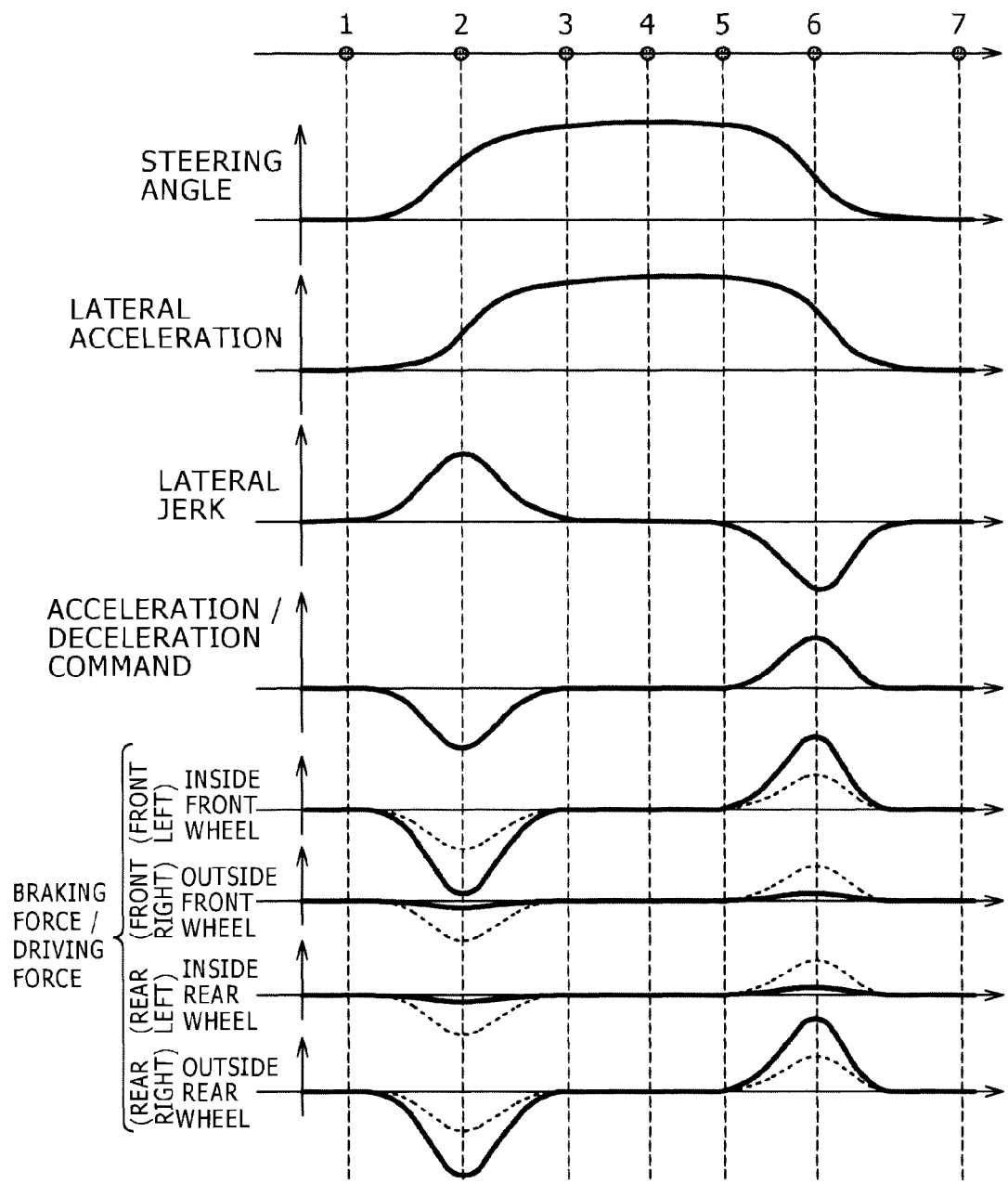
FIG. 17 shows time series data of the vehicle under control according to the present invention in the case of running shown in FIG. 6.
Figure 19:
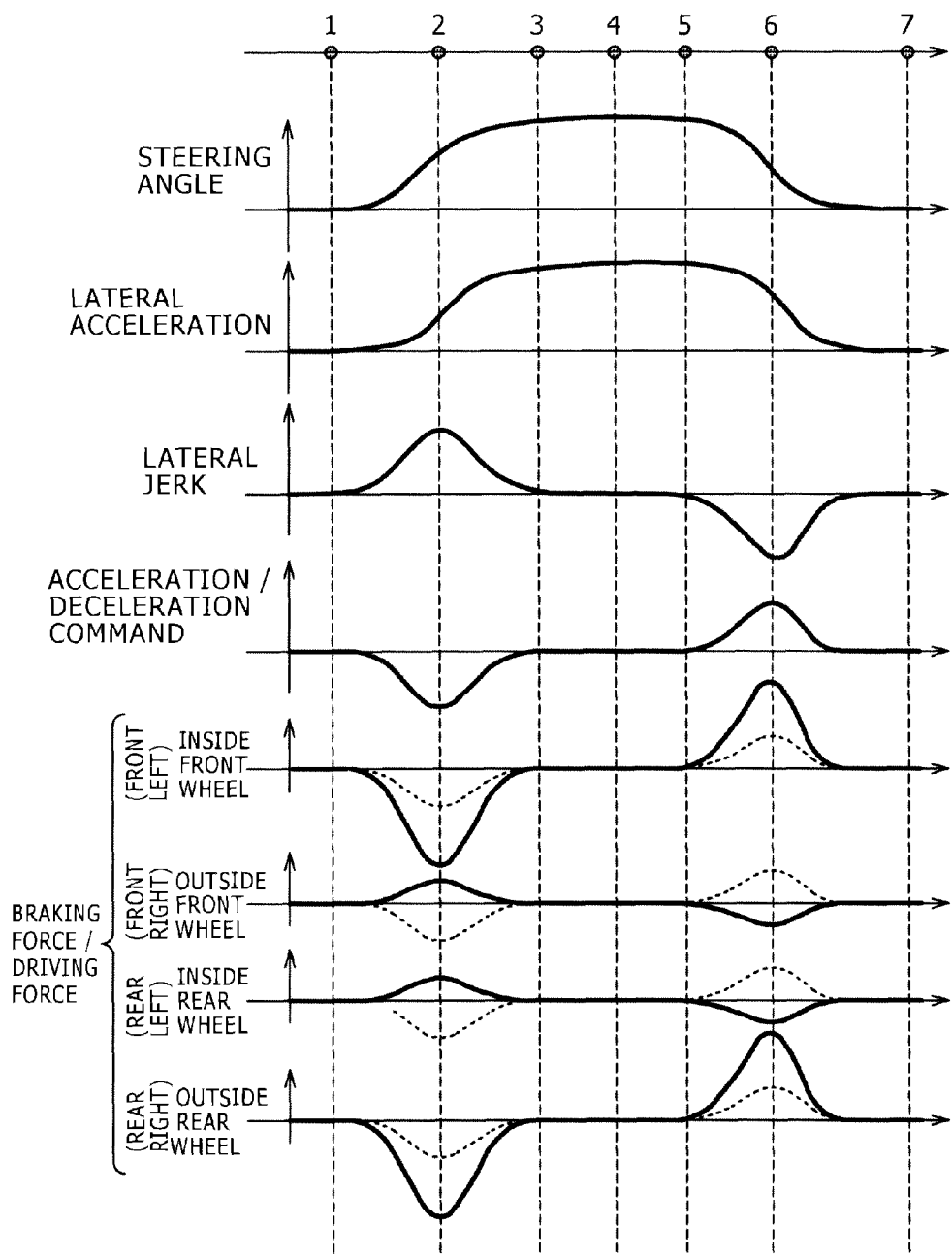
FIG. 19 shows time series data of the vehicle under braking/driving force simultaneous distribution control according to the present invention in the case of running shown in FIG. 6.

FIG. 17 shows a steering angle, lateral acceleration, a lateral jerk, an acceleration/deceleration command calculated in the mathematical expression 1 and the results of diagonally distributing force for braking and driving the four wheels as waveforms in a time history.

As described above, more driving force/braking force is distributed to the inside front wheel and the outside rear wheel and less driving force/braking force is distributed to the outside front wheel and the inside rear wheel.

FIG. 18(a) to FIG. 18(e) show a situation in which braking force/driving force at this time and the compliance steer of the front and rear wheels are generated every point time (1 to 7) shown on the upside of FIG. 17.

As described above, when the G-Vectoring control is applied to the vehicle, an acceleration/deceleration motion linked with a lateral motion can be realized if only a driver steers for turning.

Besides, the similar control to four-wheel active steer is enabled by diagonally distributing braking force and driving force for realizing acceleration/deceleration (by distributing more driving force/braking force to the inside front wheel and the outside rear wheel).

In addition, as acceleration/deceleration basically realized by the G-Vectoring control is also realized in a condition of the diagonal distribution, this motion is a characteristic motion having smooth curved transition as shown on the downside of FIG. 6 when this motion is expressed in a "g-g" diagram having longitudinal acceleration on an axis of abscissas, having lateral acceleration on an axis of ordinates and showing a mode of acceleration caused in the vehicle.

This curved transition shows clockwise transition at a left corner as shown on the downside of FIG. 6, shows transition inverted on an axis of $G_x$ at a right corner, and a direction of the transition is counterclockwise. In such transition, a pitching motion caused in the vehicle by longitudinal acceleration and a roll motion caused by lateral acceleration are suitably linked and peak values of a roll rate and a pitching rate are reduced.

FIG. 19 and FIGS. 20(a) to 20(e) show a situation in which the diagonal distribution control according to the present invention that braking force/driving force are simultaneously generated is applied in addition to the diagonal distribution. A supposed scene is similar to those in FIG. 6, FIG. 17 and FIGS. 18(a) to 18(e).

An acceleration/deceleration command by the G-Vectoring control is realized, simultaneously controlling braking force and driving force. Compared with FIGS. 17 and 18, effect closer to four-wheel active steer is acquired.

Figure 21:
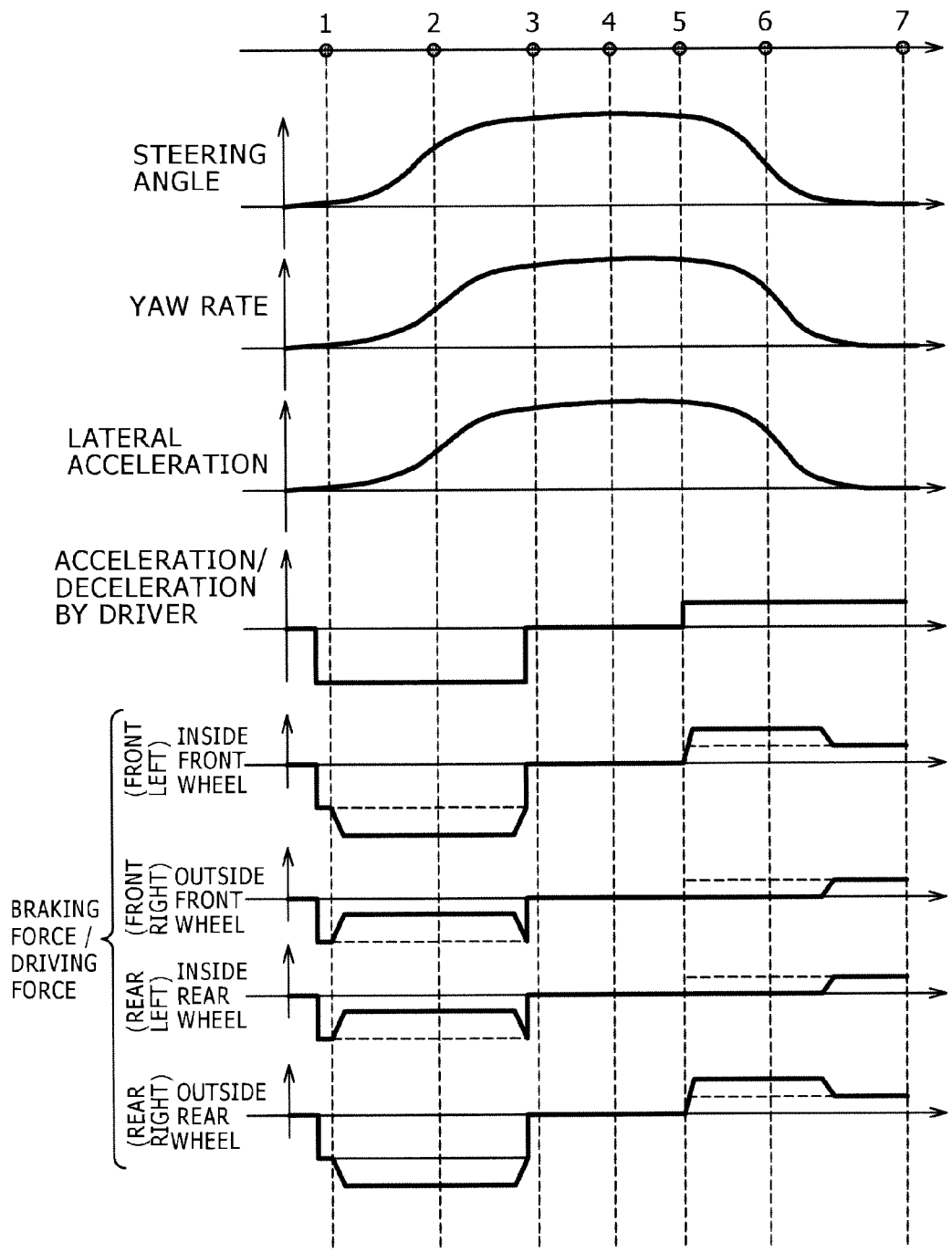
FIG. 21 shows time series data of the vehicle under braking force/driving force distribution control according to the present invention when a driver inputs an acceleration/deceleration command in the case of running shown in FIG. 6.
Figure 22:
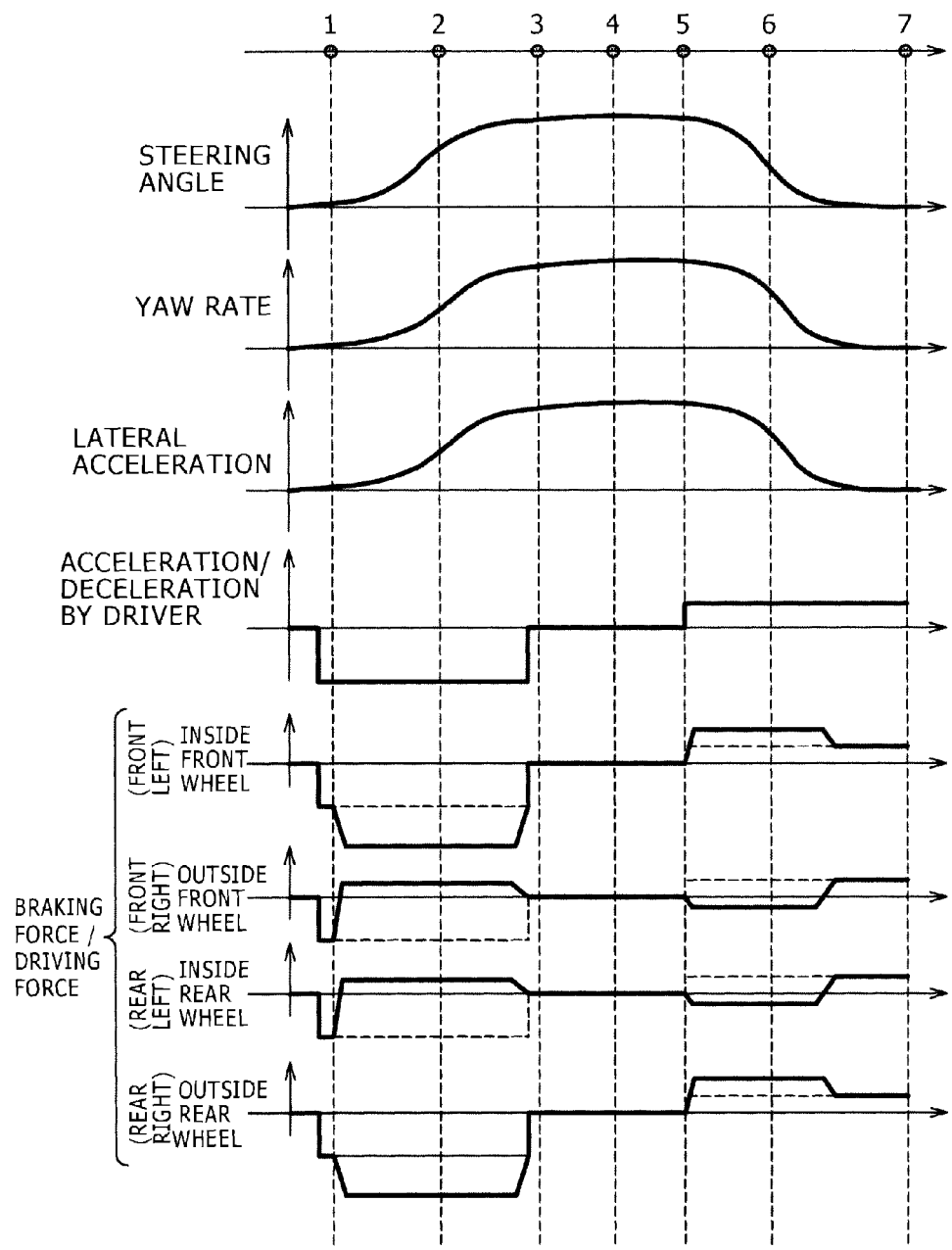
FIG. 22 shows time series data of the vehicle under braking force, braking/driving force simultaneous distribution control according to the present invention when the driver inputs an acceleration/deceleration command in the case of running shown in FIG. 6.

Further, FIGS. 21 and 22 show not only automatic acceleration/deceleration control by the G-Vectoring control but results of a case that braking force and driving force are individually distributed (FIG. 21) and a case that they are simultaneously distributed (FIG. 22) respectively according to braking operation and acceleration operation by a driver.

A turning direction is also sensed based upon a steering angle, a yaw rate or lateral acceleration for the input of acceleration/deceleration from a driver, for the front wheels, more driving force/driving torque and more braking force/braking torque can be distributed to the inside wheel in turning, and for the rear wheels, more driving force/driving torque and more braking force/braking torque can be distributed to the outside wheel in turning. An acceleration command is turned zero when a braking operation command from a driver is input and a deceleration command is turned zero when an accelerating operation command from the driver is input.

Similarly, the distribution rule described in the present invention can be also applied to acceleration/deceleration control linked with a lateral motion based upon a control rule except G-Vectoring.

Next, a result of applying the present invention to full vehicle simulation will be described.

Figure 23:
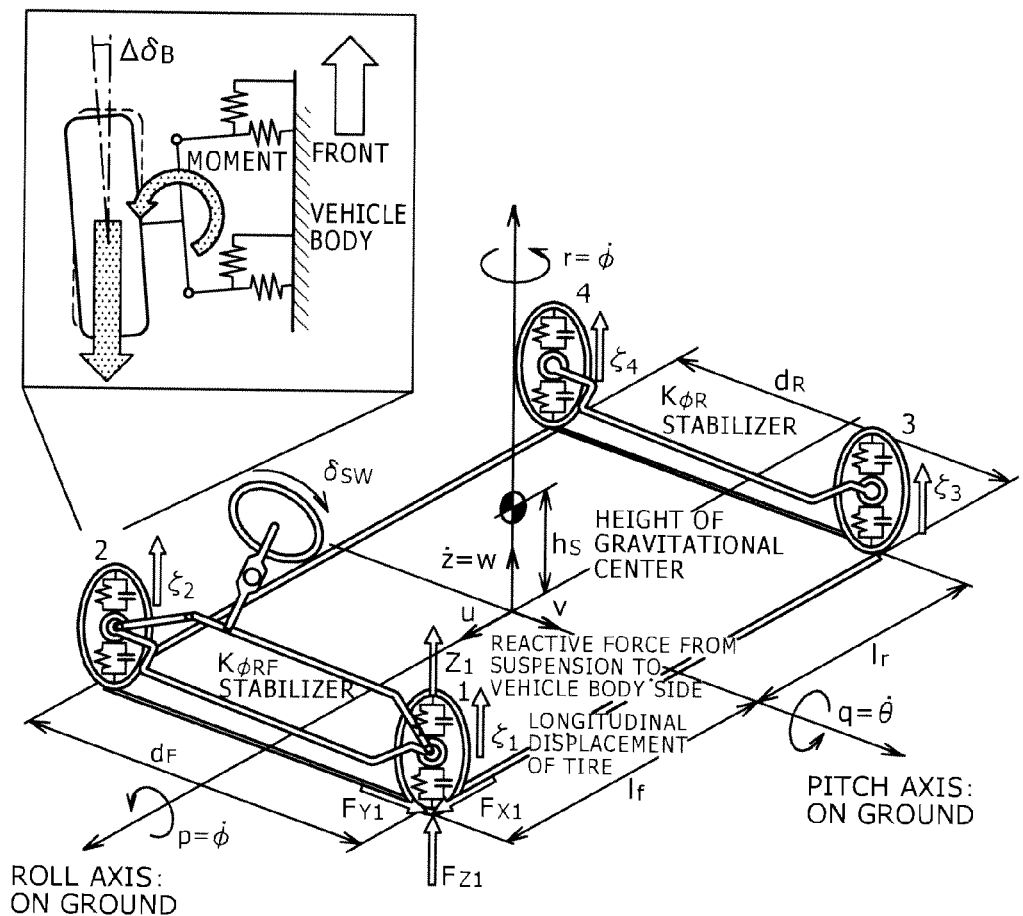
FIG. 23 shows a vehicle model in full vehicle simulation.

FIG. 23 shows a simulation model. Each wheel is modeled as shown in FIG. 23 so that compliance steer is caused by longitudinal force or lateral force. A compliance value is set to a consistent value such as 0.5° outside to 0.5° inside/980 N (braking force/driving force) according to the nonpatent literature 5, 0 to 0.2° outside/980 N as to the front wheel and −0.1 to 0.1° inside/980 N as to the rear wheel (compliance steer by lateral force is also considered). As for a tire model, force in a longitudinal direction and force in a lateral direction can be simultaneously considered.

In the simulation, a brushed tire model adjusted based upon experimental data is used.

Though a concrete equation of motion is omitted, numerical calculation is made based upon the similar equation to an equation (p. 11: Expression (2.1.24-1) to (2.1.24-6) described in Chap. 2, "Motion equation of automobile and its linearization" of a nonpatent literature 7 (H. Harada: Vehicle dynamics for automotive engineers, Industrial science systems, pp. 8-11, pp. 152-153, 2005).

FIGS. 24A to 24C show results of calculation in which the similar situation that turning is started from a line and is escaped after steady turning to FIG. 6 is simulated. As they are the results of calculation based upon input of a steering angle, an effect that a steering angle is turned from the side of the tire (compliance with an arm of a driver) is not considered.

FIG. 24(a) shows a case of no acceleration/deceleration control linked with a lateral motion, FIG. 24(b) shows a case of only the G-Vectoring control, and FIG. 24(c) shows a result of the calculation of a steering angle according to the present invention in which G-Vectoring and the diagonal distribution are combined (the steering angle is shown in the shape of an angle of the tire).

In the calculation shown in FIG. 24C according to the present invention, to clarify the effect, distribution to the outside front wheel and the inside rear wheel is set to zero (that is, a case of α=0 in FIG. 16).

Besides, a drawing in which an orientation of each wheel is schematically shown is also shown in the result of each calculation. As compliance steer by lateral force (in a direction of toe-out) is added and especially in escape of turning, only lower acceleration (lower driving force), compared with deceleration can be realized, the variation by control of a steering angle is not great so much. Nevertheless, it is known in view of time when turning is started and time when turning is escaped in FIG. 24 that the control of compliance steer by the diagonal distribution of braking force/driving force according to the present invention which has been described can be realized. It is known that especially, a steering angle of the front wheel increases at the beginning of turning (to an extent that toe-out is corrected by braking force equally distributed to the front wheels by the G-Vectoring control).

Figure 25:
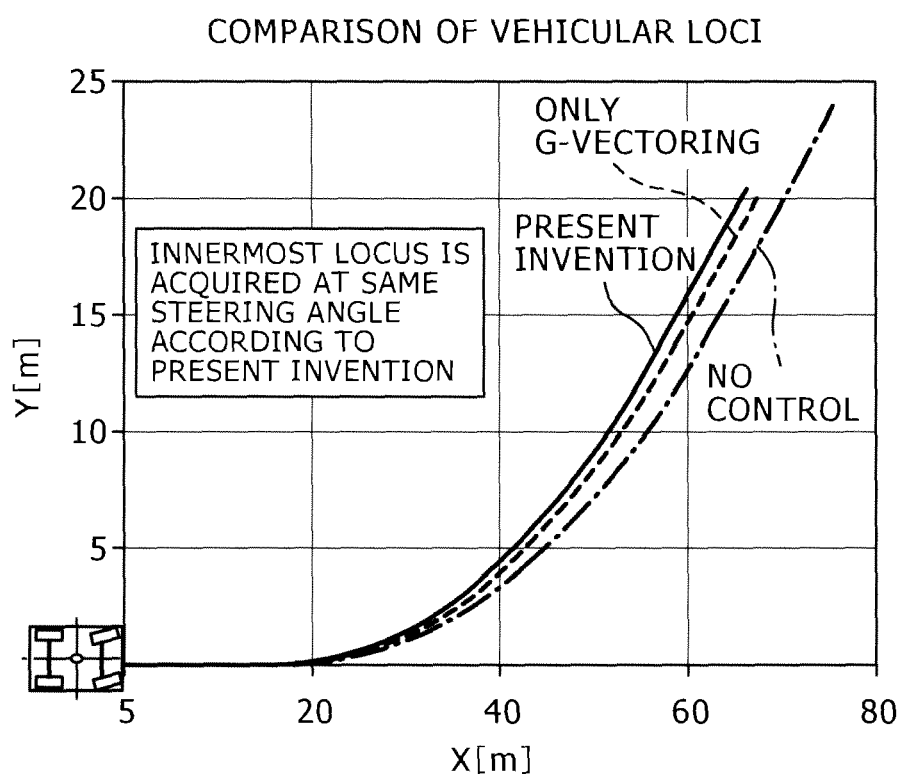
FIG. 25 shows results in comparison in a vehicular locus of the full vehicle simulation.

Further, FIG. 25 shows a result of calculation in which a locus at this time of the vehicle is compared. As the interval of steady turning (the point time 3 to 5 shown on the upside of FIG. 17) is short, the steady turning is not in the shape of a U-turn. In spite of the same steering angle (viewed from a driver), it is known that the vehicle is turned inside in the case of only the G-Vectoring control, compared with the case of no control and the vehicle is turned more inside in the case of control according to the present invention.

The inventors execute driving simulator experiments and verify that in a situation in which a driver enters a blind corner and the blind corner has a sharp curve, he/she cannot tread a brake pedal promptly though he/she more turns the steering wheel. In such a situation, when the G-Vectoring control and further, the present invention are applied, it can be expected that deviation from a road can be also avoided and safety is greatly enhanced.

The above description of the first embodiment related to the vehicle 0 in which braking force/driving force can be freely controlled every wheel is finished.

Next, the configuration of a vehicle equivalent to a second embodiment in which the present invention is applied to a normal vehicle where four wheels are independent and only deceleration torque can be controlled will be described and a result of experiment actually using the vehicle will be described.

Second Embodiment

Figure 26:
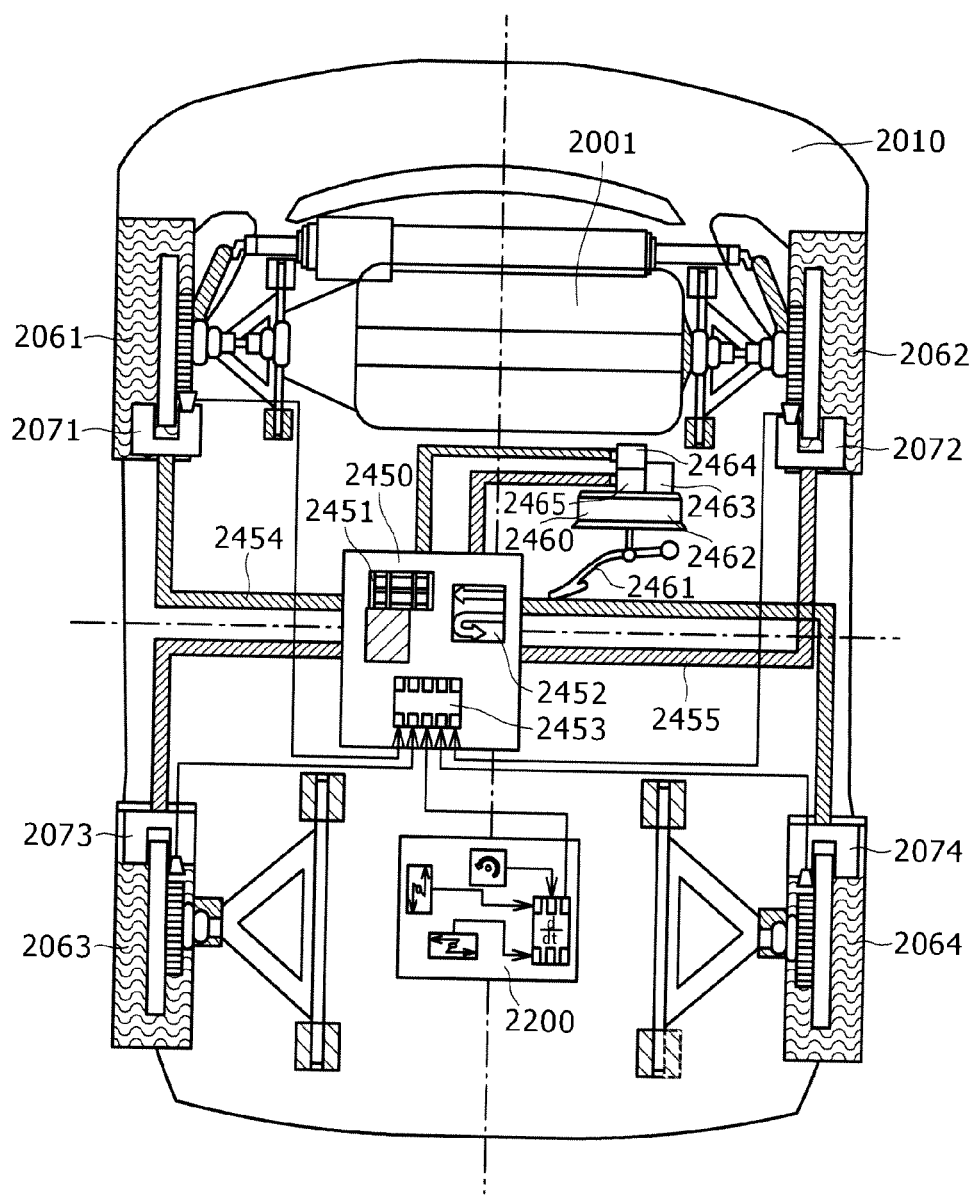
FIG. 26 shows the whole configuration of a second embodiment of the motion control system of the vehicle according to the present invention.

FIG. 26 shows the whole configuration of a second embodiment of the vehicular motion control system according to the present invention.

In a vehicle 2010 in this embodiment, front wheels are driven by an engine 2001. A braking device 2460 is a hydraulic brake and is provided with a brake pedal 2461, an electric servo unit 2462, a primary piston 2464, and a secondary piston 2465.

A hydraulic oil piping is a general so-called X piping (diagonal piping), normally, a brake caliper 2071 for a left front wheel 2061 and a brake caliper 2074 for a right rear wheel 2064 communicate via a hydraulic oil piping 2454, and a brake caliper 2072 for a right front wheel 2062 and a brake caliper 2073 for a left rear wheel 2063 communicate via a hydraulic oil piping 2455 (basically, the hydraulic oil piping 2454 is pressurized by the primary piston 2464 and the hydraulic oil piping 2455 is pressurized by the secondary piston 2465).

Further, a skid prevention device 2450 is provided and can independently control the driving force and/or the braking force of each of the four wheels based upon skid information (a slip angle $\beta$ and a yaw rate r) calculated based upon a steering angle and vehicle speed or sensed.

For a sensor, a combined sensor 2200 manufactured by MEMS that can sense longitudinal acceleration, lateral acceleration and a yaw rate is mounted. The sensor may be also mounted in the vicinity of the center of gravity of the vehicle or in the skid prevention device so as to enable sensing longitudinal acceleration and lateral acceleration respectively by coordinate transformation in the center of gravity of the vehicle (a yaw rate is substantially the same). The combined sensor 2200 is provided with an arithmetic circuit such as a differentiating circuit, a lateral jerk is acquired by differentiating information proportional to lateral acceleration output from a sensing element, a G-Vectoring control command is calculated in a mathematical expression 1, and is output to the electronic stability control device 2450.

The electronic stability control device 2450 which is a control means is provided with an oil pressure generator 2451 that drives a gear pump of a seal block type by a motor, a group of oil pressure proportional/on-off valves 2452 and a controller 2453, and controls pressure in the hydraulic oil piping 2454 and pressure in the hydraulic oil piping 2455.

In this configuration, when a skid prevention function is operated, a diagonal distribution function according to the present invention is stopped though the details of its logic are described above. Besides, this configuration is such configuration that control is stopped when a back gear is put in a view of a gear position of a transmission, control is stopped.

A diameter of the piston that presses a brake pad of the front/rear wheel and an effective radius from an axle to the center of the pad are different between the front wheel and the rear wheel and they are designed to approach braking force ideal distribution in consideration of the transfer of a load (refer to a nonpatent literature 7: Chap. 7, Braking performance and driving performance, 7.2 Distribution of braking force, pp. 152-153).

In the present invention, in leftward turning, great braking force is required to be generated in the left front wheel 2061 which is the inside front wheel and the right rear wheel 2064 which is the outside rear wheel. The hydraulic brake and the X piping in this embodiment have the following degree of freedom in selection in the configuration.

(1) Same Pressure Distribution

As the brake caliper 2071 for the left front wheel 2061 and the brake caliper 2074 for the right rear wheel 2064 communicate via the hydraulic oil piping 2454, the skid prevention device 2450 which is the control means controls pressure in the hydraulic oil piping 2454 and pressure in the hydraulic oil piping 2455 at distribution ratio $\alpha$ shown in FIG. 16. That is, the skid prevention device 2450 controls so that internal pressure in the hydraulic oil piping 2454 that communicates with the inside front wheel in turning and the outside rear wheel in turning or the hydraulic oil piping 2455 is substantially the same. Hereby, in longitudinal distribution, the same pressure distribution has a merit that an initial design value of the braking device can be followed and no complex control valve is required.

In the meantime, as braking force is distributed in consideration of the transfer of a load in deceleration in control under the same pressure, braking force in the front wheel is greater than that in the rear wheel slightly floating. At such time, as difference is made between braking force in the front wheels and braking force in the rear wheels, the moment acquired by multiplying each braking force by a value of a half of a tread (distance between the right and left wheels) is generated. To cancel the moment, there are the following methods.

(2) Same Braking Torque Distribution

The ratio in a diameter of each piston of the front and rear wheels, distance from the center and others are calculated back and hydraulic distribution is varied in a longitudinal direction to be the same braking torque. That is, hydraulic distribution is varied in the longitudinal direction so that the braking torque of the inside front wheel in turning and the braking torque of the outside rear wheel in turning are substantially equal. For example, distribution is varied so that the oil pressure of the front wheel is smaller and the oil pressure of the rear wheel is larger.

(3) Same Braking Force Distribution

In (2), when a load onto the wheel is different, actual braking force is different. When a load of each wheel is estimated based upon the first distribution of longitudinal weight, a wheel base, tread, the height of the gravitational center, sensed longitudinal acceleration and sensed lateral acceleration using expressions on the upside of FIG. 27 and braking force is strictly controlled based upon a map shown on the downside of FIG. 27 showing the estimated load and slip ratio of the wheel and others, the above-mentioned moment can be completely canceled. That is, distribution is made so that the braking force of the inside front wheel in turning and the braking force of the outside rear wheel in turning are substantially equal.

Generally, as the vehicle is designed to be understeer, the moment produced by the same pressure distribution conversely buffers understeer and has effect that turning is facilitated, however, when control tries to correspond from neutral steer to oversteer, the distribution of same braking torque and same braking force is also required to be considered.

As described above, when the configuration is made so that diagonal distribution control according to the present invention is stopped while skid information such as the occurrence of oversteer is generated and lateral acceleration, longitudinal acceleration or the product of lateral acceleration and longitudinal acceleration is large, the same pressure distribution described in (1) is sufficiently practical.

The effects of the present invention will be described below, showing results of experiments of a prototype vehicle in which the distribution rule according to the present invention is mounted.

Figure 28:
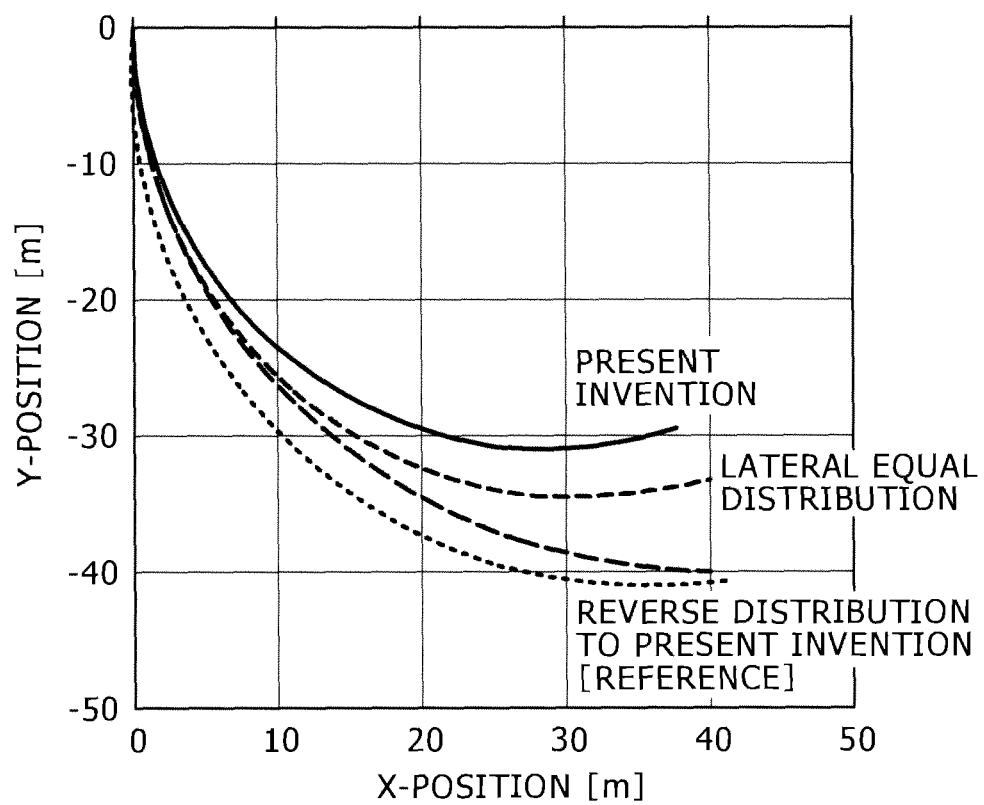
FIG. 28 shows results (braking on turning) of an experiment for verifying initial potential of the present invention.

First, FIG. 28 shows a result of measuring loci of the center of gravity of the vehicle where rightward steady circular turning is made at the radius of 40 m and at the speed of 60 km/h on a vehicle speed meter and deceleration is made at 2 m/s$^2$ (0.2 G) just on coordinates (0, 0) in a condition in which a steering angle is fixed using differential global positioning system (DGPS). It is known that when this distribution control is executed, a degree of inside turning is stronger, compared with deceleration in lateral equal distribution because of the toe-in of the front wheel and the toe-out of the outside rear wheel described above.

For a reference experiment for comparison, when reverse distribution (distribution to the outside front wheel and the inside rear wheel) is made, turning is greater outside than that in lateral equal distribution and this indirectly proves that a basic characteristic (the enhancement of steering gain) desired in the present invention is realized as a reverse event.

This result shows that the enhancement of turning performance can be expected not only in automatic acceleration/deceleration under the G-Vectoring control but in acceleration/deceleration by a driver.

Figure 29:
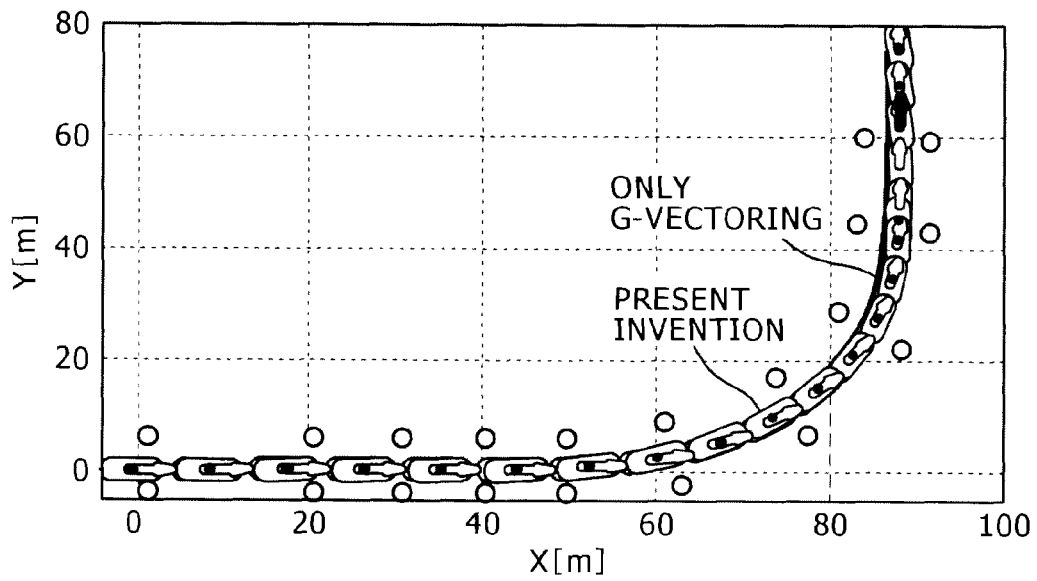
FIG. 29 shows a condition and results of an experiment of the present invention and conventional type control.

Next, an experiment of an L-type turn shown in FIG. 29 is made. This experiment is a task that a circular arc having the radius of 40 m is traced from a line by ¼, the orientation is changed by 90 degrees and afterward, the turn is linearly escaped. Pylons are set on both sides of a course, no transition curve exists from 50 m on an X coordinate, and the circular arc having the radius of 40 m is formed. This is a test in which a situation that a curve of a blind corner proves to be sharp in the blind corner is simulated.

FIG. 29 shows the comparison of a locus depending upon lateral equal distribution by G-Vectoring and a locus (a vehicular image is displayed every 0.5 sec) according to the present invention (diagonal distribution (same pressure) is applied to G-Vectoring). It can be verified that respective vehicles show the substantial same locus.

Figure 30:
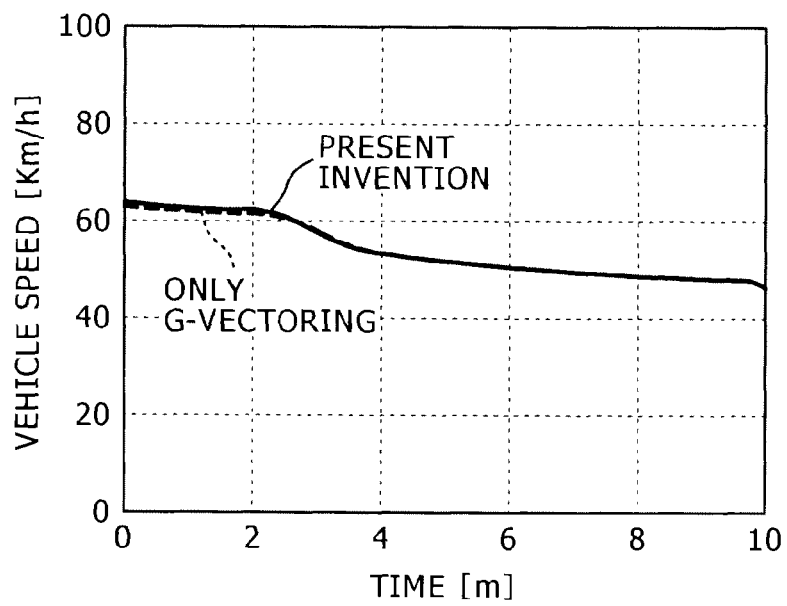
FIG. 30 compares vehicle speed of the present invention and the conventional type control.

FIG. 30 shows respective vehicle speed at this time. The vehicle speed is adjusted so that it is 70 km/h on the meter at the coordinates (0, 0). Afterward, an effect of engine brake is removed with an automatic transmission neutral. A test that a driver did not tread a brake pedal and the diagonal distribution was made or no diagonal distribution was made according to an automatic braking command by the G-Vectoring control was performed.

FIG. 31 shows the time history data of braking pressure in the front wheel and the rear wheel. FIG. 31 shows that in cases of only G-Vectoring, the same braking oil pressure is applied to the right and left front wheels and the right and left rear wheels. In the meantime, in the diagonal distribution according to the present invention, it is known that pressure equivalent to substantial twice of a case of only G-Vectoring is equally applied to the inside front wheel and the outside rear wheel and hydraulic distribution to the outside front wheel and the inside rear wheel is zero.

FIG. 32 shows the time history data of longitudinal acceleration and lateral acceleration of the vehicle at this time and a "g-g" diagram showing having longitudinal acceleration on an axis of an abscissa, having lateral acceleration on an axis of an ordinate and showing the transition of the linkage of longitudinal acceleration and lateral acceleration. It is judged that when lateral acceleration increases (a lateral jerk is generated), deceleration is made according to the mathematical expression 1.

Besides, the collation of a steering angle shown in FIG. 33 and deceleration tells that when a steering angle increases, the vehicle is decelerated.

Deceleration in 4 seconds is caused because of drag of a tire by turning. As shown in the "g-g" diagram, longitudinal acceleration and lateral acceleration are determined so that they have curved transition as time elapses. This time, control on the side of acceleration is not made, however, it is verified that a control command is set so that the lateral acceleration of the vehicle decreases, the vehicle is accelerated to be a negative lateral jerk and so that when a steering angle of the vehicle decreases, the vehicle is accelerated.

FIG. 33 compares a steering angle in the present invention (G-Vectoring+the diagonal distribution) and in only G-Vectoring. Though the substantial same locus is drawn in FIG. 29 and FIG. 30 is based upon the substantial same speed, it is known in the control according to the present invention, compared with control by only G-Vectoring that a steering angle can be reduced.

A drawing on the downside of FIG. 33 shows a steering angle and a yaw rate generated at that time to more clarify this. In this case, the inclination of these curves can be substantially regarded as yaw rate gain at each steering angle because speed is the same. The drawing tells that in the present invention (G-Vectoring+the diagonal distribution), gain increases, compared with G-Vectoring (uniform distribution).

It is clarified by the above that in the present invention (G-Vectoring+the diagonal distribution), yaw rate gain increases, compared with G-vectoring (the uniform distribution) and a corner is cleared at a smaller steering angle, and it can be verified that maneuverability is obviously enhanced.

Further, the sense of a driver that a vehicle is satisfactorily turned as if the vehicle were twisted is reported. FIG. 34 shows a roll rate and a pitch rate at this time on position coordinates (note: there are minute irregularities immediately before approach to an L-type turn and the pitch like an impulse is caused). In approach to the L-type turn, a pitch rate in the present invention (G-Vectoring+the diagonal distribution) slightly grows and a roll rate obviously grows (experiments are made plural times and this is already verified).

In the patent literature 3, a vehicular behavior control device that can effectively inhibit uncomfortable roll behavior in turning by reverse diagonal distribution (an outside front wheel in turning and an inside rear wheel in turning) to the present invention in a vehicle provided with a suspension on the front wheel side according to anti-dive geometry and a suspension on the rear wheel side according to anti-lift geometry is proposed. This is a mechanism that as the anti-dive moment in braking separately acts on the right and left front wheels and the anti-lift moment separately acts on the right and left rear wheels, the lift of a vehicle body is laterally unbalanced and the moment that inhibits a roll is generated. It is considered that in the diagonal distribution according to the present invention (G-Vectoring+the diagonal distribution), the moment reverse to this acts and a roll rate grows.

Figure 35:
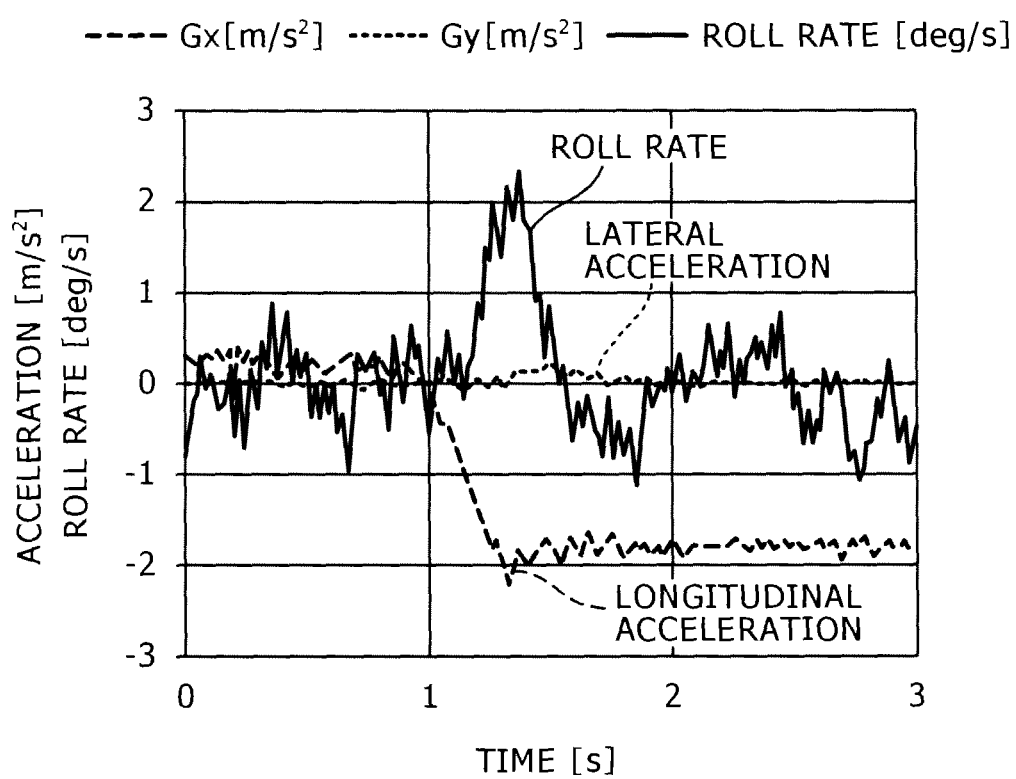
FIG. 35 shows longitudinal acceleration, lateral acceleration and a roll rate of the present invention.

FIG. 35 shows longitudinal acceleration, lateral acceleration and a roll rate when braking force is diagonally distributed to the left front wheel and the right rear wheel so that the deceleration of −2 m/s$^2$ is generated from a condition of a direct advance. A steering angle is adjusted to possibly prevent lateral acceleration by braking force applied to the front wheel on one side from being caused.

FIG. 35 tells that a roll rate is also caused without the roll moment by lateral acceleration and the above-mentioned mechanism can be verified (anti-dive geometry is adopted for the front wheel of this experimental vehicle). As described above, a roll of the vehicle may increase according to the diagonal distribution control according to the present invention. Accordingly, a roll rate can be also controlled at the same deceleration and at the same lateral acceleration by switching the diagonal distribution and lateral equal distribution and a unified sense of a pitch rate and a roll rate by acceleration/deceleration can be adjusted. This can be considered to be direct roll-moment control (DRC) in which the roll moment is directly adjusted.

Further, a results of an experiment related to the increase of slips when the inside front wheel is braked by the lateral transfer of a load described above will be described below and a reason for switching the diagonal distribution to the lateral equal distribution based upon lateral acceleration, longitudinal acceleration or the product of lateral acceleration and longitudinal acceleration will be described below.

Figure 36:
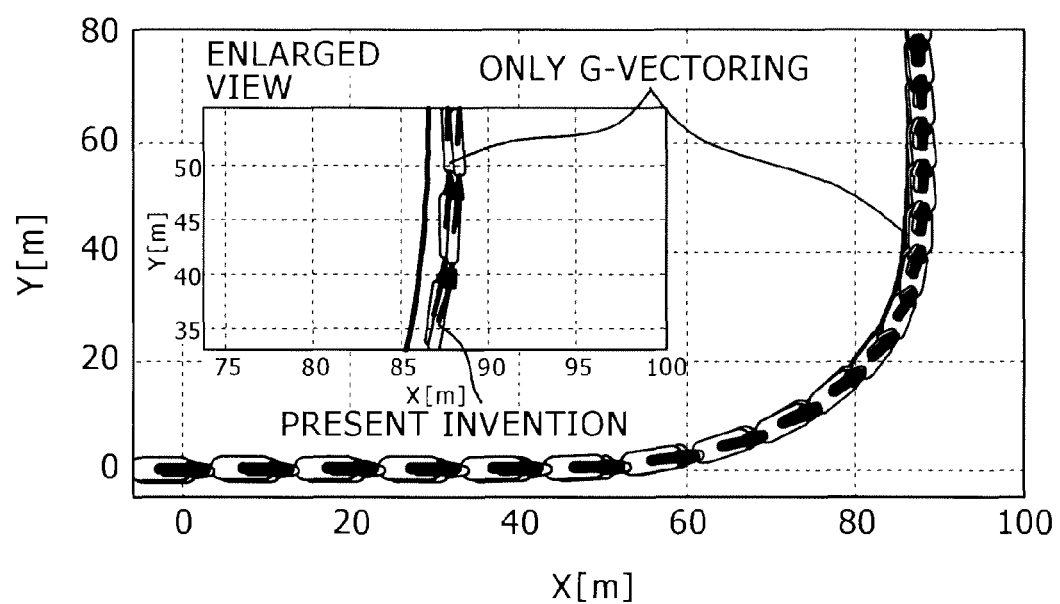
FIG. 36 shows a condition and results of an experiment of the present invention and the conventional type control.
Figure 37:
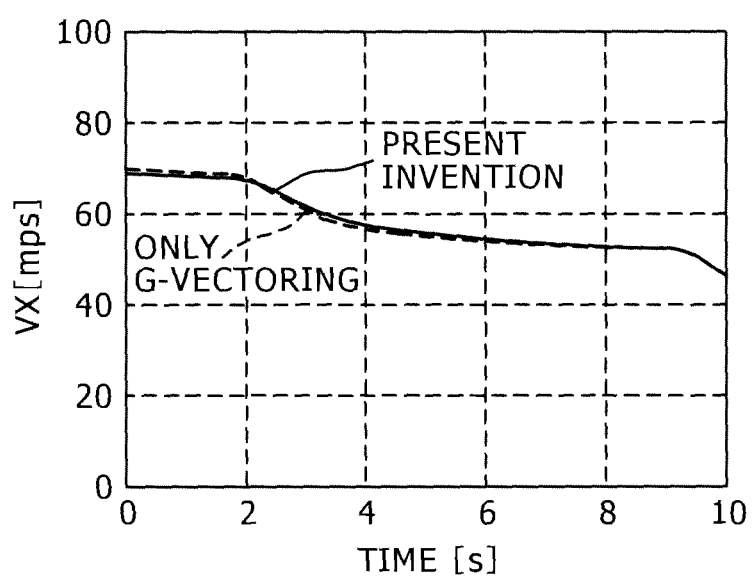
FIG. 37 compares vehicle speed of the present invention and the conventional type control.

FIG. 36 and the following show results of experiments in running at 70 km/h on the meter on the same L-type turn course. In both the present invention (G-Vectoring+the diagonal distribution) and G-vectoring (uniform distribution), the course is cleared, however, it can be verified in an enlarged view that a locus according to the present invention is located outside. It is known from FIG. 37 that speed at this time is slightly higher in the present invention.

FIG. 38 shows time history data of braking pressure of the front wheel and the rear wheel. It is known that in a case of only G-Vectoring, the same braking oil pressure of approximately 1.7 MPa at the maximum is applied to both the right and left front wheels and the right and left rear wheels. In the meantime, it is known that in the diagonal distribution according to the present invention, pressure of 2 MPa or more is momently applied to the inside front wheel and the outside rear wheel, however, the pressure is held in a condition in which the pressure falls up to 1.6 MPa in 2.5 sec.

It is known from the slip ratio of the front and rear wheels shown in FIG. 39 that the slip ratio of the inside front wheel in turning (the left front wheel) rises and hereby, excessive slip prevention control functions.

As excessive slip is prevented in a range in which a response of a lateral motion can be secured before maximum deceleration is acquired (at this time, the lateral force of a tire is zero and steering does not work), this control is operated.

It is also known from time history data and a "g-g" diagram of lateral acceleration and longitudinal acceleration respectively shown in FIG. 40 that deceleration in the present invention decreases. Further, FIG. 41 shows a steering angle and a response of a yaw rate for a steering angle. There is a part in which the gain of a yaw rate in the present invention decreases, compared with that in G-Vectoring lateral equal distribution. In such a situation, as a degree of the increase of a yaw rate grows dull even if a steering angle is increased, a driver steers too much and can easily enter a nonlinear area. For such a reason, in this control, the diagonal distribution is required to be switched to the lateral equal distribution based upon lateral acceleration, longitudinal acceleration or the product of lateral acceleration and longitudinal acceleration.

Postscript 1) When the excessive slip prevention control is turned off, the inside front wheel is locked and deviates outside the course.

Postscript 2) The inside front wheel deviates from the course completely without G-Vectoring and control and afterward, is spun (as no deceleration is made, the speed does not decrease and lateral acceleration becomes approximately 1 G).

Figure 42:
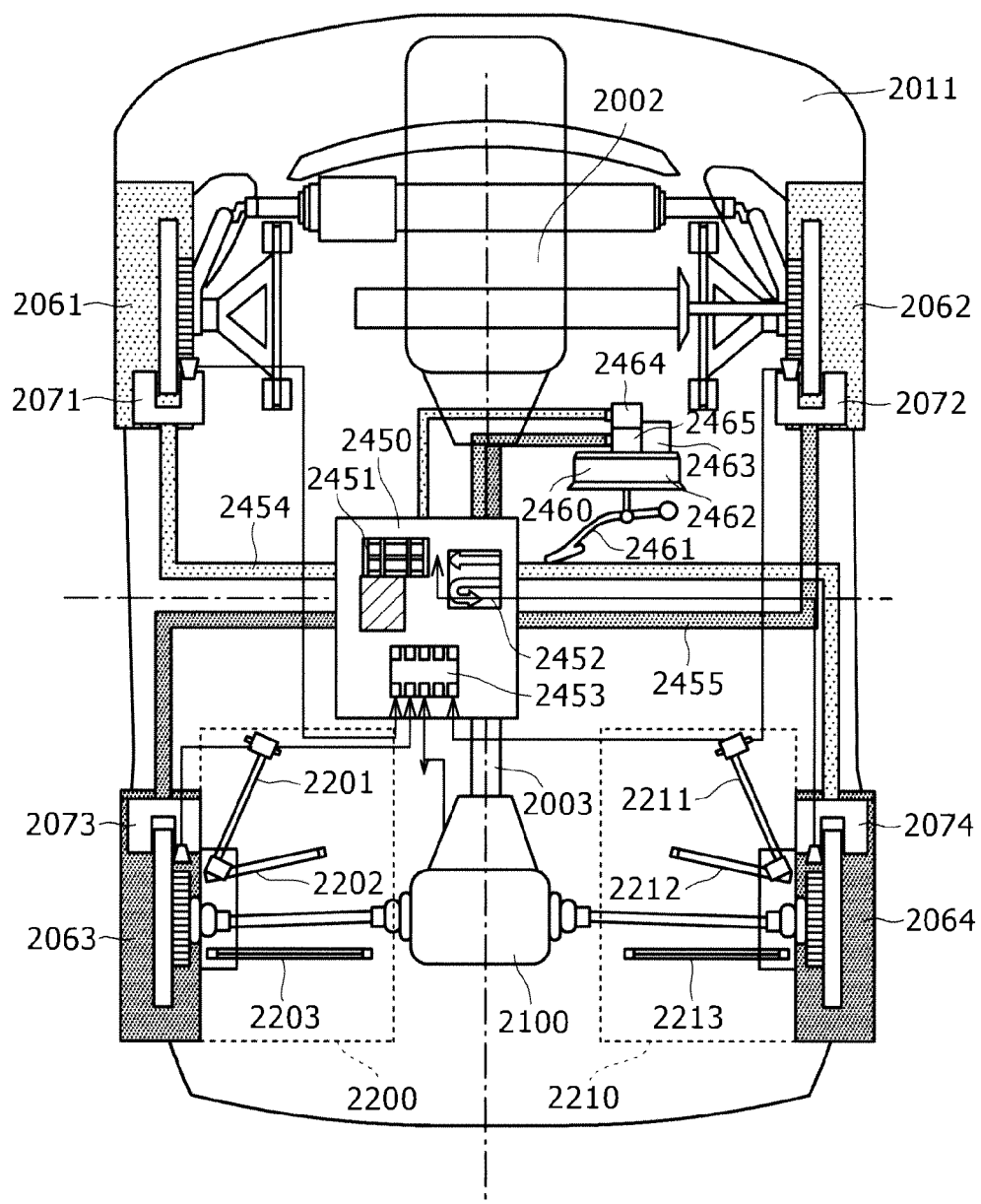
FIG. 42 shows the whole configuration of a third embodiment of the motion control system of the vehicle according to the present invention.

FIG. 42 shows the whole configuration of a third embodiment of the vehicular motion control system according to the present invention.

Differently from the second embodiment, a vehicle 2011 in the third embodiment is a front engine rear drive (FR) vehicle in which a left rear tire 2063 and a right rear tire 2064 are driven by a front engine (2002) via a propeller shaft 2003 and a differential gear 2100. Besides, rear wheels are suspended by so-called multi-link suspensions 2200, 2210. The other configuration is the similar to that in the second embodiment.

Figure 43:
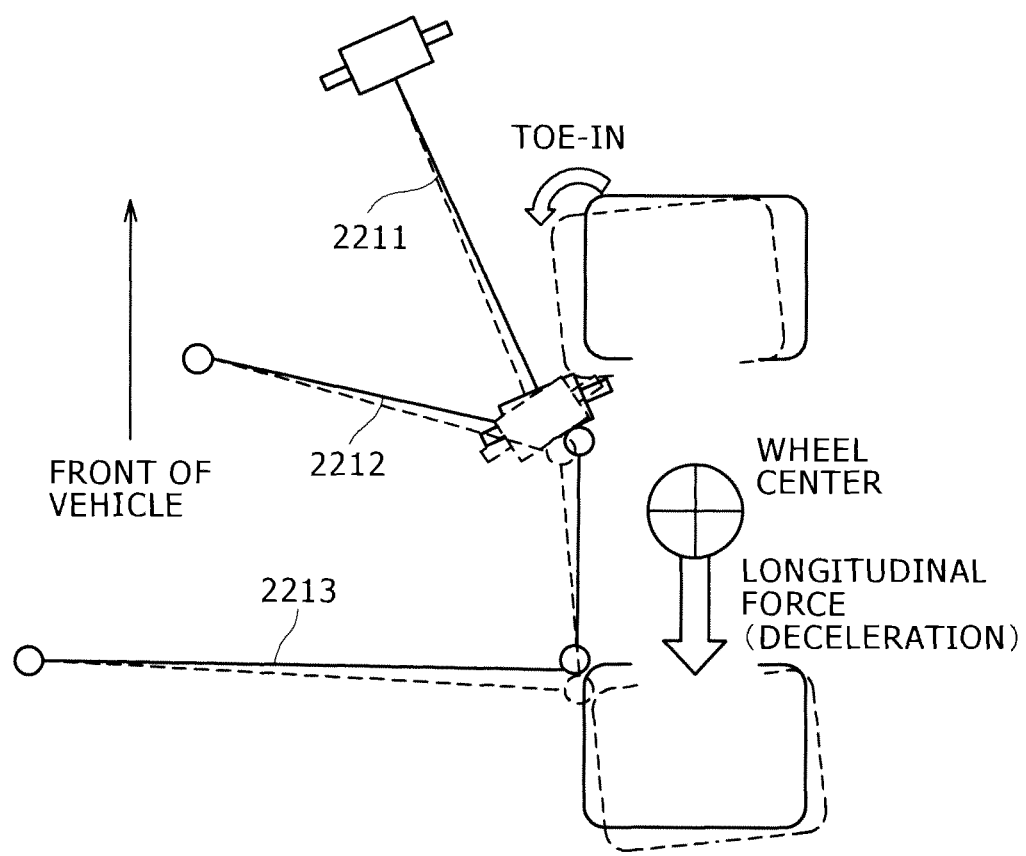
FIG. 43 shows a situation in which compliance steer is caused when deceleration is applied to a rear wheel in the third embodiment of the present invention.

FIG. 43 shows a situation in which compliance steer is generated when deceleration is applied to the rear wheel (the right rear wheel in FIG. 43) in the third embodiment. A knuckle of the rear wheel is supported by a radius link 2211 supported by a bush displaceable in a toe moving direction, a front lower link 2212 and a rear lower link 2213 respectively different in length (the upside of a paper surface in FIG. 43 is equivalent to a direction of the front of the vehicle. That is, FIG. 43 is a top view showing the right rear wheel). In this situation, when longitudinal force (deceleration) is applied to a wheel center, the right rear wheel is stretched backward in the vehicle. At this time, as the front lower link 2212 and the rear lower link 2213 are different in length and their support points are different, variation in alignment occurs in a direction of toe-in when the right rear wheel is displaced backward. This direction is an entirely reverse direction to a torsion beam type rear suspension often used in an FF vehicle in which deceleration is basically applied in a direction of toe-out and control timing different from control timing in the first and second embodiments is required to be adopted. After dynamical relation between the braking and the driving of the rear wheel in the vehicle provided with the differential gear characteristic in this embodiment is described, this point will be described as a best mode including its effect below.

Figure 44:
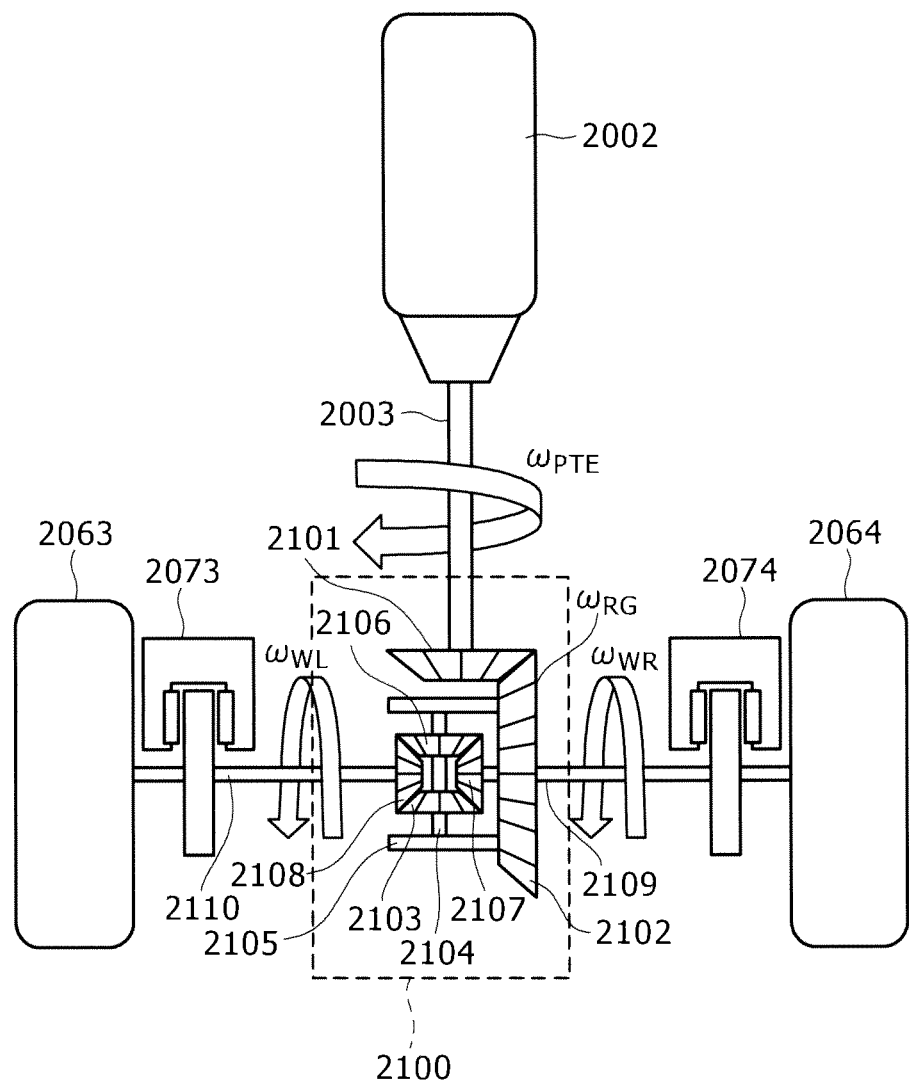
FIG. 44 shows the configuration of a power train to the rear wheels and right and left brakes of the rear wheels in the third embodiment of the present invention.

FIG. 44 shows the configuration of a power train (the engine 2002, the propeller shaft 2003 and the differential gear 2100) for the rear wheels and left and right brakes 2073, 2074 for the rear wheels in the third embodiment of the present invention. The differential gear has so-called open differential structure in which no differential limiting mechanism is provided. First, the configuration of the differential gear 2100 will be described. A drive pinion 2101 is fixed to an end of the propeller shaft 2003 driven by the engine 2002 and drives a ring gear (a drive gear) 2102. A differential case is fixed to the ring gear 2102 and a pinion mated shaft bearing 2103 that supports a pinion mated shaft 2104 is fixed to the differential case. Pinion mated gears 2105, 2106 are engaged with a right rear wheel side gear 2107 and a left rear wheel side gear 2108. A right rear wheel drive shaft 2109 pierces (rotatably supports) the ring gear 2102 and connects with the right rear wheel 2064 (however, a constant-velocity universal joint and others are omitted). Besides, a disc rotor is attached to the right rear wheel drive shaft 2109 and braking torque can be applied by a brake caliper 2074 of the right rear wheel. Similarly, a left rear wheel drive shaft 2110 connects with the left rear wheel 2063. Besides, a disc rotor is attached to the left rear wheel drive shaft 2110 and braking torque can be applied by a brake caliper 2073 of the left rear wheel.

When the revolution speed of the propeller shaft 2003 is $\omega_{PTE}$, the revolution speed $\omega_{RG}$ of the ring gear 2102 has a value acquired by dividing $\omega_{PTE}$ by final speed reducing ratio. The engine speed of the engine 2002 and the revolution speed of the propeller shaft 2003 are omitted, the revolution speed $\omega_{RG}$ of the ring gear 2102 is adopted as representative revolution speed of the power train including the engine, relation between the revolution speed $\omega_{WL}$ of the left drive shaft 2110 and the revolution speed $\omega_{WR}$ of the right drive shaft 2109 will be described below, and dynamical relation related to the present invention will be disclosed below.

An equation of a rotary motion related to the ring gear 2102 is shown as a mathematical expression 22 below.

$$I_{BEPT} \dot{\omega}_{RG} = k_F \cdot T_E - (T_{ER} + T_{EL}) \quad \text{(Mathematical expression 22)}$$

In this case, $I_{BEPT}$ is acquired by converting the moment of inertia of the power train including the engine and the vehicle body equivalent moment of inertia in terms of the ring gear and is by far greater, compared with the total moment of inertia of rotating mechanisms around axles described later. Besides, $k_F$ is total speed reducing ratio from the engine 2002 to the ring gear 2102, $T_E$ is engine torque, $T_{ER}$ is reaction torque applied from the right rear wheel, and $T_{EL}$ is reaction torque applied from the left rear wheel.

Besides, an equation of a rotary motion of the left rear wheel is as follows.

$$I_{WL} \dot{\omega}_{WL} = T_{EL} - F_{WXL} \cdot R_{WL} - T_{BL} \quad \text{(Mathematical expression 23)}$$

$IW_L$ is the total moment of inertia of rotary parts including the left rear wheel, a brake disc and the drive shaft. In addition, $T_{EL}$ is driving torque by the engine. Further, $F_{WXL}$ is longitudinal force generated in the left rear wheel tire, $R_{WL}$ is a radius of the left rear wheel tire, and $T_{BL}$ is braking torque by the brake caliper 2073 of the left rear wheel.

Besides, an equation of a rotational motion of the right rear wheel is as follows.

$$I_{WR} \dot{\omega}_{WR} = T_{ER} - F_{WXR} \cdot R_{WR} - T_{BR} \quad \text{(Mathematical expression 24)}$$

$I_{WR}$ is the total moment of inertia of rotary parts including the right rear wheel, a brake disc and the drive shaft. In addition, $T_{ER}$ is driving torque by the engine. Further, $F_{WXL}$ is longitudinal force generated in the right rear wheel tire, $R_{WR}$ is a radius of the right rear wheel tire, and $T_{BL}$ is braking torque by the brake caliper 2074 of the right rear wheel.

Further, the following rotation constraint expression ordinarily comes into effect because of a characteristic of the differential gear 2100 as a differential gear train.

$$\omega_{RG} = \tfrac{1}{2}(\omega_{WL} + \omega_{WR}) \quad \text{(Mathematical expression 25)}$$

That is, the above-mentioned relation is relation that the revolution speed of the ring gear 2102 is necessarily a mean value of the revolution speed of the right and left wheels. The basic expressions of the rotary parts of the vehicle provided with the differential gear have been described.

Figure 45:
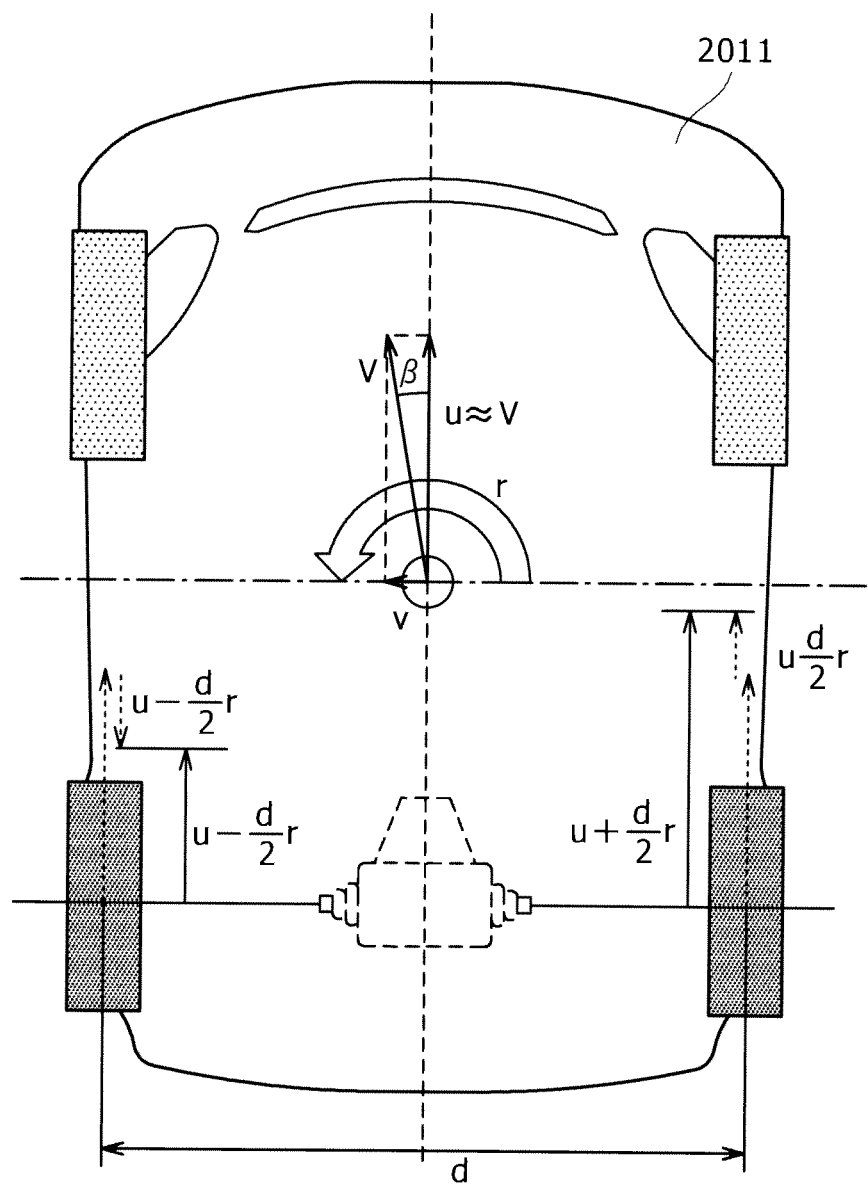
FIG. 45 is an explanatory drawing related to velocity vectors in a longitudinal direction in positions of the right and left rear wheels in the vehicle that turns leftward in the third embodiment of the present invention.

Next, FIG. 45 is an explanatory drawing related to longitudinal velocity vectors in positions of the right and left rear wheels of the vehicle 2011 according to the present invention that turns leftward. The vehicle advances at velocity V at a slip angle β in a longitudinal direction of the vehicle and a yaw rate around the center of gravity of the vehicle at that time is r. The speed in the longitudinal direction in the center of gravity of the vehicle at this time is u (=Vcosβ). Longitudinal velocity in the position of the right rear wheel at this time is as follows.

$$u_{Out} = u + \tfrac{1}{2} d \cdot r \quad \text{(Mathematical expression 26)}$$

Only a yaw rate component accelerates, compared with longitudinal speed in the center of gravity. However, d denotes distance (a tread) between the right and left rear wheels. Besides, longitudinal velocity in the position of the left rear wheel is as follows.

$$u_{in} = u - \tfrac{1}{2} d \cdot r \quad \text{(Mathematical expression 27)}$$

Only a yaw rate component decelerates, compared with that in the center of gravity of the vehicle.

Figure 46:
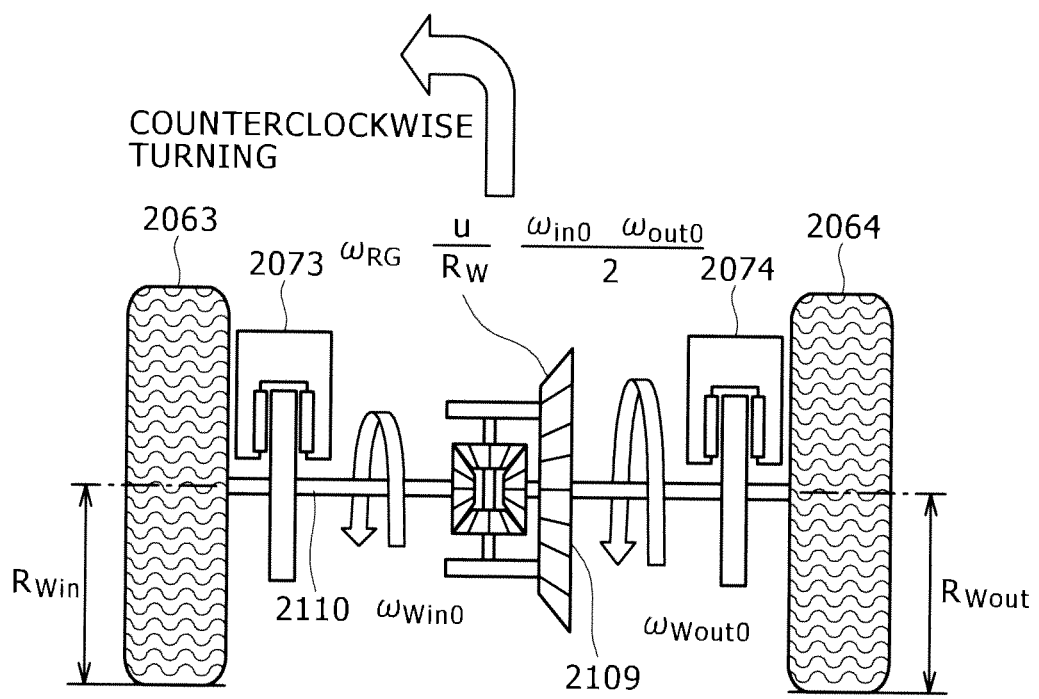
FIG. 46 shows a case that no braking force and no driving force are applied to the right and left rear wheels that turn leftward.

First, a case that no braking force/driving force is applied to the right and left rear wheels in the vehicle 2011 will be described referring to FIG. 46. The velocity $\omega_{in0}$ and $\omega_{out0}$ of the left and right rear wheels 2063, 2064 which are also the inside and outside rear wheels are expressed as follows.

$$\omega_{Win0} = \frac{u_{in}}{R_{Win}}, \quad \omega_{Wout0} = \frac{u_{out}}{R_{Wout}} \quad \text{(Mathematical expression 28)}$$

When the mathematical expression 28 is considered together with the mathematical expressions 26, 27, it is known that the revolution speed of the inside wheel (the left rear wheel 2063) is slower than the revolution speed of the outside wheel (the right rear wheel 2064).

The slip ratio of the inside and outside rear wheels at this time is as follows.

$$S_{inB} = \frac{u_{in} - R_{Win} \cdot \omega_{Win}}{u_{in}} = 0,$$

$$S_{wouB} = \frac{u_{out} - R_{Wout} \cdot \omega_{Wwou}}{u_{out}} = 0 \quad \text{(Mathematical expression 29)}$$

The respective slip ratio is zero. That is, the expression shows that no force is generated in the longitudinal direction.

Further, as the mathematical expression 22 comes into effect, as follows.

$$\omega_{RG0} = \tfrac{1}{2}(\omega_{Win0} + \omega_{Wout0}) = \frac{u}{R_w} \quad \text{(Mathematical expression 30)}$$

That is, the expression shows that the revolution speed of the ring gear 2102 is determined by longitudinal velocity in the center of gravity of the vehicle independent of the yaw rate and a tread of the vehicle.

Figure 47:
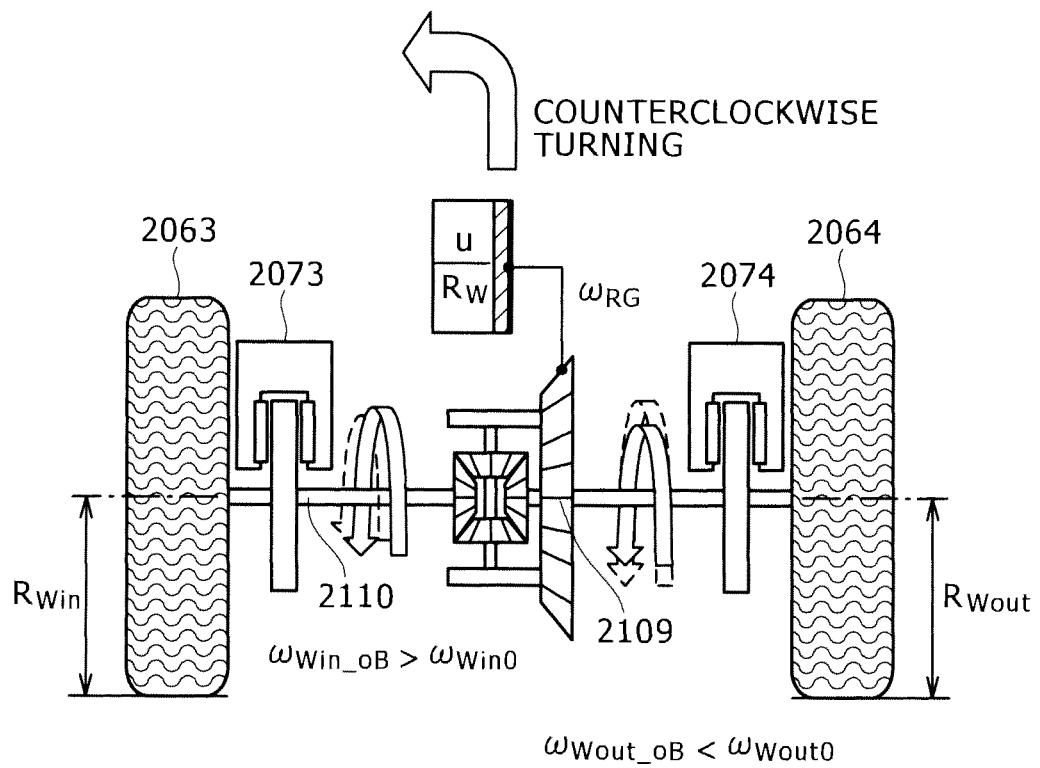
FIG. 47 shows a case that braking torque is applied to the right rear wheel which is the outside rear wheel in turning.

A case that in such a condition of leftward turning, braking torque $T_{BR}$ is applied to the right rear wheel which is the outside rear wheel in turning from the brake caliper 2074 of the right rear wheel as shown in FIG. 47 will be described below. First, an effect on the ring gear 2102 and the rotary parts when braking torque $T_{BR}$ is applied will be described.

First, when $T_{EL}$ and $T_{ER}$ are deleted using the mathematical expressions 22, 23, 24, as follows.

$$\dot{\omega}_{RG} = \frac{1}{I_{BEPT}} \{I_W(\dot{\omega}_L + \dot{\omega}_R) + R_W(F_{WXL} + F_{WXR}) + (T_{BL} + T_{BR})\}$$ (Mathematical expression 31)

Besides, when the mathematical expression 25 is differentiated by time, as follows.

$$\dot{\omega}_{RG} = \frac{1}{2}(\dot{\omega}_\downarrow WL + \dot{\omega}_\downarrow WR)$$ (Mathematical expression 32)

When this mathematical expression is assigned to the mathematical expression 31 and it is coordinated, as follows.

$$\dot{\omega}_{RG} = -\frac{R_W(F_{WXL} + F_{WXR}) + (T_{BL} + T_{BR})}{I_{BEPT} + 2I_W}$$ (Mathematical expression 33)

However, for the effective radius of the tire and the moment of inertia of the tire, those of the right and rear wheels are set to the same.

When the mathematical expression 33 is partially differentiated by $T_{BR}$ so as to search into the variation of the velocity of the ring gear 2102 when braking torque $T_{BR}$ is applied from the brake caliper 2074 of the right rear wheel, the following mathematical expression is acquired.

$$\frac{\partial \dot{\omega}_{RG}}{\partial T_{BR}} = -\frac{1}{I_{BEPT} + 2I_W}$$ (Mathematical expression 34)

In the meantime, when the velocity variation gain of the right rear wheel 2064 is considered when braking torque $T_{BR}$ is applied from the brake caliper 2074 of the right rear wheel, the following expression is acquired.

$$\frac{\partial \dot{\omega}_{WR}}{\partial T_{BR}} = -\frac{1}{I_W}$$ (Mathematical expression 35)

As described above, $I_{BEPT}$ is extremely great, compared with $I_W$. The mathematical expressions 34, 35 tell that even if braking torque $T_{BR}$ is applied from the brake caliper 2074 of the right rear wheel, the gain of velocity variation given by the variation of the velocity of the ring gear 2102 is low and the revolution speed of the ring gear 2102 hardly varies by small braking torque. Even if braking torque $T_{BR}$ acts on the right rear wheel in leftward turning which is currently supposed, the velocity of the ring gear is fixed to $u/R_w$ as shown in FIG. 47 and it is considered that the velocity of the rear gear hardly varies. That is, as follows.

$$\dot{\omega}_{RG0} = \frac{1}{2}(\dot{\omega}_{Win0} + \dot{\omega}_{Wout0}) \approx 0.$$ (Mathematical expression 36)

Besides, as follows.

$$\dot{\omega}_{Win} \approx -\dot{\omega}_{Wout}$$ (Mathematical expression 37)

As a result, the fall of the revolution speed of the outside tire has an effect upon the increase of the revolution speed of the inside tire. When braking torque is applied to the right (outside) rear wheel in leftward turning, the velocity $\omega_{out\_oB}$ of the right (outside) rear wheel may be smaller than the velocity $\omega_{Wout0}$ of the outside rear wheel in turning before the braking torque is applied and the velocity $\omega_{in\_oB}$ of the left (inside) rear wheel may be greater than the velocity $\omega_{Win0}$ of the inside rear wheel in turning before the braking torque is applied.

Figure 48:
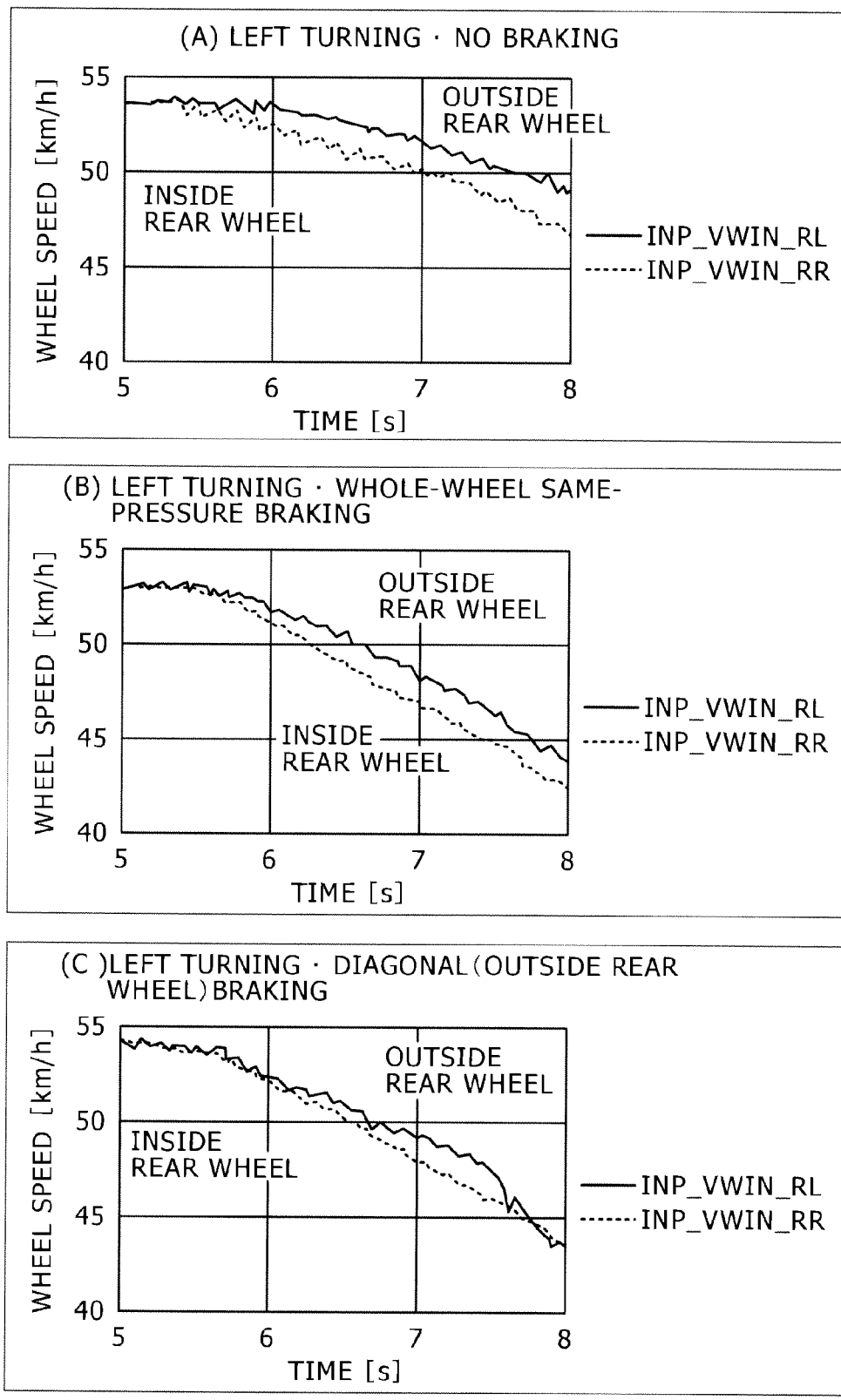
FIG. 48 shows wheel speed (converted to peripheral velocity) of the outside rear wheel and the inside rear wheel on a pressed snowy road.

FIG. 48(a) shows a case of no braking when the vehicle approaches a curve having a radius of 40 m at initial speed of approximately 53 km/h on a pressed snowy road, FIG. 48(b) shows a case of braking when the same brake oil pressure (as normal) is applied to all the wheels on the same condition, and FIG. 48C shows the wheel speed (converted to peripheral velocity) of the outside rear wheel and the inside rear wheel when braking is applied to only the inside (left) front wheel in turning and the outside (right) rear wheel in turning according to the present invention on the same condition. As in the case shown in FIG. 48(a), no deceleration is made, a condition shown in FIG. 48(a) is the same as the condition shown in FIG. 46.

FIG. 45 shows that longitudinal velocity in a position of the inside wheel during turning is smaller than that in a position of the outside wheel, however, FIG. 48(a) shows that when the vehicle is turned on the radius of 40 m at 50 km/h, the inside wheel is rotated at velocity lower than the outside wheel by approximately 3 km/h. In the meantime, in the braking of the outside rear wheel shown in FIG. 48(c), difference between the outside wheel and the inside wheel is clearly reduced, compared with other cases.

This shows that in the inside rear wheel, peripheral velocity is faster than longitudinal velocity in its position. That is, it can be considered that the inside rear wheel has slip ratio in a direction of driving shown in the following mathematical expression 38.

$$S_{in\_oB} = \frac{\left(u - \frac{d}{2}r\right) - R_{in}\omega_{in\_oB}}{R_{in}\omega_{in\_oB}}$$ (Mathematical expression 38)

Further, the effective radius of the inside tire is relatively larger than that of the outside tire in which its load is transferred by lateral acceleration and which is indented and there is effect that slip ratio in the direction of driving grows more.

Figure 49:
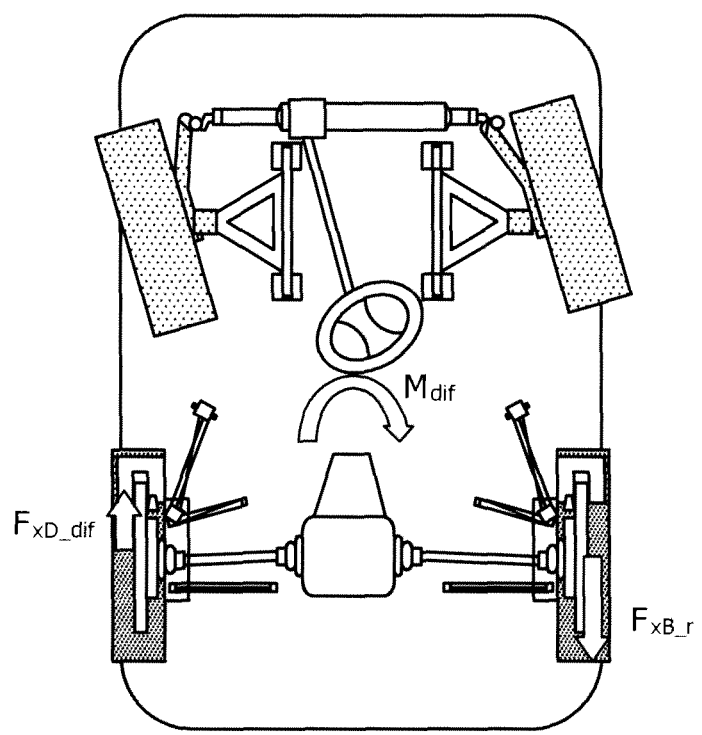
FIG. 49 shows a situation in which longitudinal force is generated in the rear wheel when braking torque is applied to the right rear wheel which is the outside rear wheel in turning.

FIG. 49 shows a situation in which longitudinal force of the rear wheel is generated at this time. Braking force $F_{xB\_r}$ is generated in the outside rear wheel by braking torque $T_{BR}$ from the brake caliper 2074 of the right rear wheel and driving force $F_{X\_dif}$ is generated in the inside rear wheel though the driving force is minute. As a result, the moment Mz for return for stopping turning shown in the following mathematical expression 39 is generated.

$$M_{dif} = d/2(F_\perp(xB_\perp r) + F_\perp(xD_\perp dif))$$ (Mathematical expression 39)

Actually, it is verified by plural observers that when a test vehicle in which braking torque is distributed as described above is prepared and is tested on a pressed snowy road, the moment for return of the vehicle grows and the sense of stability clearly increases. It is considered that an effect of the moment for return is more sensed in a situation in which a coefficient of friction is small as on the pressed snowy road, therefore, lateral acceleration is small and the transfer of a load is also small.

Besides, the mathematical expression 36 (only the small variation of the revolution speed of the ring gear is acquired by braking torque in only the outside wheel in turning) is supposed because of the dimension of rotational inertia force in the current engine and the current power train, however, virtual rotational inertia force is given and the similar effect can be also acquired by controlling the revolution speed or the torque of the ring gear based upon a numerical value of the engine, the power train or the electric motor, the generator and others.

A best mode in the vehicle in the third embodiment of the present invention which is provided with the multi-link suspension and the differential gear and which realizes rear-wheel compliance steer having a longitudinal force toe-in characteristic will be disclosed below. As shown in FIGS. 50A to 50D, a control method according to the present invention especially related to control from the latter term of turning to steady turning will be described again in comparison with a four-wheel active steer vehicle referring to the non-patent literature 5 below.

At the beginning of turning, the yaw moment applied to the vehicle is required to be increased to enhance the turning performance of the vehicle. For that, it is effective to increase a steering angle of the front wheel and to increase the cornering force of the front wheel (see (a) in FIG. 50). In the meantime, in the third embodiment of the present invention, braking force $F_{xB\_f}$ is applied to only the inside front wheel in turning as shown in FIG. 50(b) (in the first and second embodiments, braking force is also simultaneously applied to the rear wheel). Hereby, braking force can be applied to only a direction in which a steering angle is increased.

In the transient latter term till steady turning, overshoot of the same phase is momently caused in the four-wheel active steer shown in FIG. 50(c). This enhances the convergence of a yaw motion and the skid of a vehicle body is inhibited. As a result, in the third embodiment of the present invention, braking force $F_{xB\_r}$ is applied to only the outside rear wheel as shown in FIG. 50(d). Hereby, compliance steer $\delta_{xB\_r}$ on the toe-in side is generated and overshoot on the side of the same phase can be generated as in the four-wheel active steer shown in FIG. 50(c).

Further, minute driving force $F_{x\_dif}$ can be applied to the inside rear wheel (the left rear wheel), the yaw moment for return can be directly applied, the convergence of a yaw motion is enhanced, and the skid of the vehicle body can be inhibited.

Figure 51:
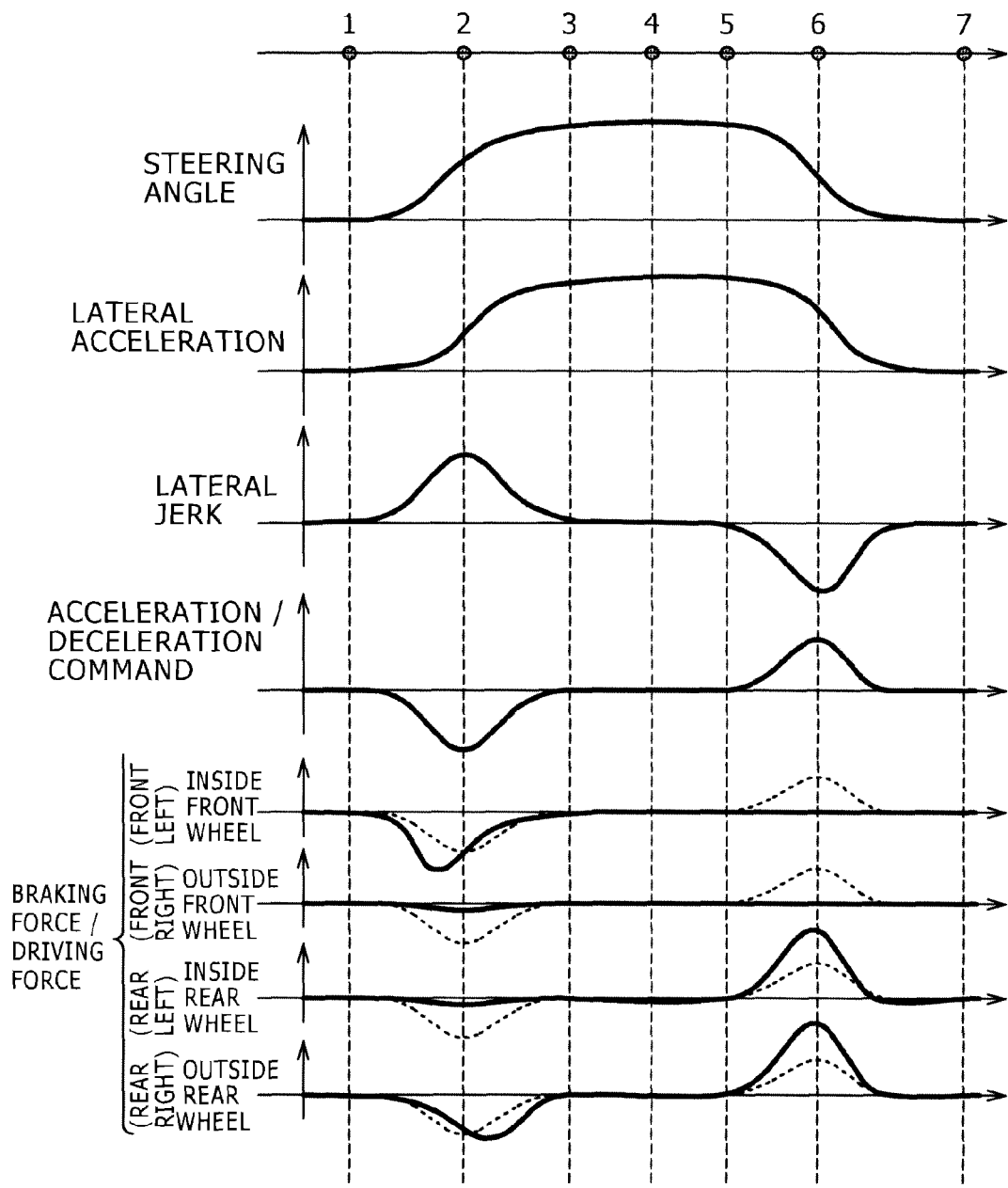
FIG. 51 shows a case that G-Vectoring (proportional to a lateral jerk) is applied to an acceleration/deceleration command.

FIG. 51 shows a case in which G-Vectoring (proportion to a lateral jerk) is applied to an acceleration/deceleration command based upon a concept shown in FIG. 50 as in the first and second embodiments. Braking force is applied mainly to the inside front wheel at the entrance (points 1, 2) of a corner according to a G-Vectoring control command. Besides, in the transient latter term (at points 2, 3) till steady turning, braking force is applied mainly to the outside rear wheel according to the G-Vectoring control command. In escape from the corner (in the vicinity of points 5, 6), equal driving force is applied to the right and left rear wheels by the differential action of the rear wheels according to the G-Vectoring control command.

FIG. 52 shows modes of control in each time. From a line in (a) of FIG. 52, turning is started (turning performance is enhanced) in (b) of FIG. 52, the convergence of a yaw motion is enhanced and the skid of the vehicle body is inhibited in (c) of FIG. 52, the turning transfers to steady turning in (d) of FIG. 52, acceleration is made by the rear wheel in escape in (e) of FIG. 52, and the turning is returned to a straight motion in (f) of FIG. 52. As described above, high-quality turning can be serially provided. It is verified by plural observers that especially, a sense of security in a situation in which a coefficient of friction is small as on a pressed snowy road can be greatly enhanced by adding a condition shown in FIG. 52C.

The method of controlling braking force and driving force applied to each wheel in a situation in which the vehicle moves on a plane according to a longitudinal acceleration command has been disclosed. Finally, on the supposition of a situation in which the vehicle runs in a mountainous area, contents devised to settle a practical problem of control so as to acquire the similar effects of the control to a situation in which the vehicle moves on the plane in a situation in which this system is more practically used will be disclosed.

Figure 53:
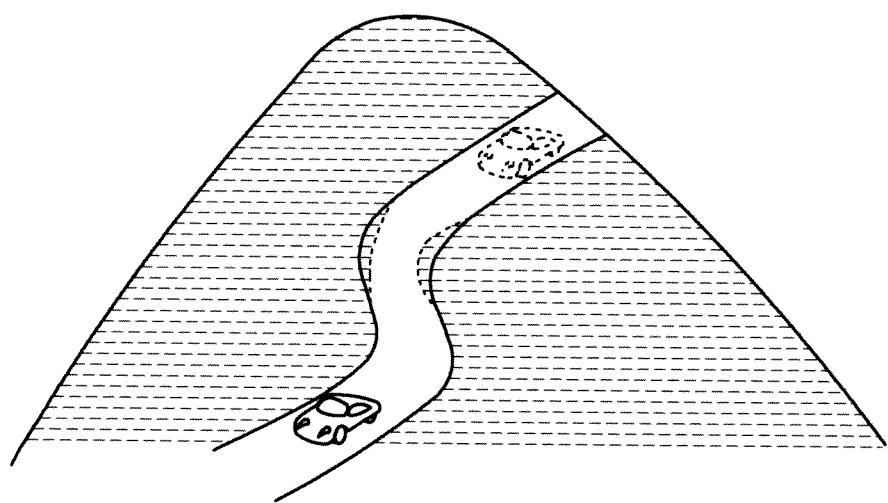
FIG. 53 shows a running scene on the inclined ground.
Figure 54:
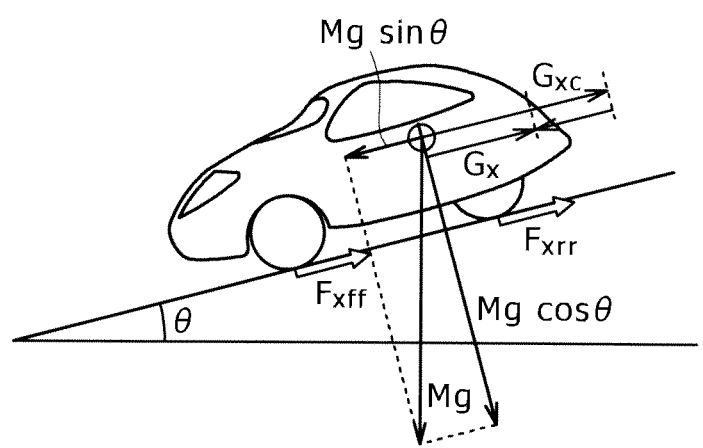
FIG. 54 shows a situation in which the vehicle descends on a slope.

In a situation shown in FIG. 53, when the weight of the vehicle for considering the variation of vehicular longitudinal acceleration by a gravity component on a slope is M, the gravitational component of Mg·sin θ is applied to the vehicle in a longitudinal direction while the vehicle descends on the slope of an inclination θ as shown in FIG. 54.

When open-loop brake fluid pressure control or motor torque control and others is made according to an acceleration/deceleration command Gxc, the longitudinal force Fxff of the front wheel and the longitudinal force Fxrr of the rear wheel are controlled, actual vehicular deceleration is Gx (=Gxc−Mg·sin θ) differently from a deceleration command value and the implement of target control becomes impossible.

Figure 55:
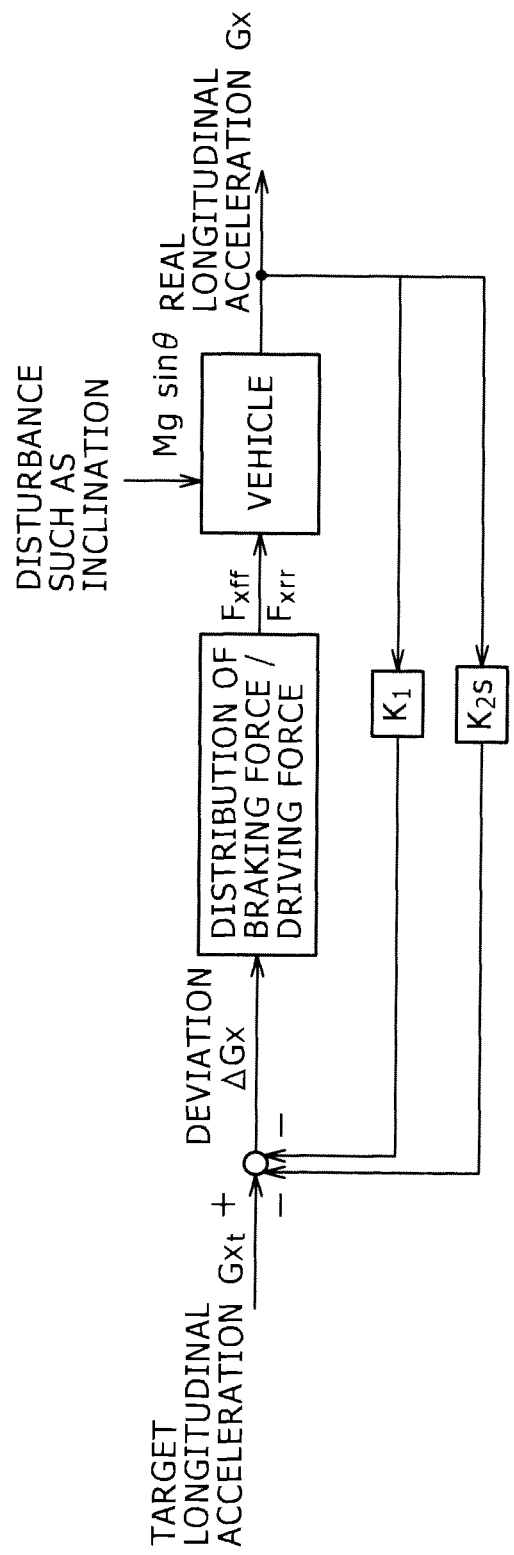
FIG. 55 shows a feedback loop of longitudinal acceleration.

In the meantime, real longitudinal acceleration Gx is measured in a longitudinal acceleration sensor 22 in a combined sensor as shown in FIG. 55, a longitudinal jerk is calculated by multiplying the rear longitudinal acceleration by gain K1 or by differentiating it, a value acquired by multiplying by gain K2 and a target acceleration/deceleration command Gxt are compared, and braking force and driving force Fxff, Fxrr have only to be determined based upon its deviation ΔGx. The real longitudinal acceleration can be made to follow target longitudinal acceleration by configuring such a feedback loop independent of disturbance such as a slope and the deterioration of control can be reduced.

Besides, for another method, inclination information can be also acquired using map information by GPS and NAVI. When inclination information (grade information) can be acquired using GPS, NAVI and further, a road grade sensing means such as an external field sensor as described above, correction is made so that a value in an acceleration command is larger than a value in an acceleration command in running on a flat road surface when a grade of a road surface is ascent and is smaller than the value in the acceleration command in running on the flat road surface when the grade is descent, and correction can be also made so that a value in a deceleration command is smaller than the value in the acceleration command in running on the flat road surface when the grade is ascent and is larger than the value in the acceleration command in running on the flat road surface when the grade is descent.

Hereby, even if the vehicle runs on an inclined road surface, a motion according to a target acceleration/deceleration command can be realized and the similar control effects to a situation in which the vehicle moves on a plane are acquired.

The steering angle control from the four-wheel active steer control, the compliance steer by braking force and driving force and the acceleration/deceleration control (the G-Vectoring control) linked with a lateral motion have been described, the basic concept of the present invention in which these are organically combined has been described, and the effectiveness of the present invention has been described using the two embodiments, the result of computer simulation and the result of vehicle tests. According to the present invention, the compliance steer can be actively controlled using braking force/driving force, and the technique and the system that enable enhancing the maneuverability and the stability with sufficient effects with the light system can be provided.

LIST OF REFERENCE SIGNS 0, 2010 Vehicle
1 Left rear-wheel motor
2 Right rear-wheel motor
7 Power steering
10 Accelerator pedal
11 Brake pedal
16 Steering wheel
21 Lateral acceleration sensor
22 Longitudinal acceleration sensor
23, 24, 25 Differentiating circuit
31 Accelerator position sensor
32 Brake pedal position sensor
33 Driver steered angle sensor
38 Yaw rate sensor
40 Central controller
44 Steering controller
46 Power train controller
48 Pedal controller
51 Accelerator reaction motor
52 Brake pedal reaction motor
53 Steer reaction motor
61, 1011, 2061 Left front wheel
62, 1012, 2062 Right front wheel
63, 1013, 2063 Left rear wheel
64, 1014, 2064 Right rear wheel
70 Millimeter wave ground vehicle speed sensor
121 Left front-wheel motor
122 Right front-wheel motor
200 Combined sensor
401 Vehicular motion model
402 G-Vectoring controller
403 Yaw moment controller
404 Braking force/driving force distributor
410 Signal processing unit
451, 452 Brake controller
1003, 1103, 1123, 1124, 1004, 1104 Knuckle arm
1005, 1105, 1125 Tie rod
1006, 1106, 1126 Gear box
2002 FR vehicle
2003 Propeller shaft
2063, 2064 Rear tire
2100 Differential gear
2101 Drive pinion
2102 Ring gear
2103 Pinion mated shaft bearing
2104 Pinion mated shaft
2105, 2106 Pinion mated gear
2107, 2108 Side gear
2109, 2110 Drive shaft
2200, 2210 Multi-link suspension
2211 Radius link
2212 Front lower link
2213 Rear lower link

The invention claimed is:

1. A motion control system of a vehicle, comprising:
a controller that independently controls driving force and/or braking force of each of four wheels; and
a turning direction sensor that senses a turning direction, wherein:
the controller is provided with an acceleration/deceleration command generator that generates an acceleration/deceleration command based upon a sensed steering angle and sensed vehicle speed and a driving force/braking force distributor that determines the distribution of the driving force or more driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction; and
the acceleration/deceleration command generator is configured to turn the acceleration/deceleration command to zero based on external information including any of obstacle information, preceding vehicle information and following vehicle information sensed by an external information sensor.

2. The motion control system of the vehicle according to claim 1, wherein:
the turning direction sensor senses the turning direction based upon at least one of an input steeling angle, a vehicular yaw rate and vehicular lateral acceleration.

3. The motion control system of the vehicle according to claim 1, wherein:
the driving force/braking force distributor determines such distribution that the driving torque and/or the braking torque of the inside front wheel in turning and the driving torque and/or the braking torque of the outside rear wheel in turning are substantially equal.

4. The motion control system of the vehicle according to claim 1, wherein:
the driving force/braking force distributor determines such distribution that the driving force and/or the braking force of the inside front wheel in turning and the driving force and/or the braking force of the outside rear wheel in turning are substantially equal.

5. The motion control system of the vehicle according to claim 1, comprising:
a first hydraulic oil piping that communicates with the left front wheel and the right rear wheel; and
a second hydraulic oil piping that communicates with the right front wheel and the left rear wheel, wherein:
the controller controls pressure in the first hydraulic oil piping and pressure in the second hydraulic oil piping.

6. The motion control system of the vehicle according to claim 5, wherein:
the controller makes such control that internal pressure in the first hydraulic oil piping that communicates with the inside front wheel in turning and the outside rear wheel in turning or the second hydraulic oil piping is substantially the same.

7. The motion control system of the vehicle according to claim 1, comprising:
an electric motor that generates braking force or braking torque, wherein:
the controller is provided with a regenerative device that regenerates electric power generated when braking force or braking torque is generated by the electric motor.

8. The motion control system of the vehicle according to claim 1, wherein:
the acceleration/deceleration command is generated to be curved transition as time elapses in a diagram having vehicular longitudinal acceleration on an axis of an abscissa and having vehicular lateral acceleration on an axis of an ordinate.

9. The motion control system of the vehicle according to claim 1, wherein:
the acceleration/deceleration command is generated for the vehicle to decelerate when lateral acceleration of the vehicle increases and for the vehicle to accelerate when the lateral acceleration of the vehicle decreases.

10. The motion control system of the vehicle according to claim 1, wherein:
the acceleration/deceleration command is generated for the vehicle to decelerate when the steering angle of the vehicle increases and for the vehicle to accelerate when the steering angle of the vehicle decreases.

11. The motion control system of the vehicle according to claim 1, wherein:
the acceleration/deceleration command is generated based upon lateral acceleration and a lateral jerk of the vehicle respectively generated based upon the steering angle and the vehicle speed of the vehicle and predetermined gain.

12. The motion control system of the vehicle according to claim 11, wherein:
the acceleration/deceleration command Gxc is generated by calculating the following mathematical expression 1:

$$G_{XC} = -sgn(G_y \cdot \dot{G}_y) \frac{C_{xy}}{1+Ts} |\dot{G}_y| + G_{X\_DC}$$ (Mathematical expression 1)

where Gy: vehicular lateral acceleration, Gy_dot: vehicular lateral jerk, Cxy: gain, T: first-order lag time constant, s: Laplace operator, Gx_DC: offset.

13. The motion control system of the vehicle according to claim 11, wherein:
the lateral jerk is calculated by differentiating lateral acceleration estimated from a yaw rate and vehicle speed estimated based upon the steering angle and the vehicle speed or sensed by a yaw rate sensor or sensed by a lateral acceleration sensor by time.

14. The motion control system of the vehicle according to claim 1, wherein:
the acceleration/deceleration command includes target longitudinal acceleration and the target yaw moment respectively generated based upon the steering angle and the vehicle speed.

15. The motion control system of the vehicle according to claim 14, wherein:
the target longitudinal acceleration is calculated based upon lateral acceleration calculated based upon the steering angle and the vehicle speed and a lateral jerk calculated based upon the estimated lateral acceleration; and
the target yaw moment is calculated based upon the steering angle, the vehicle speed, a yaw rate of the vehicle and a slip angle.

16. The motion control system of the vehicle according to claim 1, wherein:
the acceleration/deceleration command is provided with an acceleration command and a deceleration command;
the acceleration command is turned zero when a braking operation command from a driver is input; and
the deceleration command is turned zero when an accelerating operation command from the driver is input.

17. The motion control system of the vehicle according to claim 1, wherein:
the driving force/braking force distributor makes such correction based upon sensed or generated lateral acceleration and/or sensed or generated longitudinal acceleration that difference in driving force or driving torque and/or braking force or braking torque between the inside front wheel in turning and the outside front wheel and difference in driving force or driving torque and/or braking force or braking torque between the outside rear wheel in turning and the inside rear wheel are smaller.

18. The motion control system of the vehicle according to claim 1, comprising:
a differential gear provided between the right and left rear wheels, wherein:
at least the rear wheels are driven by an electric motor.

19. The motion control system of the vehicle according to claim 11, comprising:
a differential gear provided between the right and left rear wheels, wherein:
at least the rear wheels are driven by an electric motor.

20. A motion control system of a vehicle, comprising:
a controller configured to independently control driving force and/or braking force of each of four wheels; and
a turning direction sensor configured to sense a turning direction, wherein:
the controller is provided with an acceleration/deceleration command generator that generates an acceleration/deceleration command based upon a sensed steering angle and sensed vehicle speed and a driving force/braking force distributor configured to determine the distribution of the driving force or driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheel and distributes more driving force or more driving torque and/or more braking force or more braking torque to the outside wheel in turning than the inside wheel in turning as to the rear wheels respectively based upon the acceleration/deceleration command and the turning direction;
the acceleration/deceleration command is provided with an acceleration command and a deceleration command;
wherein the acceleration command has a larger value when the grade of a road surface detected by a road surface grade detector is ascent than an acceleration command in running on a flat road and to have a smaller value when the grade of a road surface is descent than the acceleration command in running on the flat road; and
wherein the deceleration command has a smaller value when the grade of a road surface detected by the road surface grade detector is ascent than a value in the acceleration command in running on the flat road and to have a larger value when the grade of a road surface is decent than the value in the acceleration command in running on the flat road.

21. A motion control system of a vehicle, comprising:
a controller configured to independently control driving force and/or braking force of each of four wheels; and
a turning direction sensor configured to sense a turning direction, wherein:
the controller is provided with an acceleration/deceleration command generator that generates an acceleration/deceleration command based upon a sensed steering angle and sensed vehicle speed and a driving force/braking force distributor that determines the distribution of the driving force or driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction;

the controller is provided with a skid prevention device having a skid prevention function that independently controls driving force and/or braking force of each of the four wheels based upon skid information calculated based upon the steering angle and the vehicle speed or sensed; and the driving force/braking three distributor stops the distribution control of driving force or driving torque and/or braking force or braking torque to each wheel when the skid prevention function is operated.

22. A motion control system of a vehicle, comprising:
a controller configured to independently control driving force and/or braking force of each of four wheels;
a turning direction sensor configured to sense a turning direction; and
a differential gear provided between the right and left rear wheels, wherein:
at least the rear wheels are driven by an electric motor;
the controller is provided with an acceleration/deceleration command generator that generates an acceleration/deceleration command based upon a sensed steering angle and sensed vehicle speed and a driving force/braking force distributor that determines the distribution of the driving force or more driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction; and
the inside rear wheel in turning has longitudinal slip ratio in a different direction from the outside rear wheel in turning.

23. A motion control system of a vehicle, comprising:
a controller configured to independently control driving force and/or braking force of each of four wheels;
a turning direction sensor configured to sense a turning direction; and
a differential gear provided between the right and left rear wheels, wherein:
at least the rear wheels are driven by an electric motor;
the controller is provided with an acceleration/deceleration command generator that generates an acceleration/deceleration command based upon a sensed steering angle and sensed vehicle speed and a driving force/braking force distributor that determines the distribution of the driving force or more driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction; and
the inside rear wheel in turning has longitudinal slip ratio in a different direction from the outside rear wheel in turning by controlling the revolution speed, the torque, a part of the output or the whole output of the electric motor.

24. A motion control system of a vehicle, comprising:
a controller configured to independently control driving force and/or braking force of each of four wheels;
a turning direction sensor configured to sense a turning direction; and
a differential gear provided between the right and left rear wheels, wherein:
at least the rear wheels are driven by an electric motor;
the controller is provided with an acceleration/deceleration command generator that generates an acceleration/deceleration command based upon a sensed steering angle and sensed vehicle speed and a driving force/braking force distributor that determines the distribution of the driving force or more driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction; and
it is determined that braking force or braking torque to the rear wheel is distributed behind the front wheel.

25. A motion control system of a vehicle, comprising:
a controller configured to independently control driving force and/or braking force of each of four wheels;
a turning direction sensor configured to sense a turning direction; and
a differential gear provided between the right and left rear wheels, wherein:
at least the rear wheels are driven by an electric motor;
the controller is provided with an acceleration/deceleration command generator that generates an acceleration/deceleration command based upon a sensed steering angle and sensed vehicle speed and a driving force/braking force distributor that determines the distribution of the driving force or more driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction;
the acceleration/deceleration command generator is configured to generate the acceleration/deceleration command based upon lateral acceleration and a lateral jerk of the vehicle respectively generated based upon the steering angle and the vehicle speed of the vehicle and predetermined gain; and the inside rear wheel in turning has longitudinal slip ratio in a different direction from the outside rear wheel in turning.

26. A motion control system of a vehicle, comprising:
a controller configured to independently control driving force and/or braking force of each of four wheels;
a turning direction sensor configured to sense a turning direction; and
a differential gear provided between the right and left rear wheels, wherein:
at least the rear wheels are driven by an electric motor;
the controller is provided with an acceleration/deceleration command generator that generates an acceleration/deceleration command based upon a sensed steering angle and sensed vehicle speed and a driving force/braking force distributor that determines the distribution of the driving force or more driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction;
the acceleration/deceleration command generator is configured to generate the acceleration/deceleration command based upon lateral acceleration and a lateral jerk of the vehicle respectively generated based upon the steering angle and the vehicle speed of the vehicle and predetermined gain; and
the inside rear wheel in turning has longitudinal slip ratio in a different direction from the outside rear wheel in turning by controlling the revolution speed, the torque, a part of the output or the whole output of the electric motor.

27. A motion control system of a vehicle, comprising:
a controller configured to independently control driving force and/or braking force of each of four wheels;
a turning direction sensor configured to sense a turning direction; and
a differential gear provided between the right and left rear wheels, wherein:
at least the rear wheels are driven by an electric motor;
the controller is provided with an acceleration/deceleration command generator that generates an acceleration/deceleration command based upon a sensed steering angle and sensed vehicle speed and a driving force/braking force distributor that determines the distribution of the driving force or more driving torque and/or the braking force or braking torque of each wheel;
the driving force/braking force distributor is configured to determine that it distributes more driving force or more driving torque and/or more braking force or more braking torque to the inside wheel in turning than the outside wheel in turning as to the front wheels and distributes more driving force or more driving torque and/or more braking force or more braking torque to the outside wheel in turning than the inside wheel in turning as to the rear wheels respectively based upon the acceleration/deceleration command and the turning direction;
the acceleration/deceleration command generator is configured to generate the acceleration/deceleration command based upon lateral acceleration and a lateral jerk of the vehicle respectively generated based upon the steering angle and the vehicle speed of the vehicle and predetermined gain; and
it is determined that braking fore or braking torque to the rear wheel is distributed behind the front wheel.

* * * * *